(12) United States Patent
Akiyama et al.

(10) Patent No.: US 6,184,643 B1
(45) Date of Patent: Feb. 6, 2001

(54) APPARATUS FOR AUTOMATICALLY CONVEYING CARTRIDGES

(75) Inventors: Hitomi Akiyama; Yoshiki Akiyama, both of Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/415,915

(22) Filed: Oct. 12, 1999

Related U.S. Application Data

(62) Division of application No. 08/910,032, filed on Aug. 12, 1997, now Pat. No. 6,058,337.

(51) Int. Cl.[7] .......................... H02K 17/32; G11B 15/18; G11B 15/68
(52) U.S. Cl. .......................... 318/566; 318/565; 318/560; 360/92; 369/34; 369/36
(58) Field of Search ..................... 318/560–696, 318/434; 360/69, 92, 71; 369/36, 34, 178, 30, 33, 37, 38; 414/225, 331, 277; 395/821, 833

(56) References Cited

U.S. PATENT DOCUMENTS

| | | | |
|---|---|---|---|
| 5,546,315 | * 8/1996 | Kleinschnitz | 364/478.06 |
| 5,607,275 | * 3/1997 | Woodruff et al. | 414/331 |
| 5,613,154 | * 3/1997 | Burke et al. | 395/821 |
| 5,703,843 | * 12/1997 | Katsuyama et al. | 369/34 |
| 5,841,743 | * 11/1998 | Kobayashi et al. | 369/34 |
| 5,946,160 | * 8/1999 | Ohashi | 360/92 |
| 5,982,120 | * 11/1999 | Akiyama et al. | 318/434 |
| 6,005,745 | * 12/1999 | Filkins et al. | 360/92 |
| 6,008,964 | * 12/1999 | Goodknight et al. | 360/92 |

\* cited by examiner

*Primary Examiner*—Paul Ip
(74) *Attorney, Agent, or Firm*—Staas & Halsey LLP

(57) ABSTRACT

An apparatus is automatically conveying cartridges reliably and correctly without causing errors, making it possible to enhance the operation efficiency and performance of the apparatus. The apparatus is automatically conveying cartridges disposed adjacent to a recording/reproducing apparatus, and is comprised of a cell mechanism having racks, an accessor mechanism having an accessor, and a conveyance control unit for controlling the conveyance of the cartridges by controlling the accessor mechanism, wherein the accessor is provided with catcher hands, a catcher hand drive mechanism, an open detector mechanism for detecting the open state of said catcher hands, and a closed detector mechanism for detecting the closed state of said catcher hand. The conveyance control unit is equipped with a catcher hand controller which controls the catcher hands to assume an open state, a closed state or a middle state which is an intermediate state relying upon the data detected by the open detector mechanism and the closure detector mechanism.

11 Claims, 58 Drawing Sheets

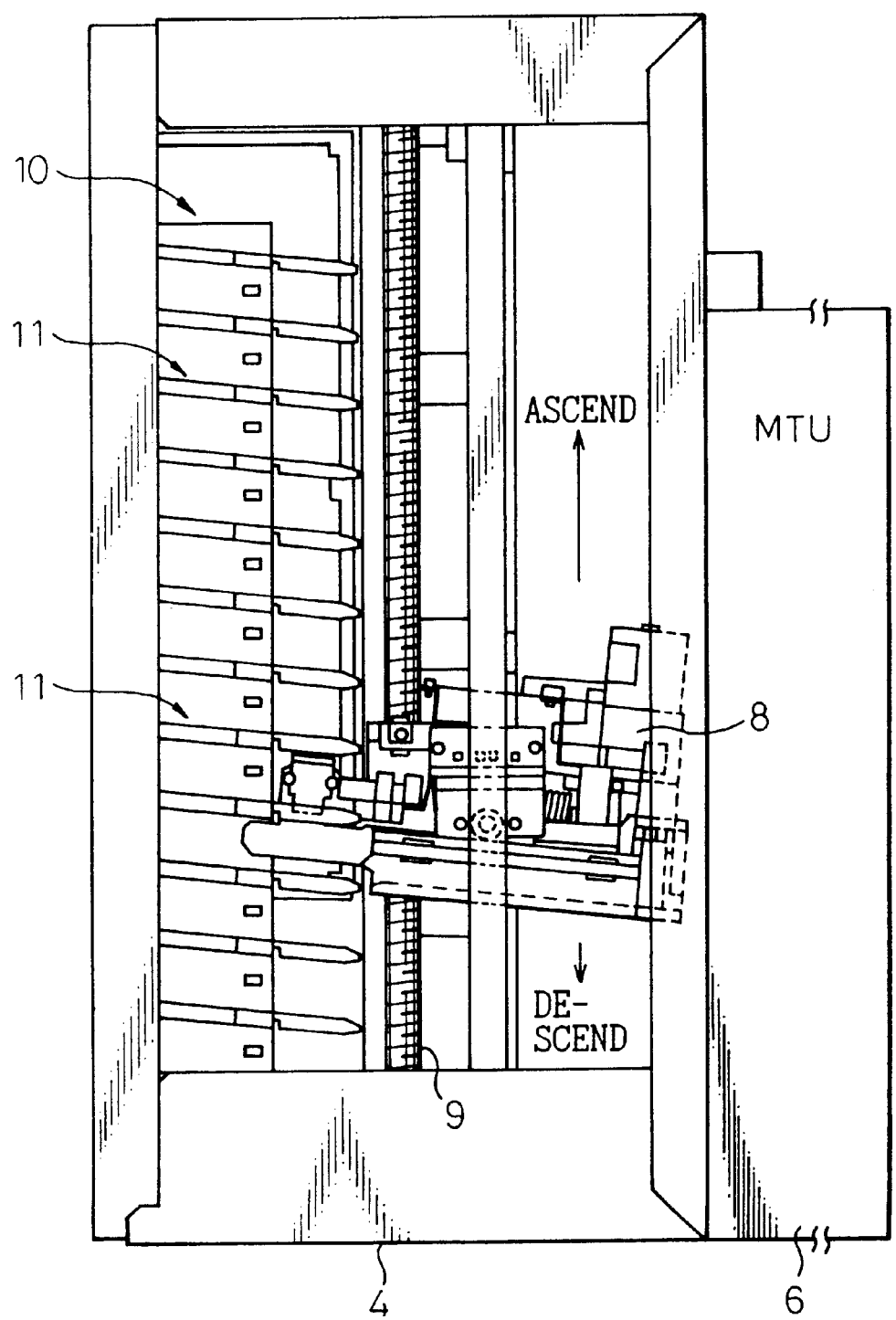

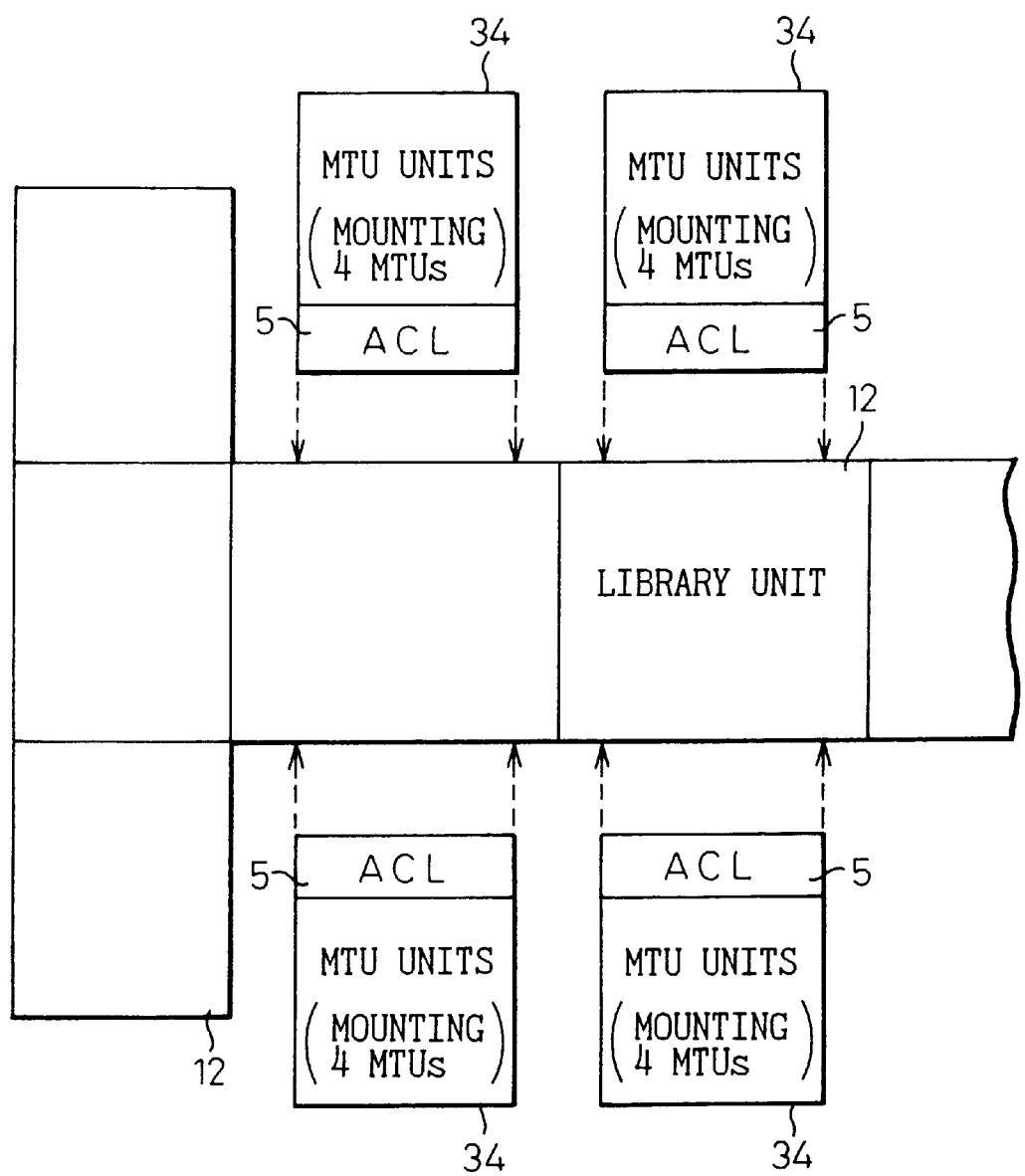

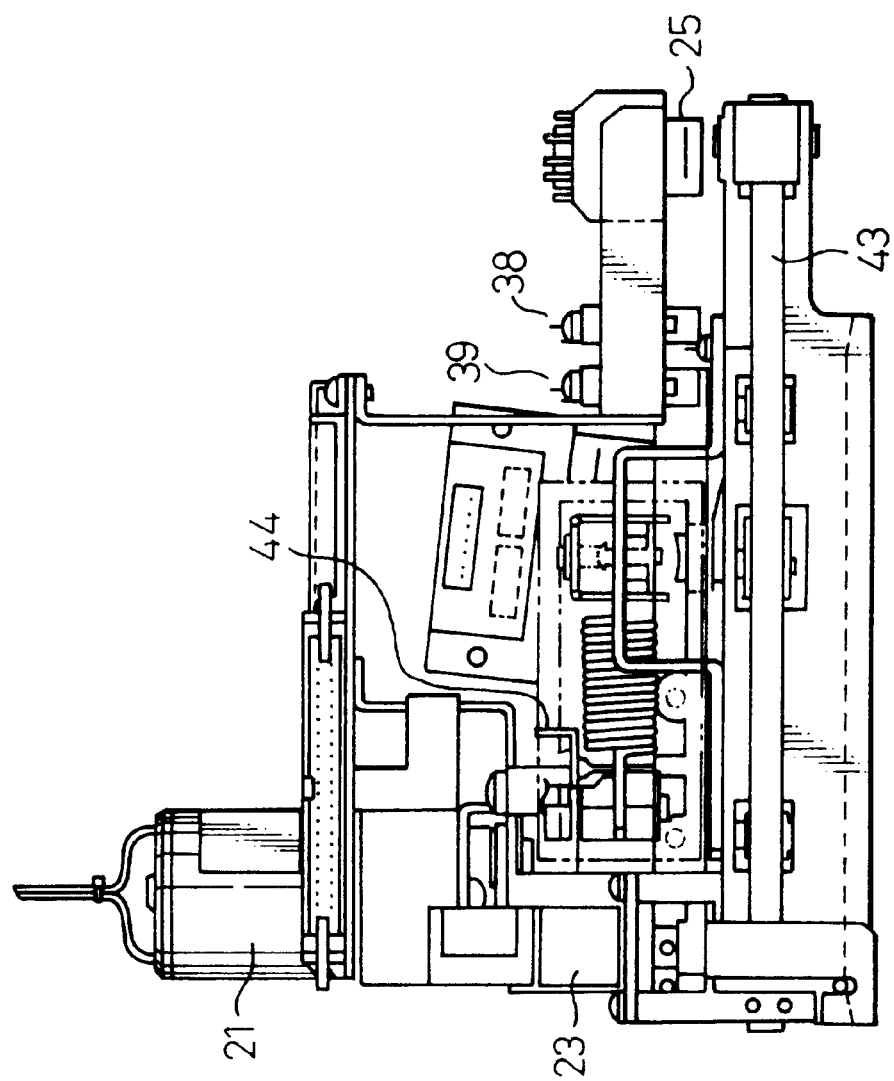
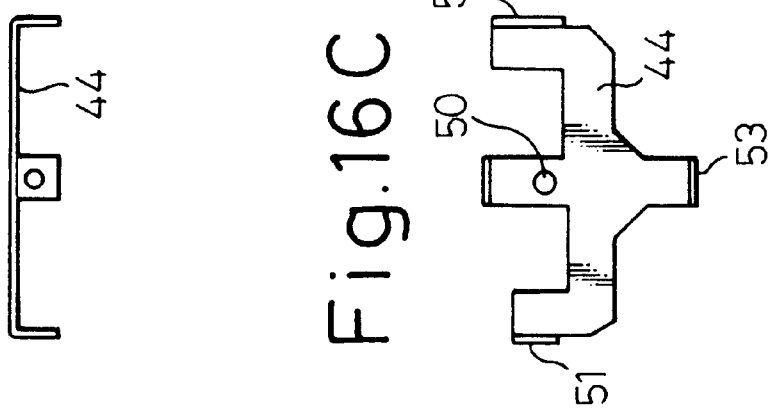

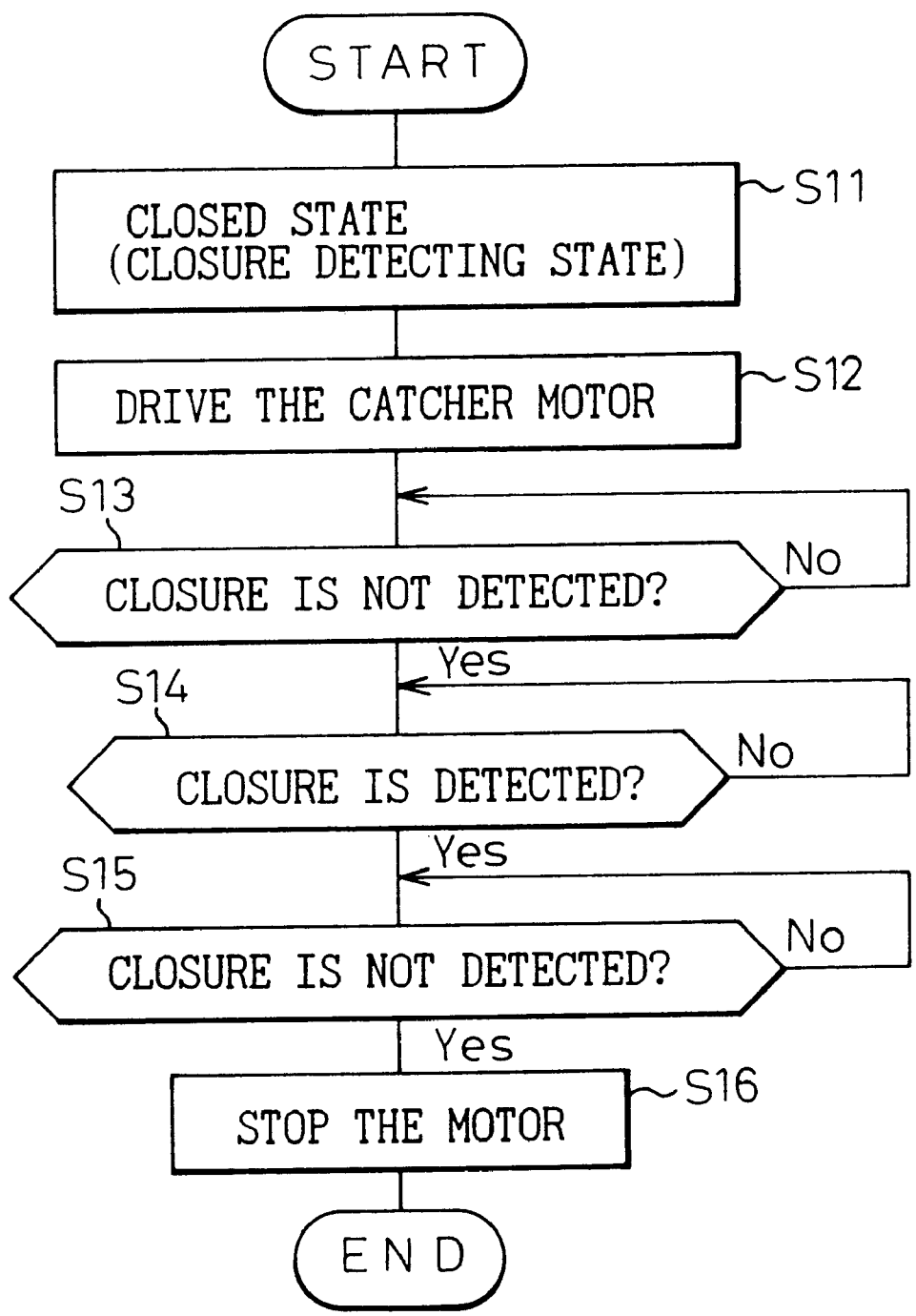

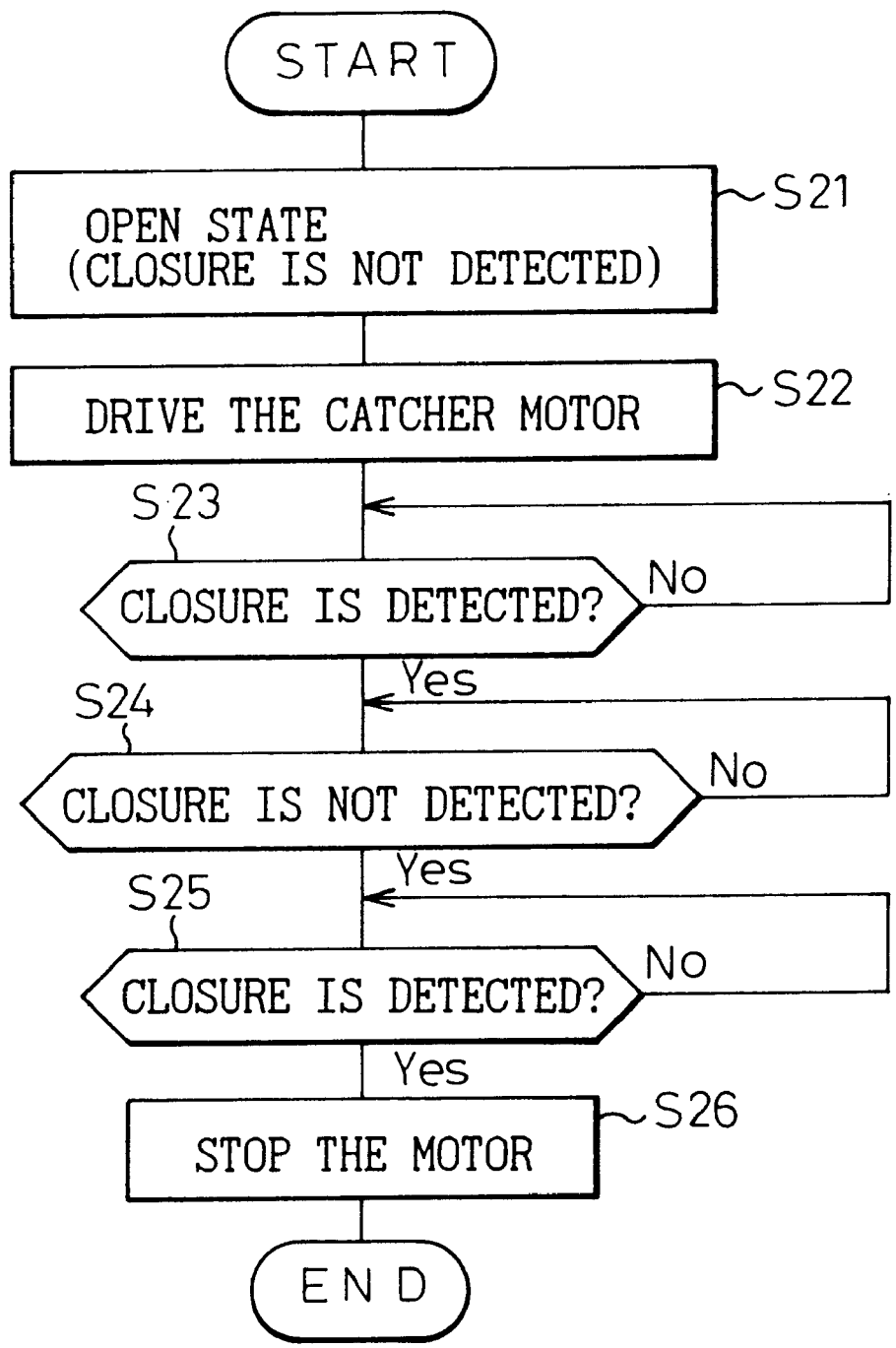

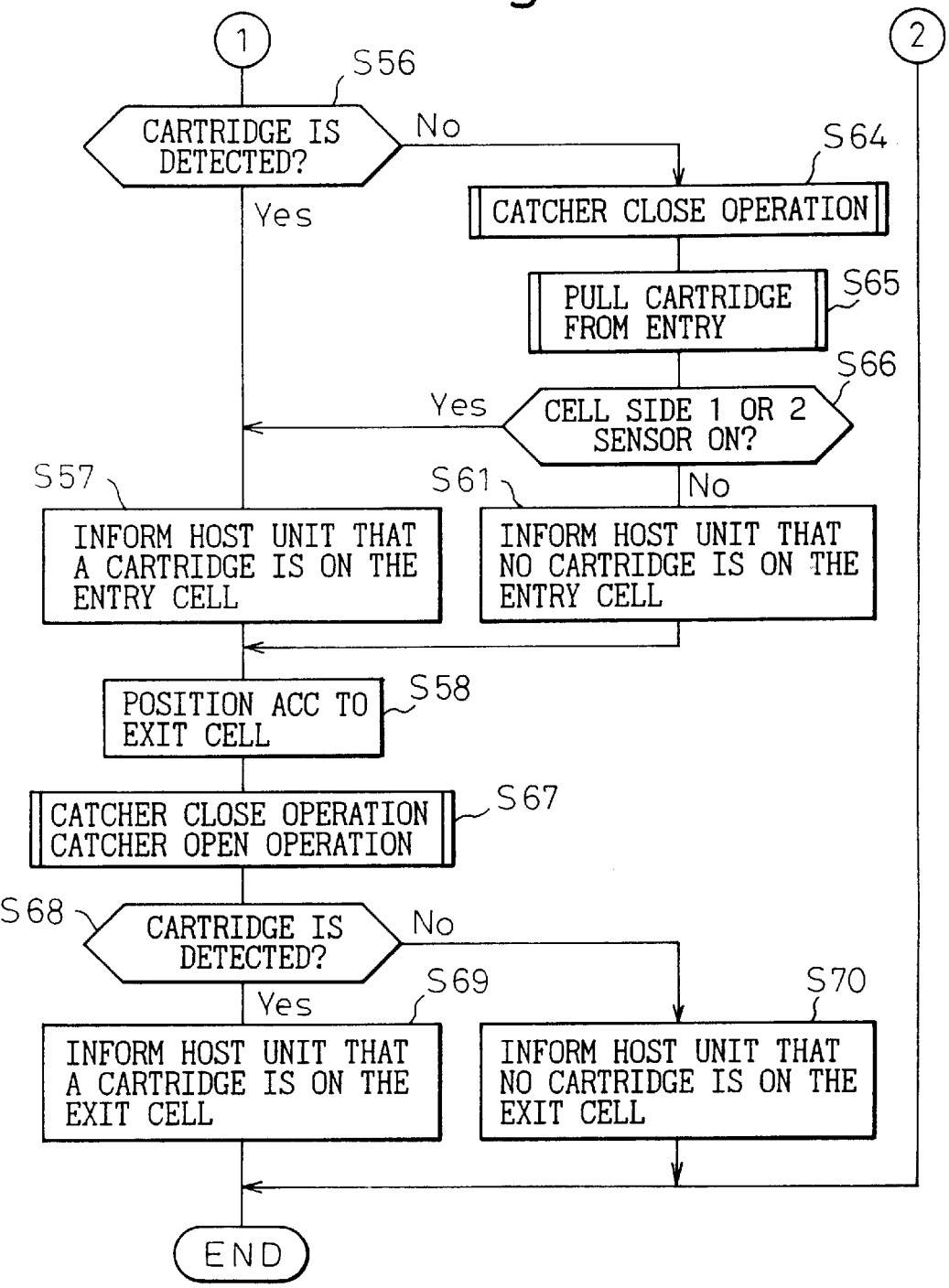

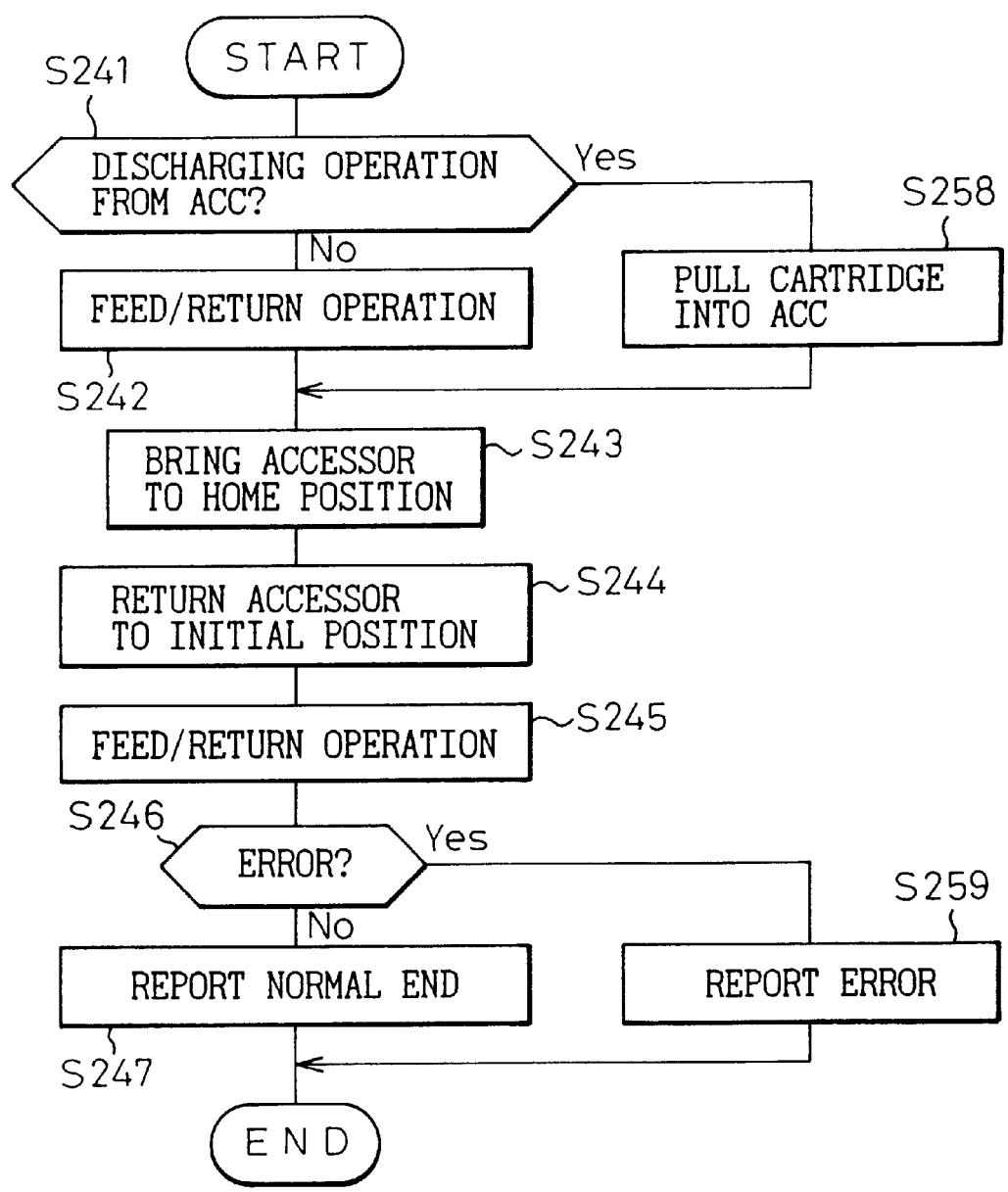

INVERSION OF LOGIC

APPARATUS FOR AUTOMATICALLY CONVEYING CARTRIDGES

CROSS-REFERENCE TO RELATED APPLICATION

This is a divisional application of prior application Ser. No. 08/910,032 filed Aug. 12, 1997, now U.S. Pat. No. 6,058,337.

BACKGROUND OF THE INVENTION

1. Field of the Invention

The present invention relates to an apparatus for automatically conveying cartridges to a magnetic tape unit which records and reproduces data by using a magnetic cartridge tape (hereinafter simply referred to as "cartridge") as a recording medium.

2. Description of the Related Art

In recent years, automatic operation of magnetic tape units has become so advanced that it is necessary to employ an apparatus for automatically conveying cartridges to take a cartridge that is to be processed from a rack of a cell mechanism, in which a plurality of cartridges are stored, and to convey the cartridge to a magnetic tape apparatus.

In the apparatus for automatically conveying cartridges, a robot that requires a servo control operation has generally been controlled by firmware. Furthermore, the torque required from a motor to drive the apparatus for automatically conveying cartridges varies depending upon the apparatuses due to mechanical tolerance, the environment in which the apparatus for automatically conveying cartridges is used and the time of use. It is presumed that these differences result from a change in friction and mechanical tolerance.

Despite the occurrence of the above-mentioned situations, any magnetic tape apparatus can be easily coped with if mechanical tolerance in the apparatus is absorbed by the firmware that controls the apparatus for automatically conveying cartridges. Moreover, incorporating a mechanical unit in the apparatus for automatically conveying cartridges maintaining precision requires laborious work as well as considerable expense. It therefore becomes necessary to assemble the apparatus while maintaining precision to a certain degree and, then, control the operation is corrected by the firmware.

As the apparatus is designed to operate automatically, furthermore, it is required to operate unattended. Therefore, it is necessary to develop a library unit which stores a number of cartridges and conveys a cartridge to the magnetic tape apparatus to automatically execute recording/reproducing operation. Even when the apparatus for automatically conveying cartridges is coupled to a library unit to automatically convey the cartridges, however, it is not possible to automatically convey the cartridges when there are included cartridges from which the leader block has been pulled out or when the detector mechanisms have been broken in the apparatus for automatically conveying the cartridges. In such a case, the operation must be carried out by an operator.

Even in an apparatus in which the detector mechanisms have been broken, therefore, the processing can be continued if the cartridge contained therein can be taken out. It therefore becomes necessary to automatically continue the processing without assistance from an operator or maintenance personnel. This is related to enhancing the retry control operation when an error has occurred. When the operator uses the apparatus for automatically conveying cartridges, furthermore, the apparatus must be easily operated. For this purpose, the operation performance must be enhanced. Therefore, the operation must be simple and easy.

The prior art will now be described with reference to the drawings.

§1: Description of a Cartridge and Apparatus for Automatically Conveying Cartridges—see FIGS. 1A to 1D.

FIG. 1A is a perspective view of a cartridge, FIG. 1B is a side view of a conventional ACL apparatus for a single unit, FIG. 1C is a side view of a conventional ACL apparatus for attachment to a library unit, and FIG. 1D is a plan view of a conventional accessor. In the following description, the apparatus for automatically conveying cartridges is referred to as an ACL (automatic cartridge loading) apparatus, the magnetic tape unit is referred to as "MTU", and the magnetic cartridge tape is referred to as "cartridge".

As a magnetic cape recording medium, there has heretofore been known a cartridge (magnetic cartridge tape) 1 that is shown (3480-type magnetic cartridge tape). There has been known an ACL apparatus for automatically conveying cartridges to the MTU which records and reproduces the data by using the cartridge 1. The ACL apparatus may be either an ACL apparatus 4 for a single unit or an ACL apparatus 5 for attachment to a library unit.

The ACL apparatus 4 for a single unit is used in combination with the MTU (as a unitary structure) and automatically conveys the cartridge to the MTU 6. The ACL apparatus 5 for attachment to a library is used in combination with the MTU 6 (as a unitary structure) and is further mechanically coupled to a library unit 12.

In this case, the library unit 12 is equipped with a cell (rack mechanism) for storing a number of cartridges therein, an MTU (unit separate from the MTU 6 combined with the ACL unit), an accessor mechanism for automatically conveying cartridges to the cell and to the MTU, and a cartridge access station (CAS) for automatically loading/discharging the cartridges.

As shown, the ACL apparatus 4 for a single unit is used in combination with the MTU 6 (as a unitary structure). The ACL apparatus 4 for a single unit is equipped with a cell mechanism 10 having many racks (cells) 11 for holding cartridges, and an accessor mechanism for automatically conveying cartridges. The accessor mechanism is provided with an accessor (mechanism which grips a cartridge and moves) 8, a shaft 9 and an accessor drive mechanism which includes a motor.

The accessor 8 is driven by the accessor drive mechanism and ascends or descends along the shaft 9 but does not turn on a horizontal plane. The cartridge can be inserted in each rack 11 of the cell mechanism 10, by hand, from the external side. The accessor 8 grips the cartridge inserted in the rack 11 of the cell mechanism 10, conveys it and loads it into the MTU 6. The cartridge loaded into the MTU is subjected to read/write processing. The cartridge processed in the MTU 6 is gripped by the accessor 8, conveyed to the cell mechanism 10 and is discharged into the rack 11.

Like the ACL apparatus 4 for a single unit, the ACL apparatus 5 for attachment to a library unit is used in combination with the MTU 6 and is further coupled (mechanically coupled) to a library unit 12. In this case, the ACL apparatus 5 for attachment to a library unit is provided with the accessor mechanism and the cell mechanism 10. Here, the cell mechanism 10 is provided with an entry cell 13 and an exit cell 14.

The ACL apparatus 5 for attachment to a library unit automatically exchanges the cartridge with the library unit 12 through the entry cell 13 and the exit cell 14. For instance, a cartridge stored in the library unit 12 is conveyed by the ACL apparatus 5 for attachment to a library unit to the MTU 6 (which is separate from the MTU in the library unit 12) and is subjected to read/write processing.

The accessor 8 is provided with catcher hands 19 (located on both sides) which open and close by turning about a rotary center shaft 20 to grip or release the cartridge 1, a catcher motor 21 for driving the catcher hands 19, feed motors 23 for feeding/returning (pulling/discharging) the cartridge by driving the feeder belts, a presence-of-cartridge sensor 25 for detecting the presence of a cartridge on the rack of the cell mechanism 10, a first cell side sensor 38 and a second cell side sensor 39 for detecting the presence of a cartridge in the accessor 8. The catcher hands 19 are disposed on the side of the cell mechanism 10.

§2: Controlling the Portions of the ACL Apparatus.

Described below are the operations for controlling the portions of the ACL. apparatus 4 for a single unit and of the ACL apparatus 5 for attachment to a library unit. In the following description, both the ACL apparatus 4 for a single unit and the ACL apparatus 5 for attachment to a library unit are simply referred to as "ACL apparatuses". Furthermore, the racks of the cell mechanism provided for the ACL apparatus 4 for a single unit and the entry cell and exit cell of the cell mechanism provided for the ACL apparatus 5 for attachment to a library unit are all referred to as "racks" or "cells".

(1) Controlling the accessor 8.

The accessor 8 in a conventional ACL apparatus is provided with catcher hands 19 which are closed or opened to grip or release the cartridge 1. For instance, when a cartridge held in the rack 11 of the cell mechanism 10 is to be pulled (fed) into the accessor, the catcher hands 19 are opened and are positioned to the cell mechanism 10. The catcher hands 19 are then closed to grip the cartridge and are pulled (fed) into the accessor 8.

When the cartridge in the accessor 8 is to be loaded into the MTU 6, the accessor 8 holding the cartridge is positioned to the MTU 6 (positioned in the direction of height) and the cartridge is loaded into the MTU 6.

(2) Detecting a cartridge present in the cell mechanism 10.

The cartridge 1 present on the rack of the cell mechanism 10 has heretofore been detected by the presence-of-cartridge sensor 25 provided on the accessor 8 in a manner as described below.

① The cartridge 1 present on the rack (cell) has simply been detected by the presence-of-cartridge sensor 25, without making sure if the presence-of-cartridge sensor 25 itself is functioning properly or not.

② Whether the presence-of-cartridge sensor 25 works properly or not is confirmed by the initialization processing only at the time when the power source circuit is closed.

(3) Controlling the position of the rack (cell).

So far, the position of the rack of the cell mechanism 10 has been corrected as described below.

① The presence-of-cartridge sensor 25 is furnished with a function for detecting the position of the rack (cell), and mechanical dispersion due to mounting of the rack or due to the rack (cell) itself is absorbed by the presence-of-cartridge sensor 25.

② The apparatus not equipped with the presence-of-cartridge sensor 25 could not absorb dispersion of the racks (cells).

③ In assembling the cell mechanism 10 of the ACL apparatus 5 for attachment to a library unit, positioning must be accomplished relative to the library unit and, hence, the cell mechanism 10 has been so assembled as to suppress dispersion of the racks (cells) without, however, correcting the positions of the racks (cells) in a subsequent step.

(4) Pushing the leader block into the cartridge.

When the leader block 2 of the cartridge 1 has been pulled out, the ACL apparatus 4 for a single unit informs the operator of the fact that the leader block 2 has been pulled out, informs an error and discharges the cartridge 1. Even the ACL apparatus 5 for attachment to a library unit discharges the cartridge 1 without pushing in the leader block 2. Therefore, the cartridge 1 from which the leader block 2 has been pulled out is discharged without being processed.

(5) Controlling the feeder belts.

So far, when a cartridge gripped by the catcher hands 19 is to be discharged (returned) to the cell mechanism 10 or to the MTU 6 by the accessor 8, the motive power of the feeder motors 23 is transmitted to the feeder belts to discharge the cartridge. When there is no cartridge in the accessor 8, the feeder motors 23 are not driven and the feeder belts remain at rest. Therefore, the feeder belts are driven at one place only.

(6) Controlling the feeder learning.

The accessor 8 has been equipped with a feeder mechanism comprising feeder motors 23 and feeder belts in order to discharge (return) the cartridge in the accessor 8 into the cell mechanism 10 or into the MTU 6 or to pull (feed) the cartridge in the cell mechanism 10 or in the MTU 6 into the accessor 8. However, the feeder mechanism of the accessor 8 does not have a learning function but simply feeds or returns the cartridge.

(7) Initializing the cartridge.

The cartridge present in the accessor 8 is detected by using the first cell side sensor 38 and the second cell side sensor 39. When the power source circuit is closed or an error has occurred, however, the accessor 8 is not initialized.

(8) Retrying the feeder mechanism.

The accessor 8 is equipped with a feeder mechanism comprising feeder motors 23 and feeder belts in order to discharge (return) the cartridge in the accessor 8 into the cell mechanism 10 or into the MTU 6, or to pull (feed) the cartridge in the cell mechanism 10 or in the MTU 6 into the accessor 8. When an error occurs due to the operation for feeding or returning the cartridge, the accessor 8 is positioned again to the cell mechanism 10 or to the MTU 6, and the feeder mechanism is operated again.

(9) Returning the cartridge.

When the cartridge in the accessor 8 is to be discharged (returned) onto the rack of the cell mechanism 10, the accessor 8 is not equipped with a detection mechanism for detecting the returning state; i.e., the accessor 8 is moved in the discharging direction by a predetermined amount to discharge the cartridge after the cartridge is no longer detected by the first cell side sensor 38 and the second cell side sensor 39 that detects the cartridge properly held in the accessor 8. That is, when the cartridge is to be returned, the conventional apparatus does not detect to which position the cartridge is discharged but simply discharges the cartridge onto the rack so as to overrun to some extent.

(10) Controlling the position of cartridge (controlling the overrunning of cartridge).

The cartridge in the accessor 8 is discharged (returned) onto the rack of the cell mechanism 10 so as to overrun to some extent (discharged to go a little ahead of the specified holding position). That is, when the cartridge is discharged by the conventional apparatus, the cartridge is not controlled for its flying (overrunning) but is simply discharged onto the rack.

(11) Discriminating between new and old devices.

The conventional apparatus has not been equipped with a function for automatically discriminating a new ACL apparatus or an old ACL apparatus. The type of the apparatus has been discriminated by employing both new and old firmware or by setting in the apparatus data related to the types of the apparatuses.

The above-mentioned conventional apparatus involves the problems as described below.

(1) Controlling the catcher hands of the accessor.

The catcher hands 19 have been driven to be either opened or closed (open or closed state is based on the side of the cell mechanism 10) but not to assume an intermediate position. In the ACL apparatus 4 for a single unit, therefore, when the cartridge is loaded into the MTU 6, for example, the catcher hands 19 are opened on the side of the MTU 6 but are closed on the side of the cell mechanism. When the operator attempts to pull the cartridge on the rack of the cell mechanism 10 at a height same as the MTU 6 or attempts to insert the cartridge into the rack, therefore, the catcher hands 19 which are closed on the side of the cell mechanism 10 enter into the rack and become an obstacle.

In the ACL apparatus 5 for attachment to a library unit, furthermore, when the rack at the position of the MTU 6 (rack at the same height as the MTU 6) is used as the entry cell 13, the MTU 6 becomes flush with the entry cell 13, and the accessor 8 does not need to ascend or descend. Therefore, the shortest time is required for loading the cartridge into the MTU 6, but the accessor 8 becomes an obstacle; i.e., the accessor in the library unit is not allowed to freely access the entry cell 13. Therefore, the entry cell 13 has been deviated from the position (height) of the MTU 6. Accordingly, an extended period of time is required for loading the cartridge into the MTU 6.

(2) Detecting the presence of a cartridge on the rack.

① In the case of the ACL apparatus 5 for attachment to a library unit, whether there is a cartridge in the entry cell 13 or in the exit cell 14 is detected by the presence-of-cartridge sensor 25. During the ordinary operation, however, whether the presence-of-cartridge sensor 25 itself is normally working or not has not been checked.

When the cartridge in the MTU 6 is to be discharged into the exit cell 14, first, the presence-of-cartridge sensor 25 determines whether there is a cartridge or not. Only when it is so judged that there is no cartridge, is the cartridge in the MTU 6 conveyed by the accessor 8 and discharged into the exit cell 14.

When it is so judged that there is a cartridge in the exit cell 14, however, it is not allowed to discharge the cartridge in the MTU 6 into the exit cell 14. In such a case, it is not judged whether the cartridge really exists in the exit cell 14 or the presence-of-cartridge sensor 25 is erroneously detecting a cartridge, but an error is informed to the host unit.

When it is so judged that there is a cartridge though there really is no cartridge in the exit cell 14, the software which control the library unit 12 assumes that a cartridge exist in the exit cell 14 when it does not and control of cartridge is difficult.

② During an ordinary operation, whether or not the presence-of-cartridge sensor 25 is properly functioning has not been checked. Therefore, if the presence-of-cartridge sensor 25 has been broken, a cartridge in the exit cell 14 may not be detected by the presence-of-cartridge sensor 25. As a result, it is often judged that there is no cartridge despite there really being a cartridge in the exit cell 14.

In such a case, the accessor in the library unit 12 could not access the exit cell 14 since it was judged by the ACL apparatus 5 for attachment to a library unit that there is no cartridge in the exit cell 14. Therefore, when it is desired to convey the cartridge to another MTU in the library unit 12, the operator must take out the cartridge from the exit cell in the ACL apparatus 5 for attachment to a library unit and must insert it again into the library unit 12 requiring an increased amount of operation.

③ When the cartridge is held in a tilted manner in the entry cell 13 or in the exit cell 14, the presence of the cartridge is not correctly detected, and it is often regarded that no cartridge is present even though there really is a cartridge present. This makes it difficult to determine the number of the cartridges by the software that manages the library unit 12.

(3) Correcting the position of the rack (cell) of the cell mechanism.

Correcting the position of the rack (cell) is as described below.

① When the accessor 8 has accessed the rack (cell) of the cell mechanism 10 without correcting the position of the rack of the cell mechanism 10, the accessor 8 is often positioned deviated from the rack and the cartridge is often not pulled into the accessor 8 from the rack.

② In the above-mentioned case ①, the cartridge can be pulled into the accessor 8 upon retrying. However, an extended access time is required since the retrying is effected each time.

③ When the rack and the accessor 8 are deviated from each other, the cartridge is not taken out from the rack or the cartridge is not returned back to the rack, resulting in an error.

(4) Pushing the leader block.

The leader block of the cartridge is pushed as described below.

① The cartridge from which the leader block has been pulled out cannot be loaded into the MTU 6 and is, therefore, discharged without subjecting it to the read/write processing. In the ACL apparatus 4 for a single unit, in this case, this fact is reported to the operator to have the leader block pushed in to continue the processing. When such an event occurs in the batch job during the night, however, the processing must be interrupted.

② In the ACL apparatus 5 for attachment to a library unit, even when the operator is informed of the fact that the leader block has been pulled out, the cartridge is taken out from the library unit 12 and is processed. Therefore, the processing is interrupted during this period often resulting in a tremendous amount of damage.

③ In the case of the ACL apparatus 4 for a single unit, the cartridge discharged onto the rack (cell) of the cell mechanism 10 is taken out by hand by the operator from the rack (cell) and is stored. Therefore, there arises no problem even if the leader block has been pulled out at the time when the cartridge is discharged.

In the ACL apparatus 5 for attachment to a library unit, however, the next processing is automatically carried out without being assisted by the operator. When the leader block has been pulled out, therefore, there arises a problem in that the cartridge cannot be loaded into the library unit 12 when the cartridge is taken out from the exit cell 14 in the ACL apparatus 5 for attachment to a library unit and is loaded into the MTU (MTU in the library unit 12) which is not prepared to cope with the cartridges into which the leader block has not been pushed.

(5) Driving the feeder belts.

The cartridge is conveyed from the rack of the cell mechanism 10 to the accessor 8, from the accessor 8 to the MTU 6, and is returned from the MTU 6 back to the accessor 8. Therefore, the feeder belts provided in the accessor 8 are driven at the same portions at all times. Moreover, the control operation for pushing the leader block so works as to push the leader block and then pulls the cartridge into the accessor 8. In this case, too, therefore, the control operation is executed at the same positions at all times. Therefore, the feeder belts slip at the same portions only and are conspicuously worn out at these portions but are not worn out at other portions.

(6) Controlling the feeder learning.

The learning control has not been effected for the feeder mechanism in the conventional accessor 8. Therefore, the speed of the feeder motors 23 of the accessor 8 varies, friction varies depending upon the cartridges, and the amount of overrunning often increases when the cartridge is pulled into the accessor 8 from the rack of the cell mechanism 10.

In this case, when the feeder motors 23 are stopped after the cartridge is detected by the second cell side sensor 39, the cartridge overruns up to a position where it is not detected by the second cell side sensor 39. Therefore, the cartridge must be once properly returned back into the accessor 8. When the cartridge is discharged from the accessor 8 into the rack of the cell mechanism 10, furthermore, the cartridge overruns in varying amounts. Therefore, overrunning of a predetermined amount is not accomplished.

(7) Initializing the cartridge.

So far, the accessor 8 has not been initialized when the power source circuit is closed or when an error has occurred. When the power source circuit is closed or when an error has occurred, therefore, it appears that there is no cartridge though a cartridge really exists in the accessor 8. Therefore, the accessor 8 ascends or descends in a state where the cartridge has been missed or the cartridge has not been properly held in the accessor 8, causing the cartridge to be broken or the apparatus to be damaged.

(8) Retrying the feeder mechanism.

So far, the cartridge has been fed or returned by the feeder mechanism in the accessor 8. When an error occurs in the feeding/returning operation of the cartridge, the accessor 8 is positioned to the cell mechanism 10 or to the MTU 6, and is tried again.

When the feeder mechanism is retried, however, the accessor 8 is located at the same position at all times, i.e., located at a position where the rack should exist even though the rack in practice might have deviated (the rack position is not corrected). When the rack position is deviated, therefore, the accessor 8 cannot be properly positioned to the deviated rack. Despite the feeder mechanism being retried, therefore, the cartridge is neither fed nor returned, and an error occurs.

(9) In the conventional apparatus, the cartridge that is to be returned is simply discharged onto the rack to overrun to some extent without detecting where the cartridge is discharged. In the conventional control operation, therefore, there is no guarantee that the cartridge has returned back to the rack, and there remains a possibility that the cartridge is erroneously recognized to have returned back to the rack though it has not really returned back to the rack due to some obstacle like damage to the motor.

(10) Controlling the position of cartridge (controlling the overrunning).

When the cartridge is to be discharged (returned) in the conventional apparatus, the cartridge is not controlled for its position (overrunning) but is simply discharged onto the rack. In this case, the state of the cartridge (processed/unprocessed state) is displayed on the operator panel but without looking at the operator panel, the operator could not judge whether the cartridge on the rack is the one that has not been processed or not. There remains a problem in that if the LED of the operator panel breaks, it becomes difficult to determine whether the cartridge is the one that has not been processed or not.

(11) Discriminating between new and old devices.

As an ACL apparatus of the improved version is placed in the market as a new type of ACL apparatus, it becomes necessary to detecting the type of the ACL apparatus. So far, this could be coped with by setting data related to the type of the apparatus (data related to the new and old types) in the ACL apparatus or by employing two types of firmware in the new apparatus and in the old apparatus, respectively. When the data related to the types of the apparatuses are to be set, however, the operation involves mistakes, and the operator must set the data again requiring a cumbersome operation.

Furthermore, when the two firmwares are employed, i.e., when the respective firmwares are input to different apparatuses, it becomes impossible to operate the system and mistakes are inevitably involved in the operation.

SUMMARY OF THE INVENTION

The object of the present invention is to automatically convey the cartridges reliably and correctly without developing an error and to improve operability and performance of the apparatus by solving the above-mentioned problems inherent in the prior art.

FIG. 2 is a diagram illustrating the principle of the present invention. In order to accomplish the above-mentioned object, the present invention is constituted as described below.

(1) An apparatus for automatically conveying cartridges disposed adjacent to a recording/reproducing apparatus (e.g., MTU 6), comprising a cell mechanism 10 having racks for holding cartridges of recording media, an accessor mechanism having an accessor 8 for conveying the cartridges, and a conveyance control unit for controlling the conveyance of the cartridges by controlling said accessor mechanism, wherein said accessor 8 is provided with catcher hands 19 for gripping the cartridge, a catcher hand drive mechanism for driving said catcher hands 19, an open detector mechanism for detecting the open state of said catcher hands 19, and a closure detector mechanism for detecting the closed state of said catcher hands, and wherein said conveyance control unit is equipped with a catcher hand control means which controls the catcher hands 19 of the accessor to assume an open state, a closed state or a middle state between said open state and said closed state relying upon the data detected by said open detector mechanism and said closure detector mechanism.

(2) An apparatus for automatically conveying cartridges described in (1) above, wherein a catcher motor 21 is provided as a drive source for said catcher hand drive mechanism, and said catcher hand control means is provided with a PWM control unit which, when the catcher hands 19 are to be controlled to the middle state, causes the catcher hands 19 to assume the open state, so sets a PWM (pulse width modulation) value that a drive current of said catcher motor 21 becomes smaller than an ordinary drive current, and drives the catcher motor 21 with said PWM value toward the closing direction at a speed slower than an ordinary speed until both said open detector mechanism and said closure detector mechanism assume the detection state.

(3) An apparatus for automatically conveying cartridges described in (1) above, wherein said catcher hand control means is provided with a middle state-holding means which continues to pass a very small current of an intensity with which the catcher hands 19 can be held in the middle state when the catcher middle state is detected from the catcher open state.

(4) An apparatus for automatically conveying cartridges as described in (1) above, wherein provision is made of a catcher open/close sensor flag having a plurality of flag pieces that are turned by said catcher hand drive mechanism accompanying the turn of the catcher hands 19 and are detected by said open detector mechanism and said closure detector mechanism, wherein said flag pieces are so arranged that only one flag piece is detected by the open detector mechanism in a state where said catcher hands 19 are opened, that only one flag piece is detected by said closure detector mechanism in a state where said catcher hands 19 are closed, and that separate flag pieces are detected by said open detector mechanism and by said closure detector mechanism in a state where said catcher hands 19 are in the middle state, and wherein the length of the flag piece detected by said closure detector mechanism in the middle state is longer than the lengths of the other flag pieces, and when the open detector mechanism is detecting the flag piece in said middle state, the closure detector mechanism is necessarily detecting the flag piece.

(5) An apparatus for automatically conveying cartridges as described in (4) above, wherein the length of the flag piece detected by the closure detector mechanism when said catcher hands 19 are in the middle state is longer than the lengths of other flag pieces, so that the flag piece is detected by said open detector mechanism only in the state where the catcher hands are opened, and said catcher hand control means is provided with a control function which, when the catcher hands are to be driven first by closing the power source circuit, maintains the catcher hands in the open state and, then, executes the catcher hand drive control operation.

(6) An apparatus for automatically conveying cartridges as described in (1) above, wherein said catcher hand control means has a control function for holding the catcher hands in the middle state after the cartridge is loaded into the recording/reproducing apparatus (e.g., MTU 6) but before the cartridge is discharged from the recording/reproducing apparatus.

(7) An apparatus for automatically conveying cartridges as described in (1) above, wherein said catcher hand control means is provided with a control function which, after the cartridge has been loaded into the recording/reproducing apparatus, moves the catcher hands from the middle state to the open state in order to eliminate extra consumption of electric power.

(8) An apparatus for automatically conveying cartridges, comprising a cell mechanism 10 having racks for holding cartridges of recording media, an accessor mechanism having an accessor 8 for conveying the cartridges, and a conveyance control unit for controlling the conveyance of the cartridges by controlling said accessor mechanism, wherein said accessor 8 is provided with catcher hands 19 for gripping the cartridge, a catcher hand drive mechanism for driving said catcher hands 19, and a presence-of-cartridge sensor capable of detecting the presence of a cartridge on said rack, wherein said conveyance control unit is equipped with a sensor function confirmation means which, when the power source circuit is closed, brings said accessor to a rack position of the cell mechanism and brings said presence-of-cartridge sensor to a position where the cartridge will not be detected, in order to make sure that the presence-of-cartridge sensor is properly functioning.

(9) An apparatus for automatically conveying cartridges, comprising an entry cell having a rack for storing cartridges which are connected to a library device but have not been processed yet, a cell mechanism 10 having an exit cell having a rack for containing cartridges that have been processed, an accessor mechanism having an accessor 8 for conveying cartridges, and a conveyance control unit for controlling the conveyance of the cartridges by controlling said accessor mechanism, wherein said accessor 8 is provided with catcher hands 19 for gripping the cartridge, a catcher hand drive mechanism for driving said catcher hands 19, and a presence-of-cartridge sensor capable of detecting the presence of a cartridge on said rack, and wherein said conveyance control unit is equipped with a cartridge detection control means which, when the power source circuit is closed, brings the accessor to the rack of said entry cell and to the rack of said exit cell, so that said presence-of-cartridge sensor detects the cartridges on the racks.

(10) An apparatus for automatically conveying cartridges described in (9) above, wherein said conveyance control unit is provided with a cartridge correction control means which, at the time of detecting a cartridge on each of the racks being controlled by said cartridge detection control means, causes the catcher hands to grip a cartridge on the rack in advance by taking into consideration the case where the cartridge may not have been properly placed on the rack, and permits the cartridge to be released, so that the cartridge is properly placed on the rack.

(11) An apparatus for automatically conveying cartridges as described in (9) above, wherein said conveyance control unit is provided with a sensor function check means which, when a cartridge is to be discharged into said exit cell, necessarily makes sure that there is a cartridge in the exit cell by using said presence-of-cartridge sensor and, when the cartridge in the exit cell is detected, checks if said presence-of-cartridge sensor is properly functioning or not.

(12) An apparatus for automatically conveying cartridges as described in (11) above, wherein said conveyance control unit is provided with a control function which confirms that the presence-of-cartridge sensor is functioning properly by using said sensor function check means and, when the presence-of-cartridge sensor is not functioning properly, informs a host unit of this fact and discharges the cartridge onto the exit rack and, when the presence-of-cartridge sensor is properly functioning, informs the host unit of the fact that a cartridge exists on the exit rack.

(13) An apparatus for automatically conveying cartridges used as a single unit, comprising a cell mechanism 10 having a plurality of racks for holding cartridges, an accessor mechanism having an accessor 8 for conveying the cartridges, and a conveyance control unit for controlling the conveyance of the cartridges by controlling said accessor mechanism, wherein said accessor 8 is provided with a presence-of-cartridge sensor capable of detecting the presence of cartridges on said racks, and wherein said conveyance control unit is provided with a presence-of-cartridge control means which detects the presence of a cartridge on the rack by using said presence-of-cartridge sensor and, when there is no cartridge, pulls the cartridge into the accessor, and so judges that there is a cartridge on said rack when the cartridge can be pulled into the accessor.

(14) An apparatus for automatically conveying cartridges, comprising a cell mechanism 10 having racks capable of holding cartridges of recording media, an accessor mechanism having an accessor 8 for conveying the cartridges, and a conveyance control unit for controlling the conveyance of the cartridges by controlling said accessor mechanism, wherein said accessor 8 is provided with catcher hands 19 for gripping the cartridge, a catcher hand drive mechanism for driving said catcher hands 19, and a presence-of-cartridge sensor capable of detecting the cartridge on the rack of said cell mechanism and the position of the rack, and wherein said conveyance control unit is equipped with a rack position correction means which moves the accessor to the rack on which no cartridge is placed, detects the positions of the racks by using said presence-of-cartridge sensor to find a difference from the position where the rack should exist, and stores said difference in a memory as a correction value for positioning the accessor to the rack.

(15) An apparatus for automatically conveying cartridges, comprising a cell mechanism 10 having a rack capable of holding cartridges of recording media, an accessor mechanism having an accessor 8 for conveying the cartridges, and a conveyance control unit for controlling the conveyance of the cartridges by controlling said accessor mechanism, wherein said accessor 8 is provided with catcher hands 19 for gripping the cartridge and a catcher hand drive mechanism for driving said catcher hands 19, and wherein said apparatus for automatically conveying cartridges further comprises a manual accessor adjusting means for positioning the accessor at an optimum position of a rack by manual operation after the accessor is positioned to said predetermined rack being controlled by said conveyance control unit, a manual catcher hand operation means for confirming whether the rack position adjusted by said manual accessor adjusting means is an optimum rack position or not by opening/closing the catcher hands by manual operation, and a rack position correction determining means for so determining that the rack position be corrected to a proper position in a state where the accessor is located at an optimum rack position, enabling the rack position to be corrected by manual operation.

(16) An apparatus for automatically conveying cartridges disposed adjacent to a recording/reproducing apparatus, comprising a cell mechanism 10 having racks capable of holding cartridges of recording media to which the end portions are connected leader blocks, an accessor mechanism having an accessor 8 for conveying the cartridges, and a conveyance control unit for controlling the conveyance of the cartridges by controlling said accessor mechanism, wherein said accessor is provided with catcher hands 19 for gripping the cartridge and a catcher hand drive mechanism for driving said catcher hands 19, and wherein a leader block pushing member is provided to push said leader block into the cartridge, and said conveyance control unit is provided with a leader block push control means which causes said accessor to convey the cartridge to a position of the leader block pushing member, so that said leader block is pushed onto the leader block pushing member and is pushed into the cartridge.

(17) An apparatus for automatically conveying cartridges as described in (16) above, wherein said accessor 8 is provided with feeder belts for taking-in/discharging the cartridge, and a feeder belt drive means for driving said feeder belts, and said leader block push control means is provided with a control function which controls said feeder belt drive means to turn the feeder belts in a direction to discharge the cartridge, so that the leader block is pushed onto the leader block pushing member and is pushed into the cartridge.

(18) An apparatus for automatically conveying cartridges as described in (16) above, wherein said cell mechanism 10 is provided with an entry cell having a rack for holding a cartridge that is connected to a library unit but has not been processed yet and an exit cell having a rack for holding a cartridge that has been processed, and wherein when the cartridge being connected to the library unit is to be discharged into said exit cell, said leader block push control means necessarily pushes said leader block.

(19) An apparatus for automatically conveying cartridges as described in (16) above, wherein said conveyance control unit is provided with a control function which, when a cartridge is loaded into the recording/reproducing apparatus and a leader block that is pulled out is detected, pulls the cartridge discharged from the reproducing apparatus into the accessor, executes the leader block push control operation using said leader block push control means, and again loads the cartridge into which the leader block is pushed onto the recording/reproducing apparatus.

(20) An apparatus for automatically conveying cartridges, comprising a cell mechanism 10 capable of holding cartridges of recording media, an accessor mechanism having an accessor 8 for conveying the cartridges, and a conveyance control unit for controlling the conveyance of the cartridges by controlling said accessor mechanism, wherein said accessor 8 is provided with feeder belts for taking-in/discharging the cartridge and a feeder belt drive means for driving said feeder belts, and wherein said conveyance control unit is provided with a means for preventing the feeder belts from being worn out at the same portions which, in a state where there is no cartridge in said accessor, permits the feeder belts to run with no load being controlled by said feeder belt drive means, so that said feeder belts will not be worn out at the same portion only.

(21) An apparatus for automatically conveying cartridges, comprising a cell mechanism 10 having racks capable of holding cartridges, an accessor mechanism having an accessor 8 for conveying the cartridges, and a conveyance control unit for controlling the conveyance of the cartridges by controlling said accessor mechanism, wherein said accessor 8 is provided with feeder belts for taking-in/discharging the cartridge, feeder motors 23 for driving said feeder belts, a detector mechanism 1 of the rack side (first cell side sensor 38) and a detector mechanism 2 of the rack side (second cell side sensor 39) for detecting the presence of the cartridge in the accessor 8, wherein the cartridge is in a properly held state when it is detected by said detector mechanism 2 of the rack side but is not detected by said detector mechanism 1 of the rack side, and wherein said conveyance control unit is provided with a feeder learning control means which repeats the control operation which, when the cartridge is to be pulled from said rack, measures the time from when the cartridge is detected by the detector mechanism 1 of the rack side until when the cartridge is detected by the detector mechanism 2 of the rack side, compares the measured time with a preset basic time to find a difference between the two, adjusts a PWM (pulse width modulation) value for driving the feeder motors based upon the difference to obtain an adjusted PWM value, and adjusts a voltage to be fed to said feeder motors based upon said adjusted PWM value.

(22) An apparatus for automatically conveying cartridges disposed adjacent to a recording/reproducing apparatus, comprising a cell mechanism 10 capable of holding cartridges, an accessor mechanism having an accessor 8 for conveying the cartridges, and a conveyance control unit for controlling the conveyance of the cartridges by controlling said accessor mechanism, wherein said accessor 8 is provided with a detector mechanism 1 of the rack side and a detector mechanism 2 of the rack side for detecting the presence of the cartridge in the accessor 8, and wherein said conveyance control unit is provided with a cartridge initialization control means which, when the power source circuit is closed or an error has occurred, judges whether there is a cartridge in the accessor 8 or not by using the detector mechanism 1 of the rack side and the detector mechanism 2 of the rack side, and when it is so judged that there is no cartridge, pulls the cartridge from the recording/reproducing apparatus into the accessor 8 to judge whether there is a cartridge in the accessor or not, and informs a host unit of the result, so that the cartridge will not be lost.

(23) An apparatus for automatically conveying cartridges disposed adjacent to a recording/reproducing apparatus, comprising a cell mechanism 10 having racks capable of holding cartridges, an accessor mechanism having an accessor 8 for conveying the cartridges, and a conveyance control unit for controlling the conveyance of the cartridges by controlling said accessor mechanism, wherein said accessor 8 is provided with a feeder mechanism for taking-in/discharging the cartridge, and wherein said conveyance control unit is provided with a retry control means which, when an error has occurred in the feeding operation for pulling the cartridge into the accessor 8 or in the returning operation for discharging the cartridge into the recording/reproducing apparatus or onto the rack of the cell mechanism 10, executes a first retry operation and when an error has occurred as a result, brings the accessor to an upper position by a distance y (y is any predetermined distance) and executes a second retry operation and when an error has occurred as a result, executes a third retry operation and when an error has occurred as a result, brings the accessor to a lower position by the distance y from its initial position and executes a fourth retry operation and when an error has occurred as a result, executes a fifth retry operation and when an error has occurred as a result, positions the accessor to the recording/reproducing apparatus and then brings it to the initial position and executes a sixth retry operation and when an error has occurred as a result, then informs a host unit of an error, and ends the retry control operation.

(24) An apparatus for automatically conveying cartridges, comprising a cell mechanism 10 having racks capable of holding cartridges of recording media, an accessor mechanism having an accessor 8 for conveying the cartridges, and a conveyance control unit for controlling the conveyance of the cartridges by controlling said accessor mechanism, wherein said accessor 8 is provided with a cartridge return sensor which, when the cartridge is discharged from the accessor onto said rack, detects the discharged cartridge that has returned to said rack, and wherein said conveyance control unit is provided with a sensor function confirmation means which, when the power source circuit is closed or when the accessor has moved, confirms whether said cartridge return sensor is properly functioning or not.

(25) An apparatus for automatically conveying cartridges, comprising a cell mechanism 10 having racks capable of holding cartridges, an accessor mechanism having an accessor 8 for conveying the cartridges, and a conveyance control unit for controlling the conveyance of the cartridges by controlling said accessor mechanism, wherein said accessor 8 is provided with feeder belts for taking-in/discharging the cartridge, feeder motors 23 for driving said feeder belts, a detector mechanism 1 of the rack side and a detector mechanism 2 of the rack side for detecting the presence of the cartridge in the accessor 8, wherein the cartridge is in a properly held state when it is detected by said detector mechanism 2 of the rack side but is not detected by said detector mechanism 1 of the rack side, and wherein said accessor 8 is further provided with a cartridge return sensor which, when the cartridge is discharged from the accessor onto the rack, detects the discharged cartridge that has returned to said rack, wherein said conveyance control unit is provided with a cartridge overrun control means which, when the cartridge is to be discharged from the accessor onto said rack, stops said feeder motors 23 after the passage of a predetermined period of time from when the cartridge is discharged onto the rack and is no longer detected by said cartridge return sensor, so that the cartridge is discharged after having overrun a predetermined distance relative to the rack.

(26) An apparatus for automatically conveying cartridges, comprising a cell mechanism 10 capable of holding cartridges of recording media, an accessor mechanism having an accessor 8 for conveying the cartridges, and a conveyance control unit for controlling the conveyance of the cartridges by controlling said accessor mechanism, wherein said accessor 8 is provided with a logic invertor circuit for inverting the logic of a cable check signal at the other end of a cable that is connected to said accessor, and said conveyance control unit is provided with a new/old unit discrimination means which discriminates a new unit over an old unit by sending a cable check signal to the cable of the accessor 8 and by discriminating whether a response signal thereof is the one of which the logic is inverted by said logic invertor circuit or not.

Operation of the above-mentioned constitution of the present invention will now be described with reference to FIG. 2.

A1: Operation of the Above-mentioned Apparatus (1).

By using the data detected by the open detector mechanism and the closure detector mechanism, the catcher hand control means controls the catcher hands 19 of the accessor 8 to assume an open state, a closed state or a middle state which is between the open state and the closed state.

A2: Operation of the Above-mentioned Apparatus (2).

When the catcher hands 19 are to be controlled to the middle state, the PWM control unit causes the catcher hands 19 to assume the open state, so sets a PWM (pulse width modulation) value of a drive current to the catcher motor 21 smaller than an ordinary drive current, and drives the catcher motor 21 with said PWM value toward the closing direction at a speed slower than an ordinary speed until both said open detector mechanism and said closure detector mechanism assume the detection state.

A3: Operation of the Above-mentioned Apparatus (3).

The middle state-holding means continues to pass a very small current at an intensity with which the catcher hands 19 can be held in the middle state when the catcher middle state is detected from the catcher open state.

A4: Operation of the Above-mentioned Apparatus (4).

Only one flag piece is detected by the open detector mechanism in a state where the catcher hands 19 are opened, only one flag piece is detected by the closure detector mechanism in a state where the catcher hands 19 are closed, and separate flag pieces are detected by the open detector mechanism and by the closure detector mechanism in a state where the catcher hands 19 are in the middle state. The length of the flag piece detected by the closure detector mechanism in the middle state is longer than the lengths of other flag pieces. When the open detector mechanism is detecting the flag piece in the middle state, therefore, the closure detector mechanism necessarily detects the flag piece.

A5: Operation of the Above-mentioned Apparatus (5).

When the catcher hands 19 are to be driven first by closing the power source circuit, the catcher hand control means maintains the catcher hands 19 in the open state and, then, executes the catcher hand drive control operation.

A6: Operation of the Above-mentioned Apparatus (6).

The catcher hand control means works to hold the catcher hands 19 in the middle state after the cartridge is loaded into the recording/reproducing apparatus (e.g., MTU 6) but before the cartridge is discharged from the recording/reproducing apparatus.

A7: Operation of the Above-mentioned Apparatus (7).

The catcher hand control means moves the catcher hands 19 from the middle state to the open state after the cartridge has been loaded into the recording/reproducing apparatus in order to eliminate extra consumption of electric power.

B1: Operation of the Above-mentioned Apparatus (8).

When the power source circuit is closed, the sensor function confirmation means brings the accessor 8 to a rack position of the cell mechanism 10 and brings the presence-of-cartridge sensor to a position where the cartridge will not be detected, in order to make sure that the presence-of-cartridge sensor is properly functioning.

B2: Operation of the Above-mentioned Apparatus (9).

When the power source circuit is closed, the cartridge detection control means brings the accessor 8 to the rack of said entry cell and to the rack of said exit cell so that said presence-of-cartridge sensor detects the cartridge on the rack.

B3: Operation of the Above-mentioned Apparatus (10).

At the time of detecting the cartridge on each of the racks being controlled by said cartridge detection control means, the cartridge correction control means causes the catcher hands 19 to grip a cartridge on the rack in advance by taking into consideration the case where the cartridge may not have been properly placed on the rack, and permits the cartridge to be released, so that the cartridge is properly placed on the rack.

B4: Operation of the Above-mentioned Apparatus (11).

When a cartridge is to be discharged into the exit cell, the sensor function check means necessarily makes sure that there is a cartridge in the exit cell by using said presence-of-cartridge sensor and, when the cartridge in the exit cell is detected, checks if said presence-of-cartridge sensor is properly functioning.

B5: Operation of the Above-mentioned Apparatus (12).

The conveyance control unit confirms that the presence-of-cartridge sensor is functioning properly by using said sensor function check means and, when the presence-of-cartridge sensor is not functioning properly, informs a host unit of this fact and discharges the cartridge onto the exit rack and, when the presence-of-cartridge sensor is functioning properly, informs the host unit of the fact that a cartridge exists on the exit rack.

B6: Operation of the Above-mentioned Apparatus (13).

The presence-of-cartridge control means detects the presence of cartridges on the racks by using said presence-of-cartridge sensor and, when there is no cartridge, pulls the cartridge-into the accessor 8, and so judges that there is a cartridge on the rack when the cartridge can be pulled into the accessor 8.

C1: Operation of the Above-mentioned Apparatus (14).

The rack position correction means moves the accessor 8 to the rack on which no cartridge is placed, detects the positions of the racks by using said presence-of-cartridge sensor to find a difference from the position where the rack should exist, and stores the difference in a memory as a correction value for positioning the accessor 8 to the rack.

C2: Operation of the Above-mentioned Apparatus (15).

When the rack position is to be corrected by the manual operation, the accessor 8 is first brought to a predetermined rack position being controlled by the conveyance control unit and the accessor 8 is brought to the optimum rack position by the manual operation of the manual accessor adjusting means. Then, the catcher hands 19 are opened or closed by the manual operation of the manual catcher hand operation means to make sure that the rack position adjusted by the manual accessor adjusting means is an optimum rack position. In a state where the accessor 8 is brought to the optimum rack position, the position correction determining means is operated to effect the correction with the rack position as a correct position.

D1: Operation of the Above-mentioned Apparatus (16).

The leader block push control means causes the accessor 8 to convey the cartridge to a position of the leader block pushing member, so that said leader block is pushed onto the leader block pushing member and is pushed into the cartridge.

D2: Operation of the Above-mentioned Apparatus (17).

The leader block push control means controls the feeder belt drive means to turn the feeder belts in the direction of discharging the cartridge, so that the leader block is pushed onto the leader block pushing member and is pushed into the cartridge.

D3: Operation of the Above-mentioned Apparatus (18).

When the cartridge being connected to the library unit is to be discharged into said exit cell, said leader block push control means necessarily pushes said leader block.

D4: Operation of the Above-mentioned Apparatus (19).

When a cartridge is loaded into the recording/reproducing apparatus and a leader block that is pulled out is detected, the conveyance control unit once pulls the cartridge discharged from the reproducing apparatus into the accessor, executes the leader block push control operation using said leader block push control means, and loads again the cartridge into which the leader block is pushed onto the recording/reproducing apparatus.

E1: Operation of the Above-mentioned Apparatus (20).

In a state where there is no cartridge in the accessor 8, means for preventing the feeder belts from being worn out at the same portions permits the feeder belts to run with no load being controlled by said feeder belt drive means, so that said feeder belts will not be worn out at the same portions only.

F1: Operation of the Above-mentioned Apparatus (21).

When the cartridge is to be pulled from said rack, the feeder learning control means repeats the control operation in which the time is measured from when the cartridge is detected by the detector mechanism 1 of the rack side until when the cartridge is detected by the detector mechanism 2 of the rack side, the measured time is compared with a preset basic time to find a difference between the two, a PWM (pulse width modulation) value for driving the feeder motors is adjusted based upon the difference to obtain an adjusted PWM value, and a voltage to be fed to said feeder motors is adjusted based upon said adjusted PWM value.

G1: Operation of the Above-mentioned Apparatus (22).

When the power source circuit is closed or an error has occurred, the cartridge initialization control means judges whether there is a cartridge in the accessor 8 or not by using the detector mechanism 1 of the rack side and the detector mechanism 2 of the rack side, and when it is so judged that there is no cartridge, pulls the cartridge from the recording/reproducing apparatus into the accessor 8 to judge whether there is a cartridge in the accessor 8 or not, and informs a host unit of the result, so that the cartridge will not be lost.

H1: Operation of the Above-mentioned Apparatus (23).

When an error has occurred in the feeding operation for pulling the cartridge into the accessor 8 or in the returning operation for discharging the cartridge into the recording/reproducing apparatus or onto the rack of the cell mechanism 10, the retry control means executes a first retry operation and when an error has occurred as a result, brings the accessor to an upper position by a distance y (y is any predetermined distance) and executes a second retry operation and when an error has occurred as a result, executes a third retry operation and when an error has occurred as a result, brings the accessor to a lower position by the distance y from its initial position and executes a fourth retry operation and when an error has occurred as a result, executes a fifth retry operation and when an error has occurred as a result, positions the accessor on the recording/reproducing apparatus and brings it to the initial position and executes a sixth retry operation and when an error has occurred as a result, then informs a host unit of an error, and ends the retry control operation.

I1: Operation of the Above-mentioned Apparatus (24).

When the power source circuit is closed or when the accessor 8 has moved, the sensor function confirmation means confirms whether said cartridge return sensor is properly functioning or not.

J1: Operation of the Above-mentioned Apparatus (25).

When the cartridge is to be discharged from the accessor 8 onto said rack, the cartridge overrun control means stops the feeder motors 23 after the passage of a predetermined period of time from when the cartridge is discharged onto the rack and is no longer detected by said cartridge return sensor, so that the cartridge is permitted to overrun a predetermined distance relative to the rack and is discharged.

K1: Operation of the Above-mentioned Apparatus (26).

The new/old unit discrimination means discriminates a new unit over an old unit by sending a cable check signal to the cable of the accessor 8 and by discriminating whether a response signal thereof is the cable check signal inverted by said logic invertor circuit or not.

Description of Other Portions (1) Controlling the Catcher to Assume the Middle State—refer to A1 to A7 Above.

The above descriptions A1 to A7 are concerned with controlling the catcher hands 19 to assume the middle state. By placing the catcher hands 19 in a middle state which is an intermediate position, the cartridge can be loaded/discharged into the rack by the operator without any trouble, and the apparatus for automatically conveying the cartridges can be operated more efficiently. When connected to the library unit, the entry cell can be brought to a position of the same height as the recording/reproducing apparatus (MTU 6), and the time for conveying the cartridge can be shortened. This makes it possible to enhance the performance of the apparatus.

(2) Detecting the Presence of the Cartridge—refer to B1 to B6.

The above descriptions B1 to B6 are related to detecting the presence of a cartridge. When a cartridge exists on the rack of the exit cell, it is not possible to discharge the cartridge in the recording/reproducing apparatus (MTU 6). However, if the presence-of-cartridge detector mechanism is not working properly, it may appear that the cartridge is present on the rack of the exit cell though it is really not present thereon.

Therefore, when the cartridge must be discharged onto the exit cell when the cartridge is present on the rack of the exit cell, the library unit is not stopped at once but, instead, it is confirmed whether the presence-of-cartridge detector mechanism is functioning properly or not.

When the presence-of-cartridge detector mechanism is not functioning properly, the cartridge is discharged onto the rack of the exit cell and, then, the library unit is stopped to convey the cartridge on the side of the library unit to the other recording/reproducing apparatus (MTU 6). Thus, the library unit itself is not stopped, and the performance of the apparatus is enhanced and the apparatus can be operated unattended.

When the cartridge was loaded onto the rack in an inclined manner, the cartridge, could not be detected and could not be processed. According to the present invention, however, the cartridge is gripped again by the catcher hands 19 and is placed straight relative to the rack without creating an error. Thus, the cartridge that could not be accessed can now be accessed.

(3) Correcting the Position the Rack of the Cell Mechanism—refer to C1 and C2 Above.

The above descriptions C1 and C2 are related to correcting the rack position. In order to correct the rack position, the accessor 8 is brought to a correct position relative to each of the racks at all times. This makes it easy to pull the cartridge or to discharge the cartridge. Besides, since dispersion in the mounting of the racks or dispersion in the racks themselves can be absorbed by the firmware, the apparatus can be assembled requiring decreased amounts of laborious work. This contributes to decreasing the cost of the apparatus and improving the reliability of the apparatus.

(4) Pushing in the Leader Block—refer to D1 to D4 Above.

The above descriptions D1 to D4 are related to pushing in the leader block. The present invention makes it possible to push in the leader block even for a cartridge from which the leader block has been pulled out and which could not be processed. Therefore, the processing can be continued. Even when the cartridge is connected to the library unit, the apparatus can be operated without being attended. Moreover, the leader block that has been pulled out does not cause error, and the reliability of the apparatus can be improved.

(5) Preventing the Feeder Belts from Being Worn out at the Same Portions—refer to E1 Above.

The above description E1 is related to preventing the feeder belts from being worn out at the same portions. Therefore, the feeder belts are not partly worn out but are entirely worn out. This enables the life of the belts to be lengthened compared with when the belts are worn out only partly, and hence the life of the accessor 8 is extended. In maintaining the apparatus, therefore, the belts need be renewed less frequently and the amount of work can be decreased.

(6) Controlling the Feeder Learning—see F1 Above.

The above description F1 is related to controlling the feeder learning. The speed of the feeder motors 23 is controlled to remain constant at all times, and the overrunning amount can be set to be constant after the feeder motors 23 are stopped. With the overrunning amount being set to be constant even when the cartridge is to be pulled into the accessor 8 from the rack, the cartridge can be correctly pulled into the accessor 8 at all times. This eliminates the time for retries and, hence, makes it possible to shorten the time for accessing the cartridge.

Besides, the cartridge that is returned back to the rack overruns a predetermined amount and, hence, flies a predetermined amount. Therefore, the motor is stopped after a predetermined period of time has passed from when the cartridge is no longer detected by the detector mechanism 2 of the rack side relying upon a simple control operation.

(7) Initializing the Cartridge—Refer to G1 Above.

The above description G1 is related to initializing the cartridge. When the power source circuit is closed or an error has occurred, the presence of the cartridge in the accessor 8 is confirmed without breaking the cartridge, without damaging the apparatus and without missing the cartridge. Thus, reliability of the apparatus is enhanced.

(8) Retrying the Feeder Mechanism—refer to H1 Above.

The above description H1 is related to retrying the feeder mechanism. The retrying operation of the present invention makes it possible to recover from an erroneous state. It does not happen that the cartridge is not accessible, and reliability is improved. Even when connected to the library unit, it does not happen that the apparatus cannot access the cartridge, and the apparatus as a whole is not stopped.

(9) Returning the Cartridge—refer to I1 Above.

The above description is concerned with returning the cartridge. When the cartridge that was being returned back to the rack was not detected by the detector mechanisms 1, 2 of the rack side, there was a probability that the cartridge may be missed even when it is not properly placed on the cell. According to the present invention, however, the cartridge is not missed and reliability is improved.

(10) Controlling the Position of the Cartridge—see J1 Above.

The above description J1 is related to controlling the position of cartridge. According to the present invention, the cartridge after being processed is popped up more toward the rack than the cartridge that has not been processed, and the operator is allowed to discern at a glance whether the cartridge has been processed or not. This contributes to greatly enhancing the operation efficiency.

(11) Discriminating the Type of the Apparatus—see K1 Above.

The above description K1 is related to discriminating the type of the apparatus. The type of the accessor 8 is automatically discriminated by the firmware. Therefore, the operator need not set the kind of the accessor. Even when the operator has forgotten the setting, it does not matter. Thus, one firmware suffices.

BRIEF DESCRIPTION OF THE DRAWINGS

The present invention will be more clearly understood from the description as set forth below with reference to the accompanying drawings, wherein:

FIG. 1B is a side view of a conventional ACL apparatus for a single unit;

FIG. 9 is a diagram illustrating a system constitution according to the embodiment;

FIGS. 16A to 16C are side views of the accessor according to the embodiment;

FIG. 25 is a flowchart for opening the catcher hands from the catcher closed state according to the embodiment;

FIG. 27 is a flowchart of when the catcher hands are to be closed from the catcher open state according to the embodiment;

FIG. 30A to 30C are flowcharts for detecting the presence of cartridge when the power source circuit is closed (when connected to a library unit) according to the embodiment;

FIG. 44 is a flowchart of a process for retrying the feeder mechanism the sixth time according to the embodiment;

DESCRIPTION OF THE PREFERRED EMBODIMENTS

An embodiment of the present invention will now be described in detail with reference to the drawings. The ACL (automatic cartridge loading) apparatus that will be described below is either an ACL apparatus for a single unit or an ACL apparatus for attachment to a library unit. The ACL apparatus for a single unit is used in combination with the MTU and automatically conveys the cartridge to the MTU. The ACL apparatus for attachment to a library unit is used in combination with the MTU and is further coupled to a library unit. The accessor mechanism in the ACL apparatus is common for the ACL apparatus for a single unit and for the ACL apparatus for attachment to a library unit.

§1: Constitution of the ACL Apparatus for a Single Unit, see FIGS. 3 to 4B.

Figure 3:
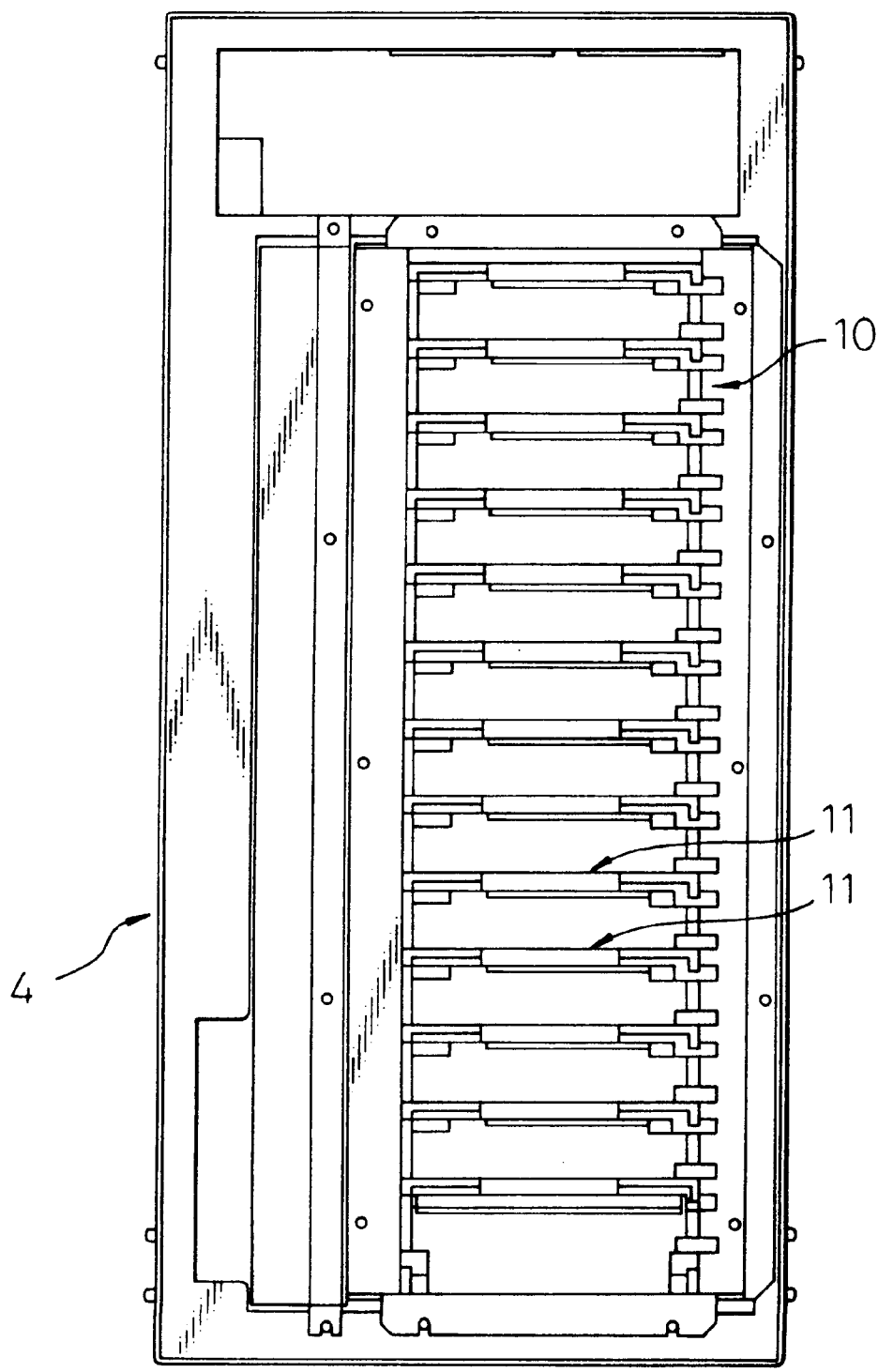
FIG. 3 is a front view of an ACL apparatus for a single unit according to an embodiment.
Figure 4A:
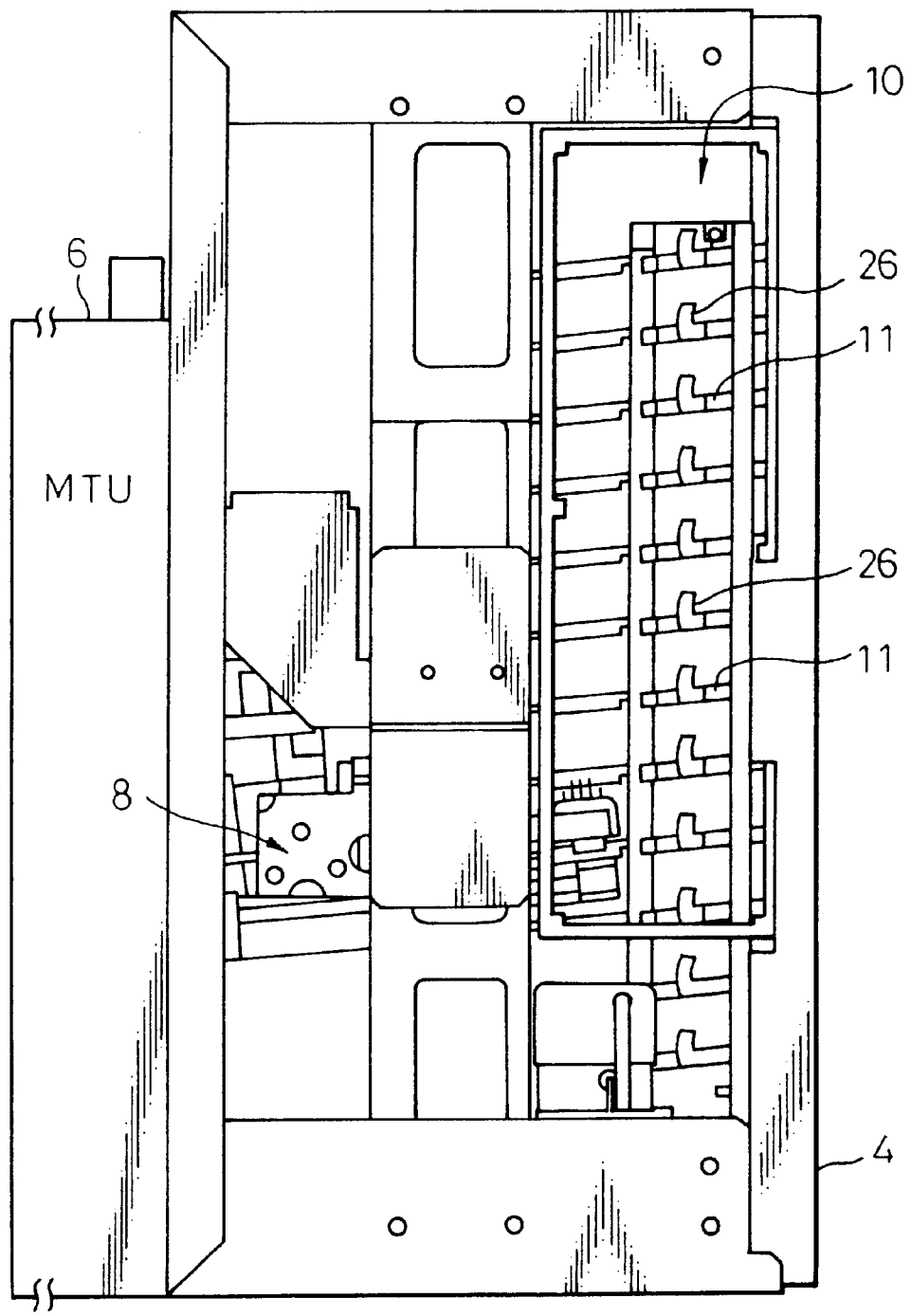
FIG. 4A is a side view of the ACL apparatus for a single unit according to the embodiment.
Figure 4B:
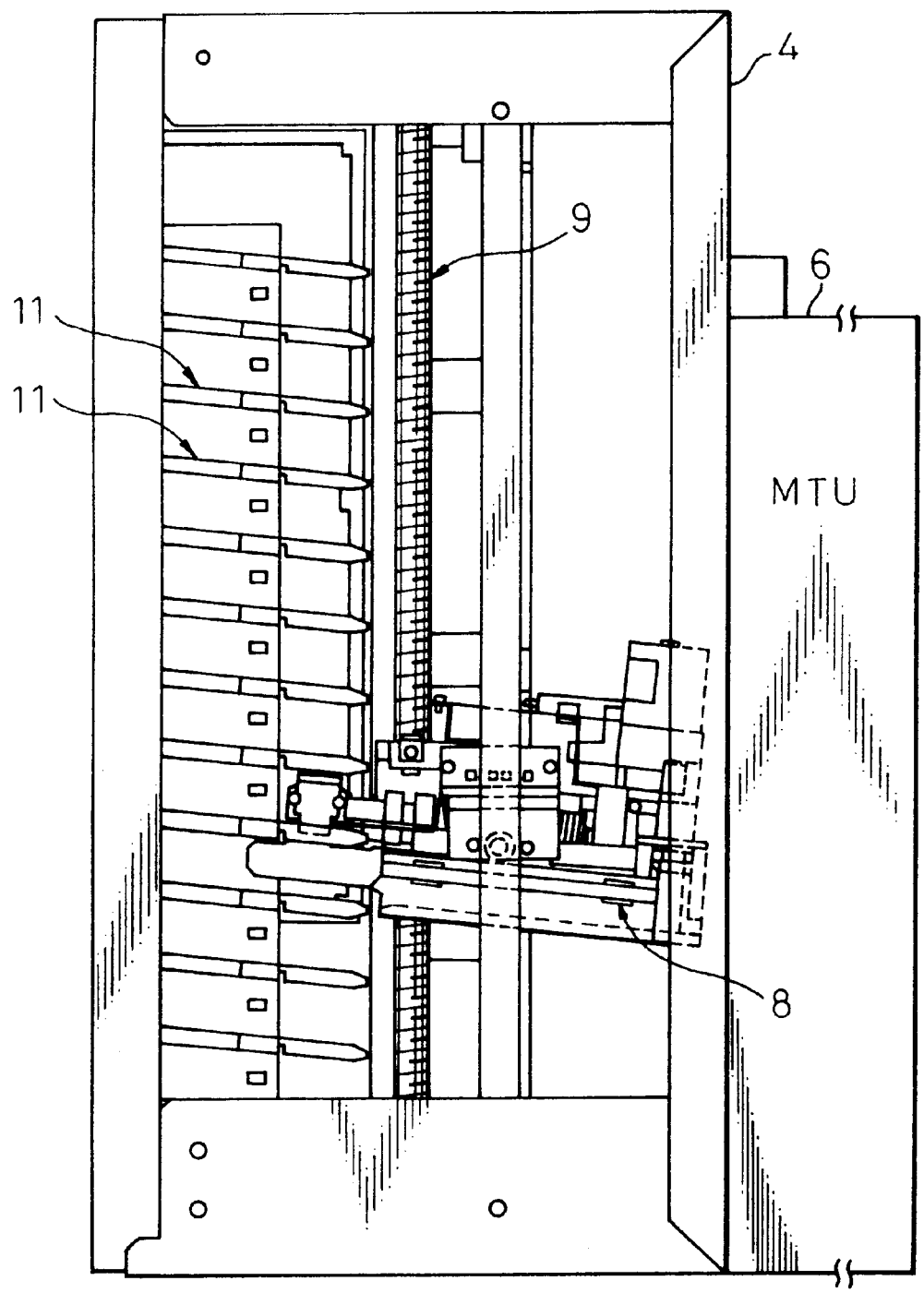
FIG. 4B is a side view of the ACL apparatus for a single unit according to the embodiment.

FIG. 3 is a front view of an ACL apparatus for a single unit, FIG. 4A is a side view 1 of the ACL apparatus for a single unit, and FIG. 4B is a side view 2 of the ACL apparatus for a single unit. The constitution of the ACL apparatus 4 for a single unit will now be described with reference to FIGS. 3 to 4B.

The ACL apparatus 4 for a single unit is combined with the MTU (magnetic tape unit) 6 as a unitary structure, the MTU 6 being disposed on the side of the back surface of the ACL apparatus 4 for a single unit. In the ACL apparatus 4 for a single unit are provided a cell mechanism 10 and an accessor mechanism, the cell mechanism 10 being disposed on the side of the front surface and the accessor mechanism being disposed on the back side of the cell mechanism 10. In this case, the accessor mechanism is disposed between the cell mechanism 10 and the MTU 6.

The cell mechanism 10 is provided with many racks (or cells) 11, and a cartridge will be held in each of these racks 11. Many rails are provided running up and down maintaining a predetermined distance on both inner sides of the side plates constituting the cell mechanism 10, and rack plates are inserted along these rails to constitute the racks 11. A flag 26 for detecting the presence of a cartridge is provided at a portion of the racks 11.

The plurality of racks 11 of the cell mechanism 10 permit the operator to insert or discharge the cartridge from the outer side (from the front side) by hand. In the ACL apparatus 4 for a single unit, the accessor mechanism takes out the cartridge from the rack and conveys it to the MTU 6, or conveys the cartridge processed by the MTU 6 and discharges it onto the rack 11.

The accessor mechanism is constituted by an accessor 8 which grips a cartridge and moves to convey it, a shaft 9 for raising/lowering the accessor 8, a motor for raising/lowering the accessor, a belt and gears.

§2: Constitution of the ACL Apparatus for Attachment to a Library Unit—see FIGS. 5 to 7.

Figure 5:
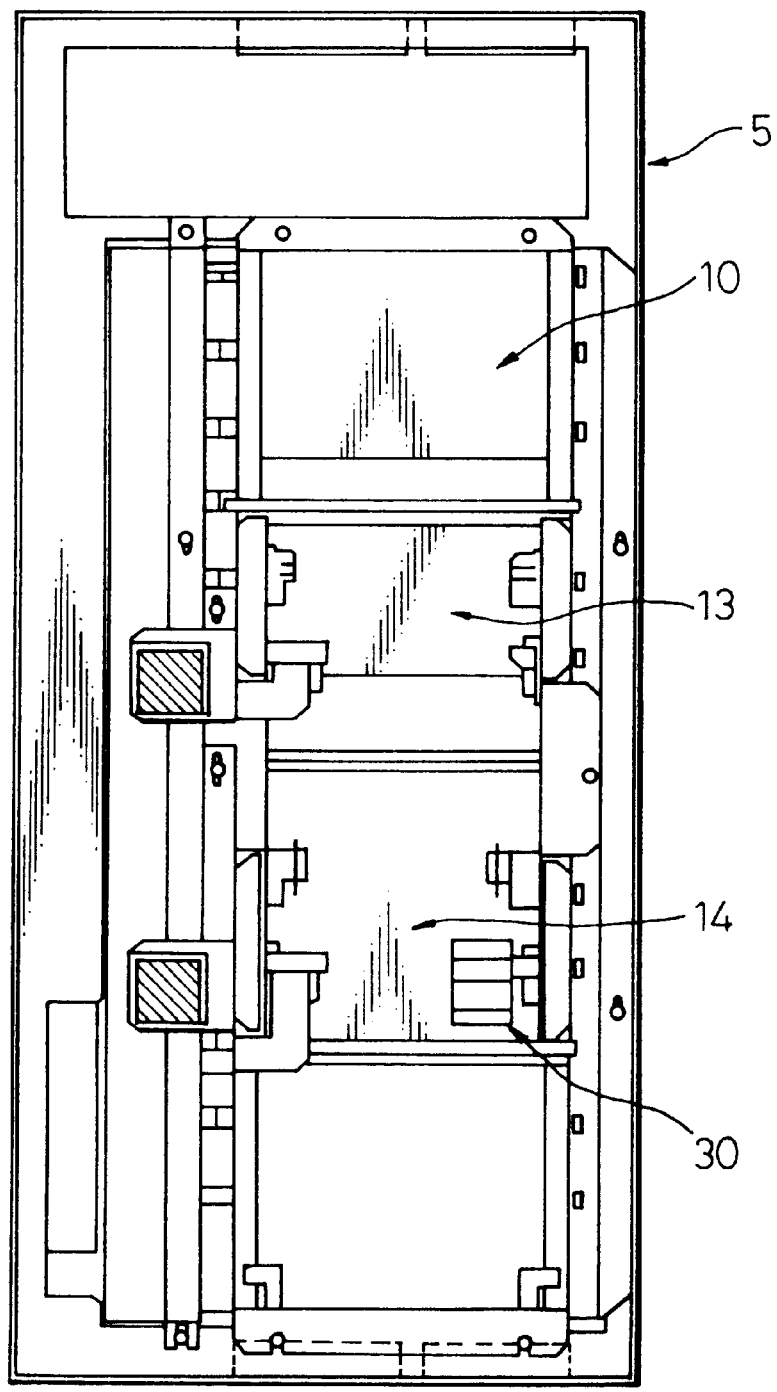
FIG. 5 is a front view of an ACL apparatus for attachment to a library unit according to the embodiment.
Figure 6:
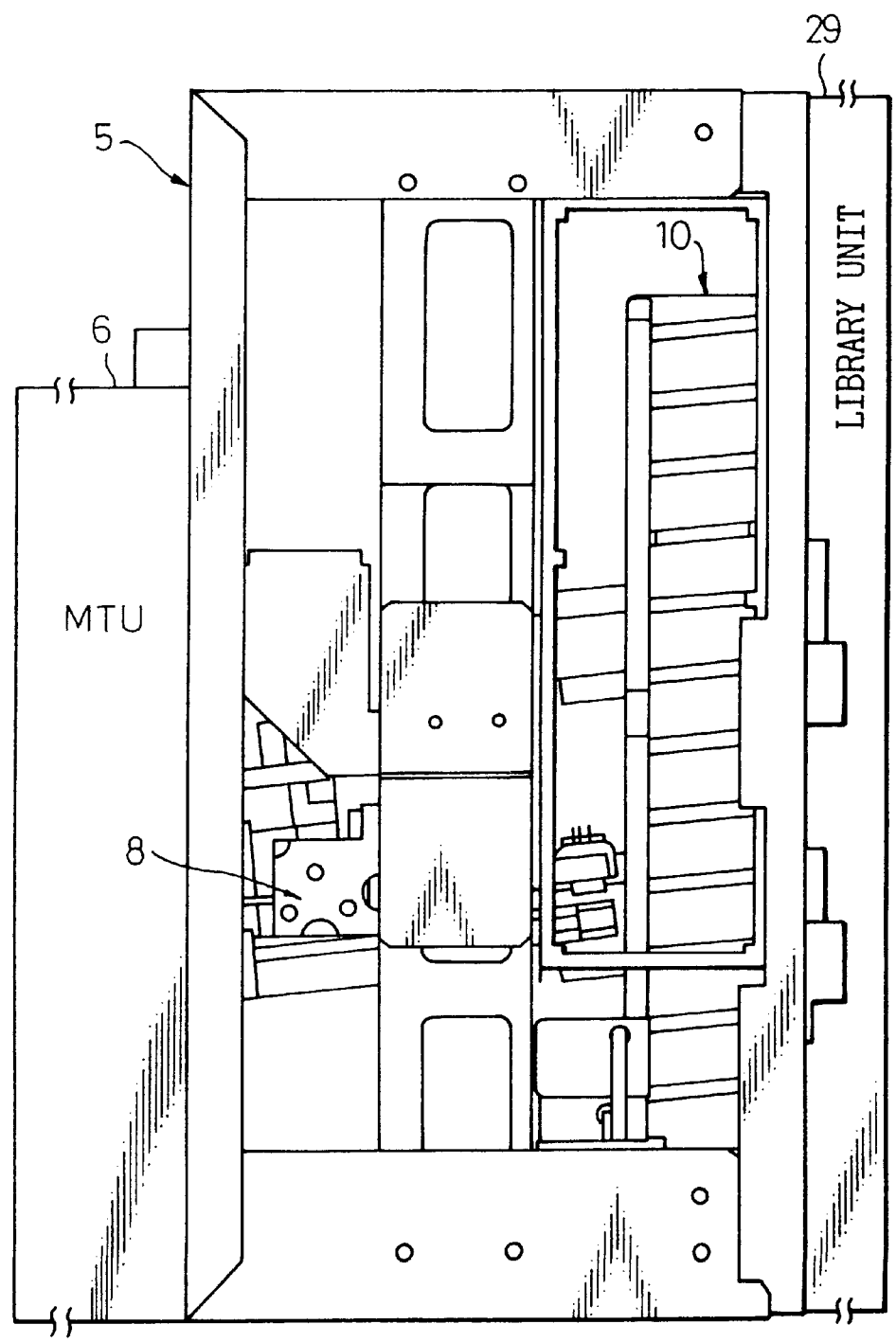
FIG. 6 is a side view of the ACL apparatus for attachment to a library unit according to the embodiment.
Figure 7:
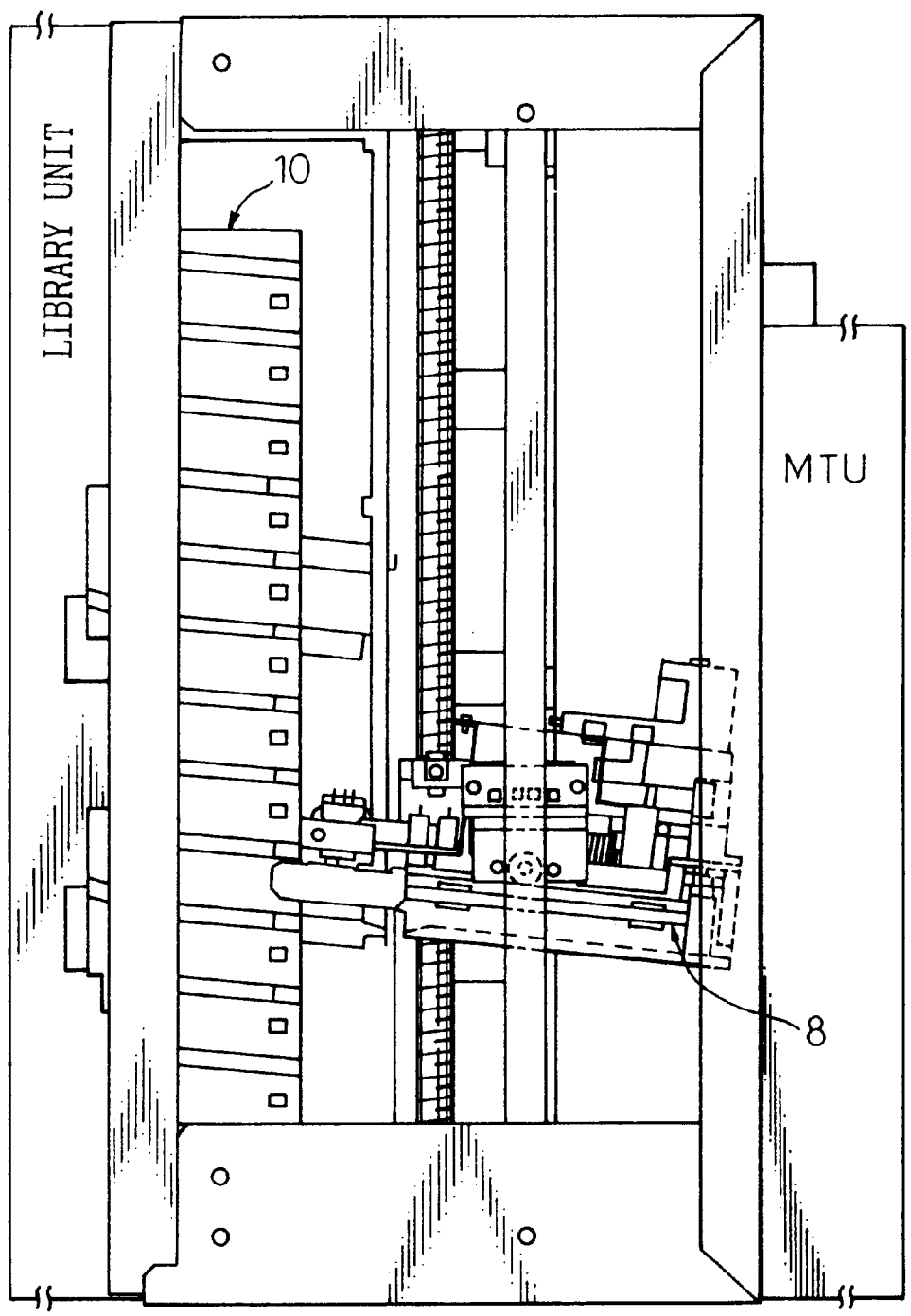
FIG. 7 is a side view of the ACL apparatus for attachment to a library unit according to the embodiment.

FIG. 5 is a front view of the ACL apparatus for attachment to a library unit, FIG. 6 is a side view 1 of the ACL apparatus for attachment to a library unit, and FIG. 7 is a side view 2 of the ACL apparatus for attachment to a library unit. Constitution of the ACL apparatus for attachment to a library unit will now be described with reference to FIGS. 5 to 7.

The ACL apparatus 5 for attachment to a library unit is combined with the MTU (magnetic tape unit) 6 as a unitary structure and is mechanically (detachably) coupled to a library unit 29. Here, the ACL apparatus 5 for attachment to a library unit is provided with the cell mechanism 10 and the accessor mechanism, the cell mechanism 10 being disposed on the side of the library unit 29 and the accessor mechanism being disposed on the side of the MTU 6.

The cell mechanism 10 is provided with an entry cell 13 and an exit cell 14. The entry cell 13 and the exit cell 14 have constitutions corresponding to the cell mechanism 10 of the ACL apparatus 4 for a single unit but in which a rack plate is provided at a position of the entry cell 13 and a rack plate is provided at a position of the exit cell 14, and the rack plates are removed from other portions. Therefore, the entry cell 13 has one rack and the exit cell 14 has one rack.

The ACL apparatus 5 for attachment to a library unit has the library unit 29 coupled to the side of the cell mechanism 10 and has the MTU 6 provided on the side of the accessor mechanism, so that the cartridge can be automatically handed over from the library unit 29 through the cell mechanism 10. The accessor mechanism is the same as that of the ACL apparatus 4 for a single unit.

The entry cell 13 is an inlet port for inserting the cartridge from the side of the library unit 29, and the exit cell 14 is a discharge port for discharging the cartridge processed by the MTU 6 through the ACL apparatus 5 for attachment to a library unit. The ACL apparatus 5 for attachment to a library unit has a leader block pushing member 30 at a position (MTU 6 side) of a height of the exit cell 14 to push the leader block.

§3: Leader Block Pushing Member—see FIGS. 8A to 8C.

Figure 8A:
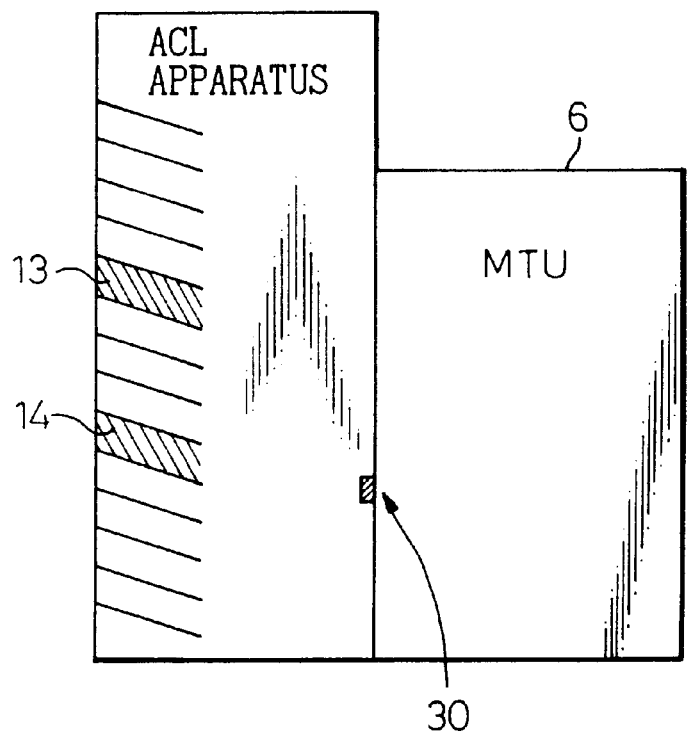
FIGS. 8A to 8C are diagrams of a leader block pushing member according to the embodiment.
Figure 8C:
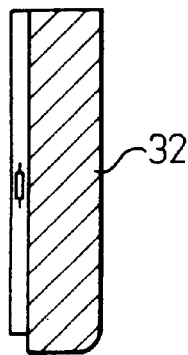
Figure 8B:
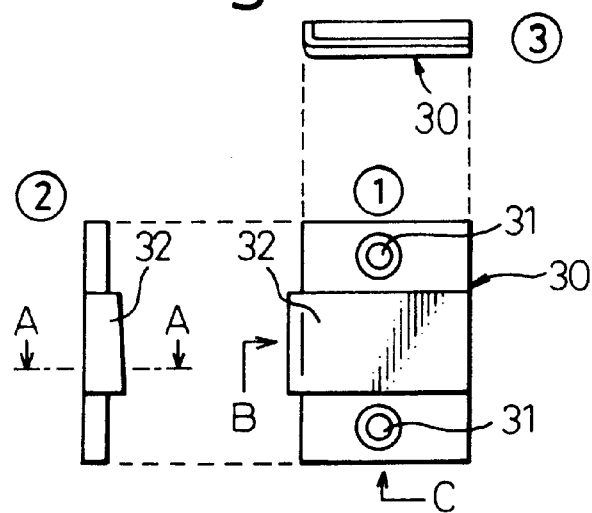

FIGS. 8A to 8C are diagrams illustrating a leader block pushing member, wherein the FIG. 8A is a general view and the diagram B is a detailed view. In FIG. 8B, ① is a plan view of the leader block pushing member, ② is a side view of the view ① in the B-direction, ③ is a side view of the view ① in the C-direction, and FIG. 8C is an A—A cross section of the view ①.

As shown, the ACL apparatus 5 for attachment to a library unit is provided with a leader block pushing member 30 in a portion of the side of the MTU 6 at the height of the exit cell 14. When the leader block has been pulled out from the cartridge, the leader block pushing member 30 brings the accessor 8 that is gripping the cartridge to the position of the exit cell (same position as the leader block pushing member 30), pushes the leader block of the cartridge into the cartridge.

The leader block pushing member 30 is a plate-like member, has a protruded portion 32 at the center thereof, and has holes 31 in both sides thereof for attachment. Screws are inserted in the holes 31 to secure it to a portion of the ACL apparatus 5 for attachment to a library. The protruded portion 32 is pushed onto the leader block of the cartridge to push it thereinto.

§4: Constitution of a System Using the ACL Apparatus for Attachment to a Library Unit—see FIGS. 9 to 11.

Figure 10:
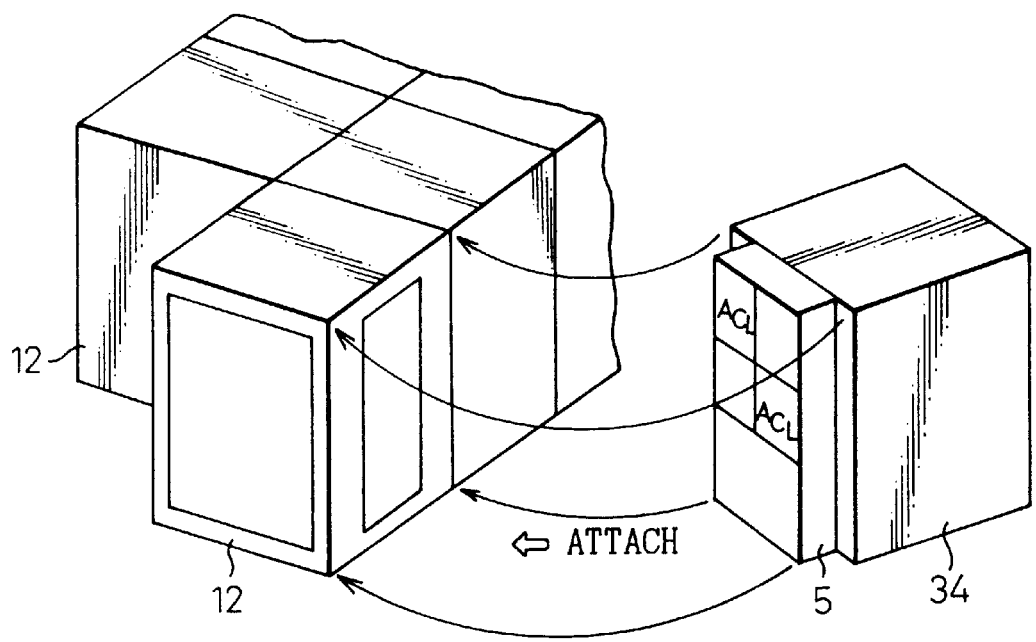
FIG. 10 is a diagram illustrating the system constitution according to the embodiment.
Figure 11:
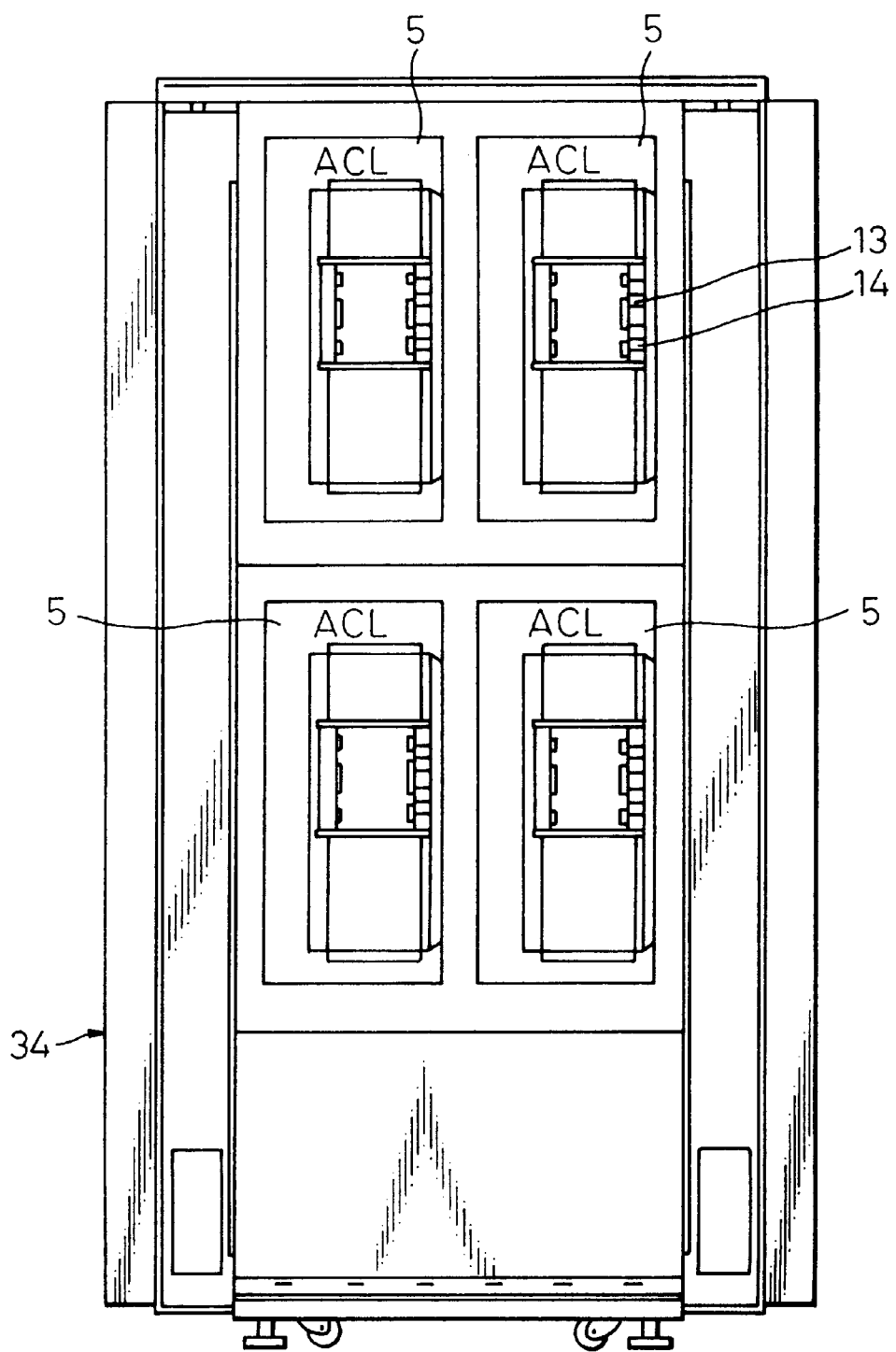
FIG. 11 is a diagram illustrating the system constitution according to the embodiment.

FIG. 9 is a diagram 1 illustrating a system constitution, FIG. 10 is a diagram 2 illustrating the system constitution, and FIG. 11 is a diagram 3 illustrating the system constitution. Described below with reference to FIGS. 9 to 11 is the system constitution using the ACL units 5 for attachment to a library unit.

In this system, provision is made of a plurality of MTU units 34 each mounting four MTU's and ACL apparatuses 5 for attachment to a library unit for each of the MTU's, the MTU units 34 being coupled to the library unit 29 using screws.

In this system, therefore, each MTU unit 34 is provided with four ACL apparatuses 5 for attachment to a library unit, and the library unit 29 is provided with an entry cell 13 and an exit cell 14. In this embodiment, furthermore, the library unit 12 is divided into a plurality of units which are combined together to constitute a system.

In this case, the library unit 12 is equipped with a cell (rack) mechanism for storing a number of cartridges, a plurality of MTU units (magnetic tape units), an accessor mechanism for automatically conveying cartridges to the cell mechanism and to the MTU units, and a cartridge access station (CAS) for automatically loading and discharging the cartridges.

When this system is used, the processing is executed as described below. That is, when it is desired to process the cartridge stored on the side of the library unit 12 by an MTU on the side of the MTU unit 34, the accessor mechanism in the library unit 12 conveys the cartridge and inserts it in the entry cell 13 of the ACL apparatus 5 for attachment to a library unit. Thereafter, the cartridge in the entry cell 13 is conveyed by the accessor mechanism in the ACL apparatus 5 for attachment to a library unit, inserted in the MTU in the MTU unit 34, and is subjected to the read/write processing.

The cartridge after the processing is conveyed by the accessor mechanism in the ACL apparatus 5 for attachment to a library unit and is discharged onto the exit cell 14. Thereafter, the cartridge is taken out from the exit cell 14 by the accessor mechanism in the library unit 12 and is stored in the cell mechanism in the library unit 12.

§5: Constitution of the MTU Unit Using the ACL Apparatus for a Single Unit—see FIGS. 12 and 13.

Figure 12:
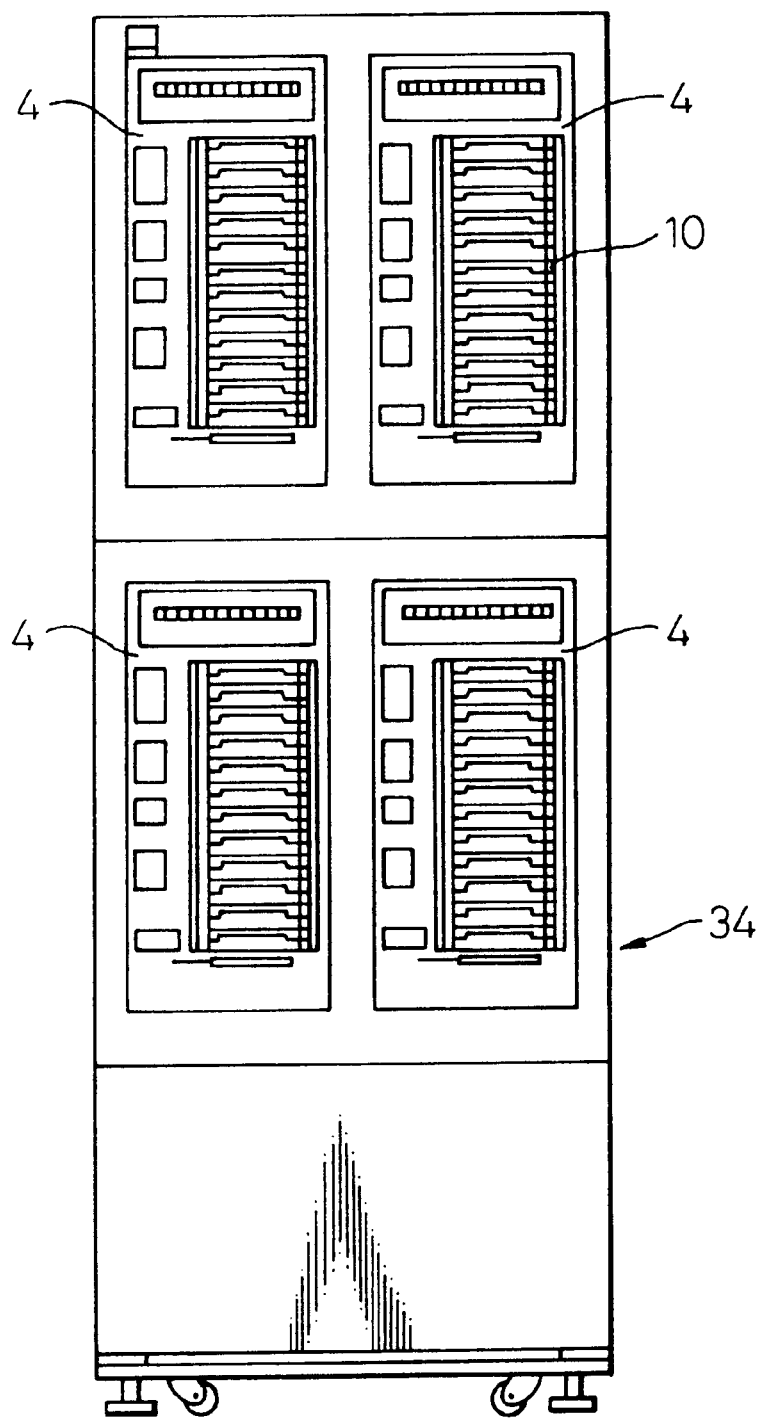
FIG. 12 is a diagram illustrating the constitution of an MTU according to the embodiment.
Figure 13:
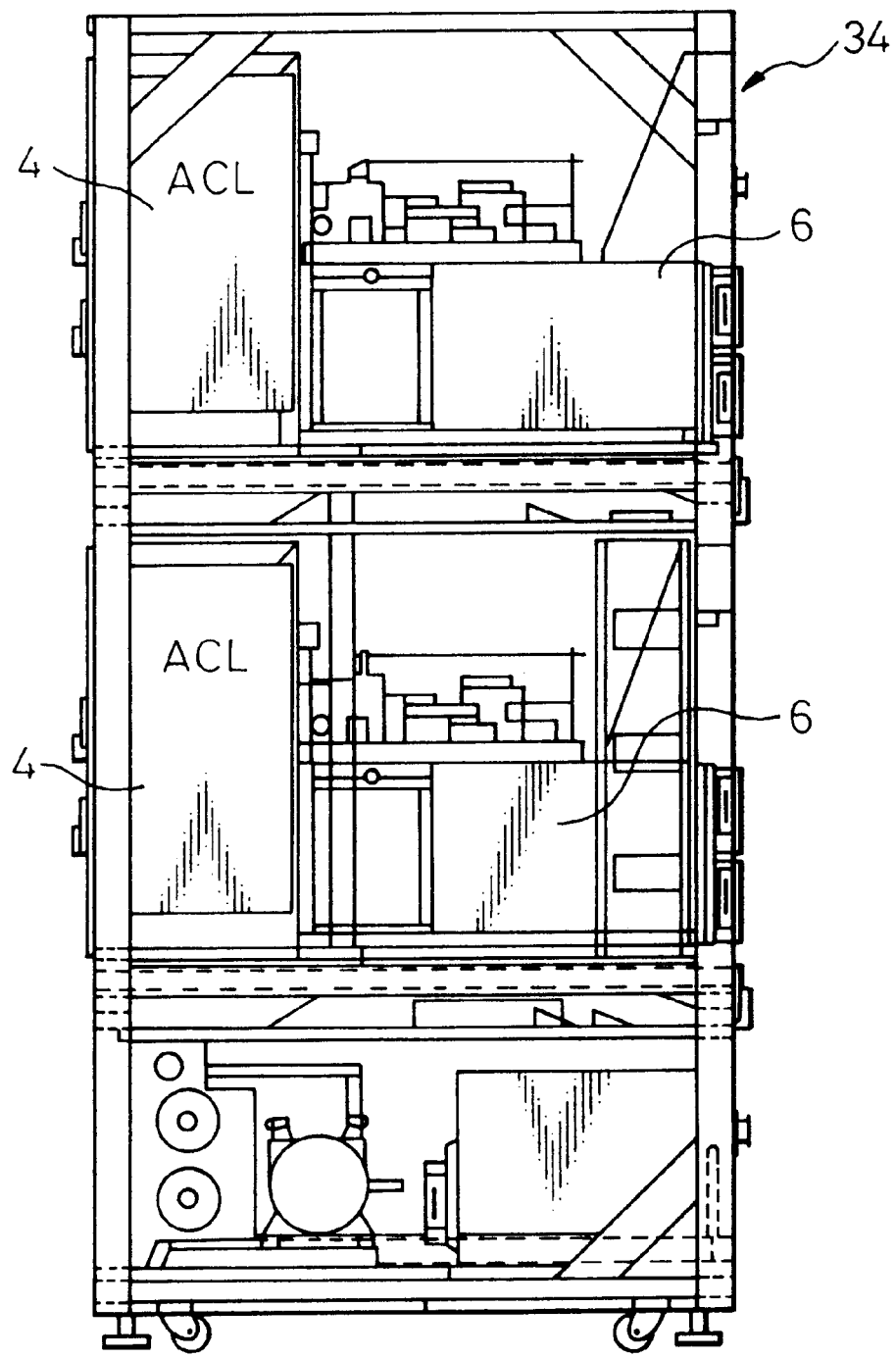
FIG. 13 is a diagram illustrating the constitution of the MTU according to the embodiment.

FIG. 12 is a diagram 1 illustrating the constitution of the MTU unit, and FIG. 13 is a diagram 2 illustrating the constitution of the MTU unit. Described below with reference to FIGS. 12 and 13 is the constitution of the MTU unit using the ACL apparatus for a single apparatus.

In this embodiment, four MTUs 6 are installed in the MTU unit 34 and an ACL apparatus 4 suitable for a single unit is attached to each MTU 6 as a unitary structure. In this case, two MTUs 6 are installed in the upper side in the housing constituting the MTU unit 34, two MTUs 6 are installed in the lower side, and the ACL apparatus 4 for a single unit is mechanically attached to the front surface sides of each MTUs 6.

Each ACL apparatus 4 for a single unit is provided with a cell mechanism 10 having a number of racks, and a cartridge can be inserted in each of the racks of the cell mechanism 10. That is, a cartridge that is to be processed is inserted by hand in each rack of the cell mechanism 10, and a cartridge that has been processed is taken out by hand from each of the racks of the cell mechanism 10.

The arrangement of the MTU's 6 in the MTU apparatus 34 (constitution other than the ACL apparatus 4 for a single unit) is the same as that of the MTU unit 34 in the system using the ACL apparatuses 5 for attachment to a library unit.

§6: Accessor—see FIGS. 14 to 20F.

Figure 14:
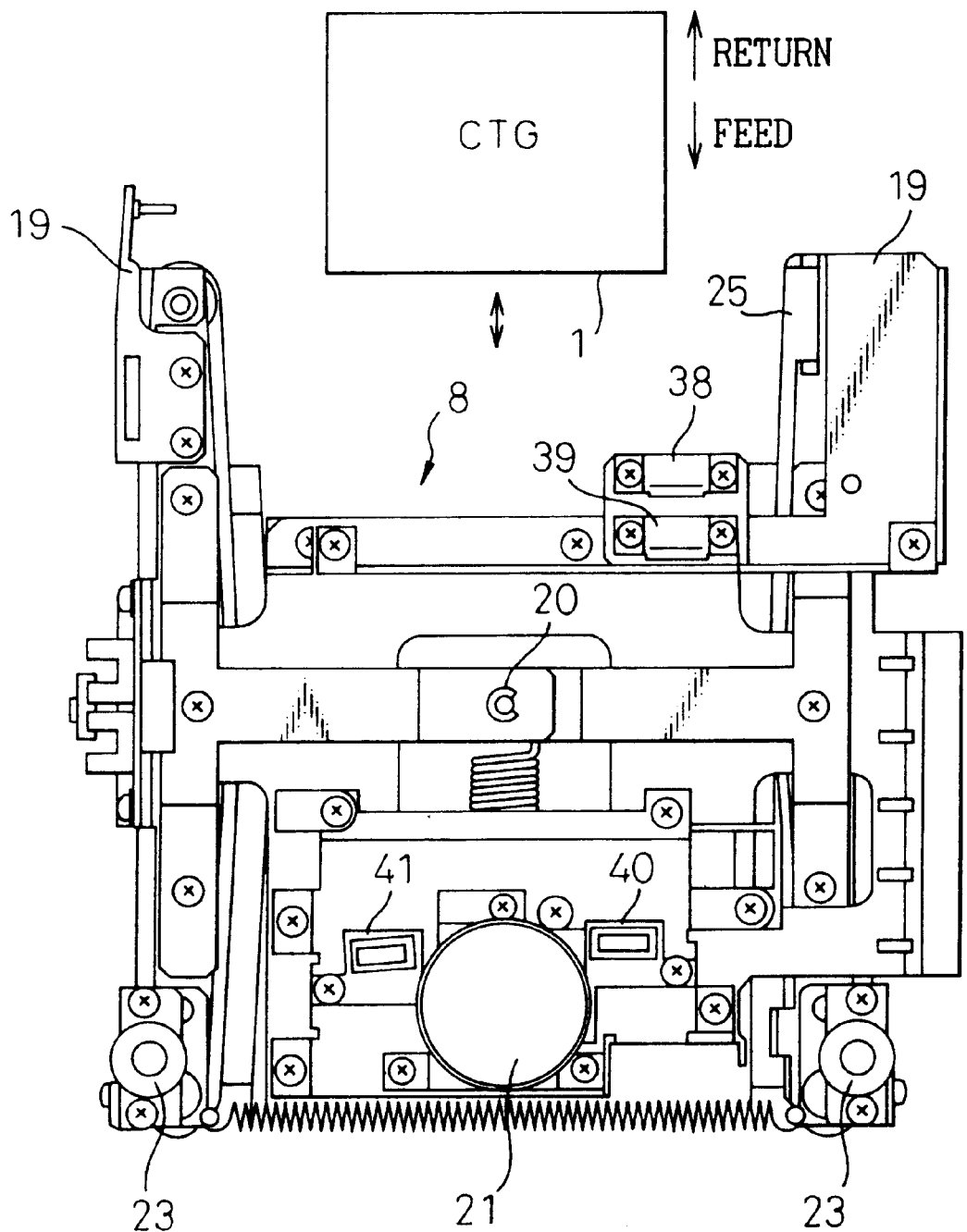
FIG. 14 is a plan view of an accessor according to the embodiment.
Figure 15:
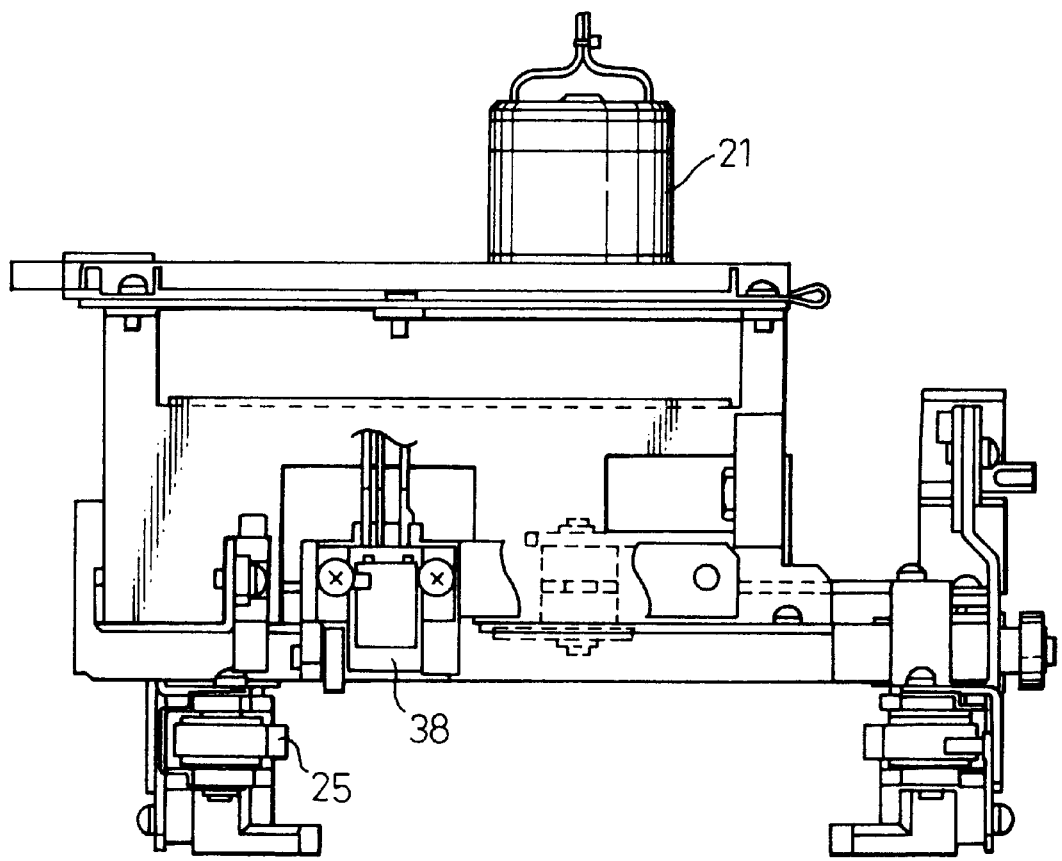
FIG. 15 is a front view of the accessor according to the embodiment.
Figure 17:
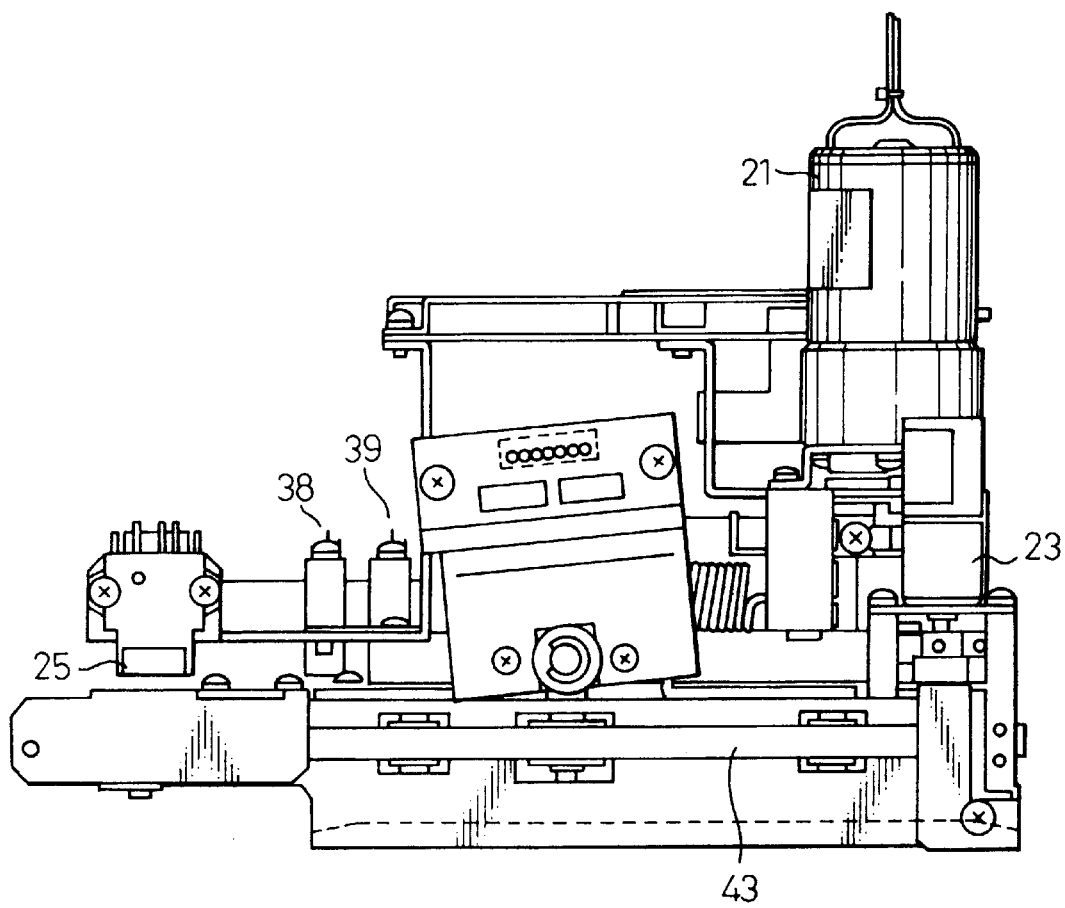
FIG. 17 is a side view of the accessor according to the embodiment.
Figure 18:
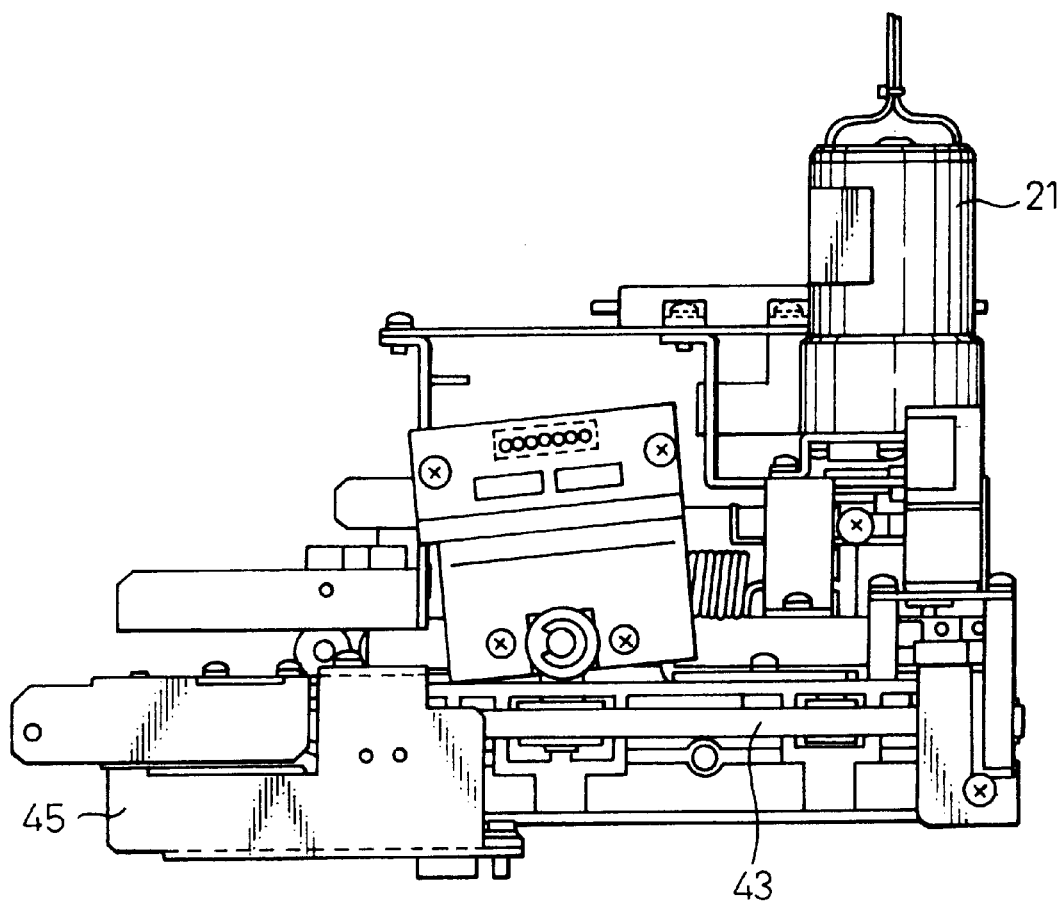
FIG. 18 is a side view of the accessor according to the embodiment.

FIG. 14 is a plan view of an accessor, FIG. 15 is a front view of the accessor, FIG. 16 is a side view 1 of the accessor, FIG. 17 is a side view 2 of the accessor, FIG. 18 is a side view 3 of the accessor, FIG. 19 is a diagram illustrating a cartridge return sensor, and FIG. 20 is a diagram illustrating the operation of the accessor. The constitution and function of the accessor will now be described with reference to FIGS. 14 to 20F.

The accessor mechanism is provided with an accessor 8 which grips a cartridge and moves to convey it. The accessor 8 is provided with catcher hands 19, a catcher motor 21, feeder motors 23 (two), a presence-of-cartridge sensor 25, a first cell side sensor 38, a second cell side sensor 39, a catcher open sensor 40, a catcher close sensor 41, feeder belts 43, a catcher open/close sensor flag 44, a cartridge return sensor 45, and a cartridge return detector flag 46.

The accessor 8 does not turn on a horizontal plane but ascends or descends being driven by the motor provided on the accessor mechanism. One of the catcher hands 19 provided in the accessor 8 faces the cell mechanism 10 and the other one faces the MTU 6. The catcher hands 19 are driven to assume a catcher open state, a catcher middle state or a catcher closed state. The catcher open state and the catcher closed state are always reversed depending upon the side of the cell mechanism 10 and the side of the MTU 6. Described below are the functions of the above-mentioned portions.

(1) The catcher hands 19 grip or release the cartridge. The catcher hands 19 are driven by the catcher motor 21, and turn about a center shaft 20 to assume the catcher open state (FIGS. 20A and 20B), a catcher middle state (FIGS. 20C and 20D) or a catcher closed state (FIGS. 20E and 20F).

The operation in this case is based on the side of the cell mechanism 10. In the catcher open state, the side of the cell mechanism is opened and the side of the MTU 6 is closed. In the catcher closed state, the side of the cell mechanism 10 is closed and the side of the MTU 6 is opened. In the catcher middle state, furthermore, both the side of the cell mechanism 10 and the side of the MTU 6 are in the catcher middle state.

In the following description, the "catcher open state" stands for a state where the side of the cell mechanism 10 is opened and the side of the MTU 6 is closed, and the "closed state" stands for a state where the side of the cell mechanism 10 is closed and the side of the MTU 6 is opened.

(2) The catcher motor 21 drives the catcher hands 19. That is, by changing the direction of rotation and the rotational position of the catcher motor 21, the catcher hands 19 are opened, closed, or brought to the middle state.

(3) The feeder motors 23 change the direction of rotation (clockwise/counterclockwise) and drive the feeder belts 43, in order to pull (feed) a cartridge on the rack of the cell mechanism 10 into the accessor 8 or to discharge (return) the cartridge from the accessor onto a rack of the cell mechanism 10.

(4) The presence-of-cartridge sensor 25 detects a cartridge on a rack of the cell mechanism 10. The presence-of-cartridge sensor 25 is further capable of detecting a rack of the cell mechanism 10. The detection of deviation of rack position is utilized for correcting the rack position when the accessor 8 is to be positioned to the rack.

(5) The first cell side sensor 38 and the second cell side sensor 39 detect whether there is a cartridge in the accessor 8 or not. Furthermore, these sensors are used for detecting the cartridge at the time when it is being pulled/discharged (fed/returned).

(6) The catcher open sensor 40 detects the open state of the catcher hands 19 in response to the motion of the catcher open/close sensor flag 44, and comprises a light-emitting portion and a light-receiving portion. The catcher open sensor 40 is turned on when a flag piece (described later) of the catcher open/close sensor flag 44 is inserted between the light-emitting portion and the light-receiving portion, and is turned off when the flag piece is in a state of not being inserted between the light-emitting portion and the light-receiving portion.

(7) The catcher closure sensor 41 detects the closed state of the catcher hands 19 in response to the motion of the catcher open/close sensor flag 44, and comprises a light-emitting portion and a light-receiving portion. The catcher closure sensor 41 is turned on when a flag piece (described later) of the catcher open/close sensor flag 44 is inserted between the light-emitting portion and the light-receiving portion, and is turned off when the flag piece is in a state of not being inserted between the light-emitting portion and the light-receiving portion.

(8) The catcher open/close sensor flag 44 is driven by the catcher motor 21, and is detected by the catcher open sensor 40 or the catcher closure sensor 41 (see FIGS. 16B and 16C, and FIGS. 20A to 20F).

A center shaft 50 is provided in the body of the catcher open/close sensor flag 44, and is rotated by the catcher motor 21. About the center shaft 50 are provided a first flag piece 51, a second flag piece 52 and a third flag piece 53 maintaining a gap of about 90°.

In this case, when the first flag piece 51 has a length L1, the second flag piece 52 has a length L2 and the third flag piece 53 has a length L3, then a relationship L1=L3<L2 is maintained. That is, the second flag piece 52 has the length L2 longer than the lengths L1, L3 of other flag pieces.

Figure 20A:
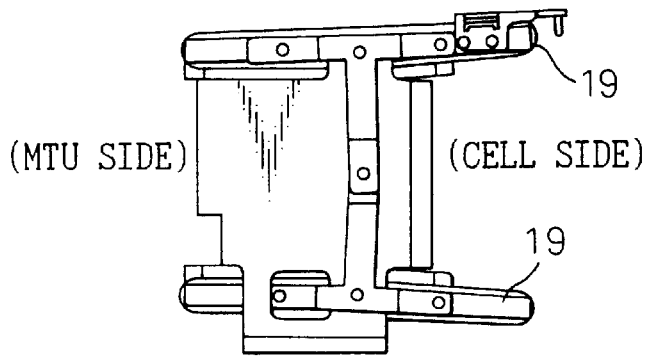
FIGS. 20A to 20F are diagrams illustrating the operation of the accessor according to the embodiment.
Figure 20B:
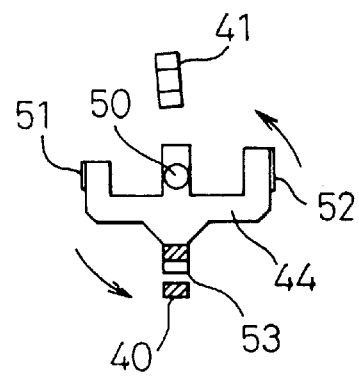

In the catcher open state (catcher motor 21 is at rest) shown in FIGS. 20A and 20B, the catcher open/close sensor flag 44 is at a position shown. In this case, the catcher open sensor 40 is turned on upon detecting the third flag piece 53, and the catcher closure sensor 41 remains turned off upon detecting none of the flag pieces.

Figure 20C:
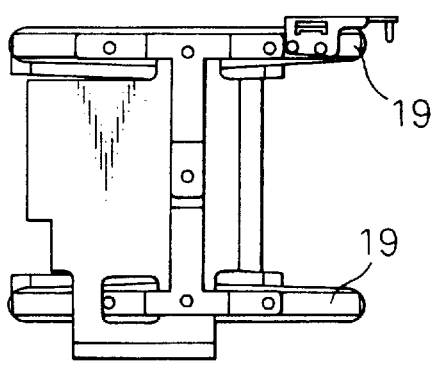
Figure 20D:
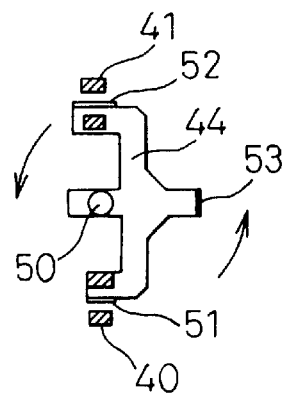
Figure 20E:
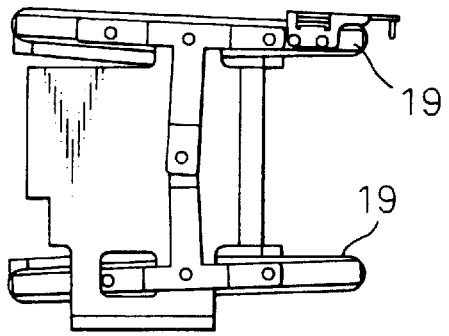
Figure 20F:
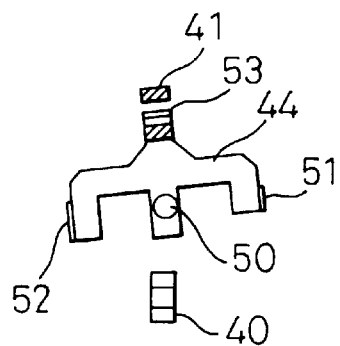

As the catcher open/close sensor flag 44 turns in the direction of arrow from the above-mentioned state and assumes the catcher middle state as shown in FIGS. 20C and 20D, the catcher open sensor 40 is turned on upon detecting the first flag piece 51, and the catcher closure sensor 41 is turned on upon detecting the second flag piece 52. As the catcher open/close sensor flag 44 further rotates from this state into the catcher closed state shown in FIGS. 20E and 20F, the catcher open sensor 40 is turned off upon detecting none of the flag pieces, and the catcher closure sensor 41 is turned on upon detecting the third flag piece 53.

(9) The feeder belts 43 are driven by the feeder motors 23. Accompanying the motion of the feeder belts 43, the cartridge is pulled (fed) into the accessor 8 or is discharged (returned) onto the rack of the cell mechanism 10. The feeder belts 43 are provided on the right side and on the left side, and are driven by the right and left feeder motors 23 to carry out the opening/closing operation together with the catcher hands 19.

When, for example, the cartridge is fed (pulled into the accessor 8) from the cell mechanism 10, the catcher hands 19 are closed to grip the cartridge which is then conveyed into the accessor 8 by turning the feeder belts 43 (the cartridge is conveyed by the frictional force of the feeder belts 43) and is fed.

When the cartridge is to be returned (discharged from the accessor 8) onto the rack of the cell mechanism 10, furthermore, the catcher hands 19 are closed and the feeder belts 43 are turned in the direction opposite to that of the feeding thereby to return the cartridge.

(10) The cartridge return sensor 45 and cartridge return detector flag 46 are provided near the end of the catcher hands 19, and detect the cartridge that is discharged (returned) from the accessor 8. The cartridge return sensor 45 and the cartridge return detector flag 46 are constructed as shown in FIGS. 19A to 19D.

Figure 19A:
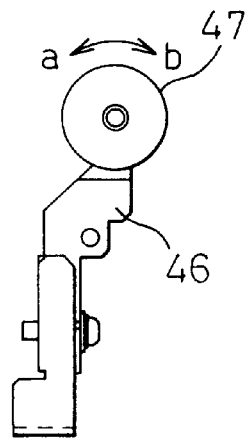
FIGS. 19A to 19D are diagrams of a cartridge return sensor according to the embodiment.
Figure 19B:
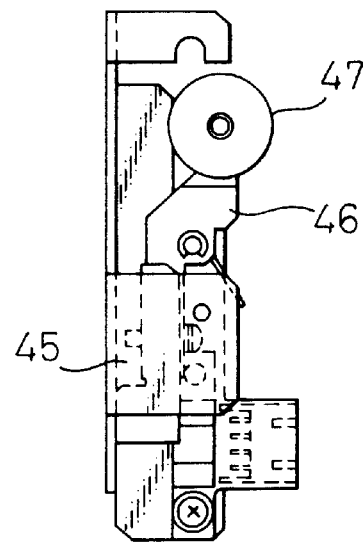
Figure 19C:
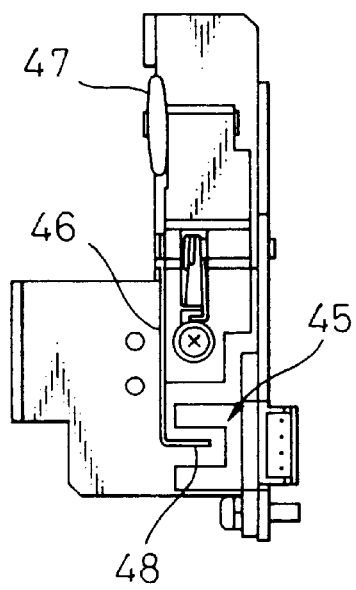
Figure 19D:
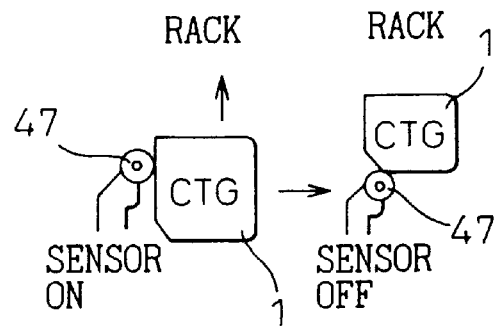

As shown, a flag roller 47 is provided at the end of the cartridge return detector flag 46, and is allowed to turn in the directions of arrows a and b in FIG. 19A. When there is no cartridge at the position of the flag roller 47, the flag roller 47 turns in the direction b due to the restoring force of a return spring.

As the cartridge comes to the position of the flag roller 47, the flag roller 47 is pushed by the cartridge and turns in the direction a. Furthermore, at the rear end of the flag roller 47 is provided a flag end piece 48 that is bent at right angles with respect to the main body of the flag roller 47. The flag end piece 48 turns in a direction opposite to the flag roller 47.

That is, the cartridge return detector flag 46 is supported to turn about the center shaft between the flag roller 47 and the flag end piece 48, and the flag roller 47 and the flag end piece 48 are turned in the opposite directions by the cartridge.

The cartridge return sensor 45 is an optical sensor comprising a light-emitting portion and a light-receiving portion, and the flag end piece 48 of the cartridge return detector flag 46 is inserted or not inserted between the light-emitting portion and the light-receiving portion. When the flag end piece 48 is inserted between the light-emitting portion and the light-receiving portion, the light from the light-emitting portion no longer falls on the light-receiving portion, and the sensor is turned off. When the flag end piece 48 is not inserted between the light-emitting portion and the light-receiving portion, the sensor is turned on.

When the cartridge is discharged (returned) from the accessor 8 onto the rack of the cell mechanism 10, the side surface of the cartridge first pushes the flag roller 47 toward the direction as it is being discharged, whereby the flag roller 47 turns in the direction a. In this case, the flag end piece 48 is not inserted between the light-emitting portion and the light-receiving portion, and the cartridge return sensor 45 is turned on.

Next, as the cartridge is discharged onto the rack of the cell mechanism 10, the flag roller 47 is no longer pushed by the cartridge and turns in the direction b. Therefore, the flag end piece 48 is inserted between the light-emitting portion and the light-receiving portion, and the cartridge return sensor 45 is turned off.

§7: The Whole System for Controlling MTUs and ACL Apparatuses—see FIG. 21.

Figure 21:
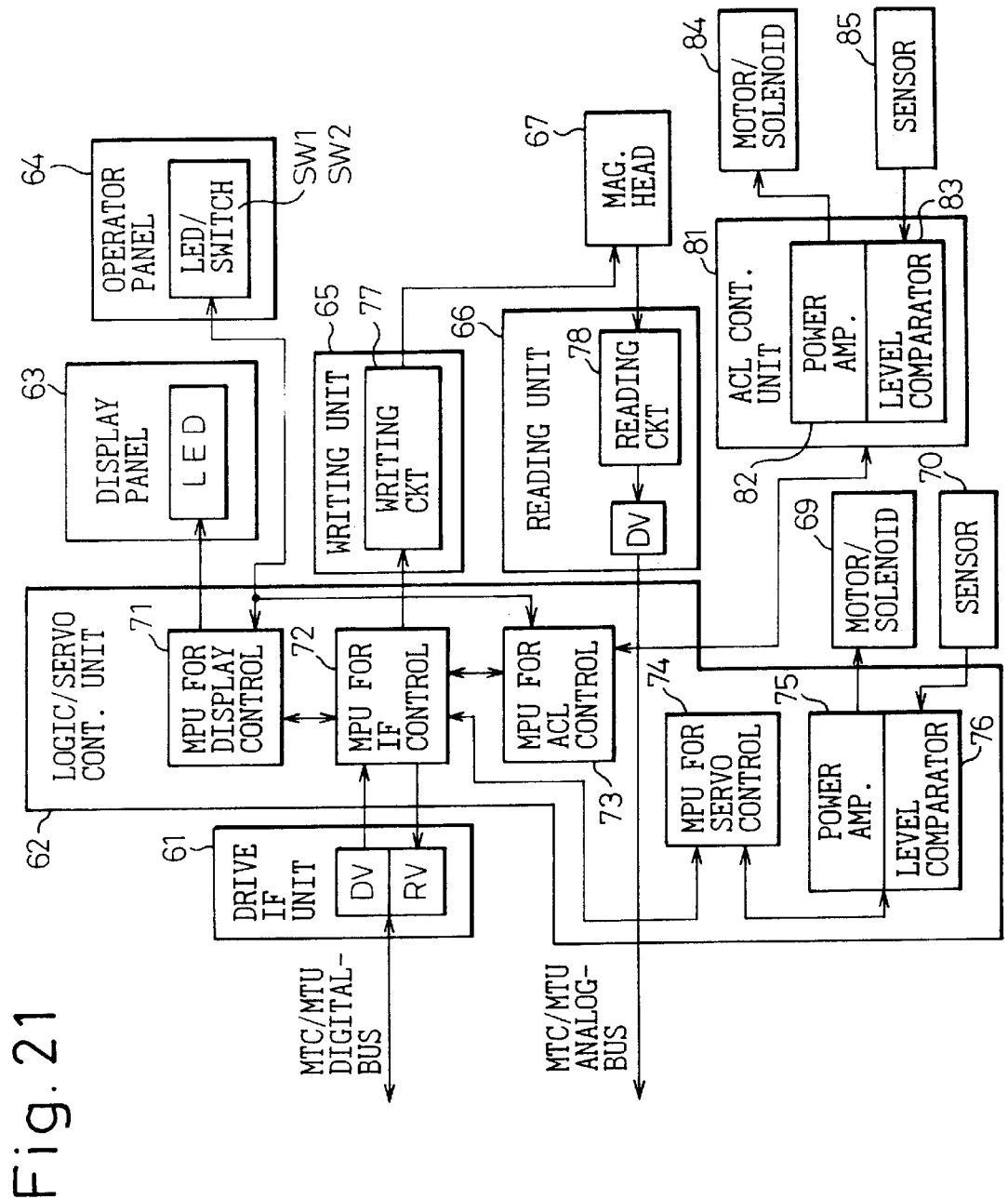
FIG. 21 is a block diagram of a system for controlling MTUs and ACC apparatuses according to the embodiment.

FIG. 21 is a block diagram of a system for controlling MTUs and ACL apparatuses. The whole system for controlling MTUs and ACL apparatuses will now be described with reference to FIG. 21. The system for controlling the ACL apparatus 4 for a single unit and the system for controlling the ACL apparatus 5 for attachment to a library unit are nearly the same (a system for controlling data to the library unit is different). In the following description, therefore, they are simply described as "ACL apparatuses".

As shown, the system for controlling the MTUs and the ACL apparatuses is provided with a drive IF unit 61, a logic/servo control unit 62, a writing unit 65, a reading unit 66, and an ACL. control unit 81. In this case, the drive IF unit 61, the logic/servo control unit 62, the writing unit 65 and the reading unit 66 are in the control system of the MTU side, and the ACL control unit 81 is in the control system of the ACL apparatus side.

Furthermore, the drive IF unit 61 is provided with a driver DV and a receiver RV. The logic/servo control unit 62 is provided with an MPU 71 for display control, an MPU 72 for IF control, an MPU 73 for ACL control, an MPU 74 for servo control, a power amplifier 75 and a level comparator 76. The writing unit 65 is provided with a writing circuit 77, the reading unit 66 is provided with a driver DV and a reading circuit 78, and the ACL control unit 81 is provided with a power amplifier 82 and a level comparator 83.

In the control system, a display panel 63 and an operator panel 64 are connected to the MPU 71 for display control, a magnetic head 67 is connected to the writing circuit 77 and to the reading circuit 78, a motor/solenoid 69 is connected to the power amplifier 75, a sensor 70 is connected to the level comparator 76, a motor/solenoid 84 is connected to the power amplifier 82, and a sensor 85 is connected to the level comparator 83.

Furthermore, the drive IF unit 61 is connected to an MTC (magnetic tape control unit that is not shown) through an MTC/MTU digital bus, and the driver DV in the reading unit 66 is connected to the MTC through an MTC/MTU analog bus.

Described below are the functions of the above-mentioned portions.

(1) The drive IF unit 61 is connected to the MTC (magnetic tape control unit) via the MTC/MTU digital bus, exchanges commands and data through the driver DV and the receiver RV, and executes a variety of interface control operations (control operations of the drive side) relative to other MTCs.

(2) The logic/servo control unit 62 exchanges commands and data relative to the drive IF unit 61 in order to carry out a variety of control operations.

(3) The MPU 71 for display control executes a variety of control operations for the display panel 63 and for the operator panel 64.

(4) The MPU 72 for IF control exchanges commands and data relative to the drive IF unit 61 in order to carry out a variety of interface control operations.

(5) The MPU 73 for ACL control executes an ACL control operation through the ACL control unit 81.

(6) The MPU 74 for servo control executes a variety of servo control operations.

(7) The power amplifier 75 drives the motor/solenoid 69 upon receiving a control signal from the MPU 74 for servo control.

(8) The level comparator 76 compares a detection signal from the sensor 70 with a reference level, and takes out a sensor detection signal larger than the reference level.

(9) The writing unit 65 includes the writing circuit 77, is controlled by the MPU 72 for IF control, and transfers the data to the magnetic head 67 in order to write them onto a magnetic tape.

(10) The reading circuit 66 includes a driver DV and a reading circuit 78, and reads the data from the magnetic tape through the magnetic head 67. The data read out from the magnetic tape are transferred by the driver DV to the MTC through the MTC/MTU analog bus.

(11) The ACL control unit 81 carries out a variety of control operations for the ACL apparatus upon receiving instructions from the MPU 73 for ACL control. The ACL control unit 81 is provided with a power amplifier 82 and a level comparator 83. The power amplifier 82 drives the motor/solenoid 84, and the level comparator 83 compares a detection signal of the sensor 85 with a reference level to take out a sensor detection signal larger than the reference level.

(12) The display panel 63 is constituted by, for example, a liquid crystal display panel (LED) and displays various data being controlled by the MPU 71 for display control.

(13) The operator panel 64 has a liquid display panel (LED) and various switches, and is operated by an operator. The operator panel is provided with switches SW1, SW2, etc.

(14) The magnetic head 67 writes/reads the data onto or from the magnetic tape (recording medium).

(15) The motor/solenoid 69 represents various motors and solenoids provided in the MTU.

(16) The sensor 70 represents various sensors provided in the MTU 6.

(17) The motor/solenoid 84 represents motors and solenoids provided in the ACL apparatus.

(18) The sensor 85 represents various sensors provided in the ACL apparatus.

§8: Detailed Description of the ACL Control Unit—see FIG. 22.

Figure 22:
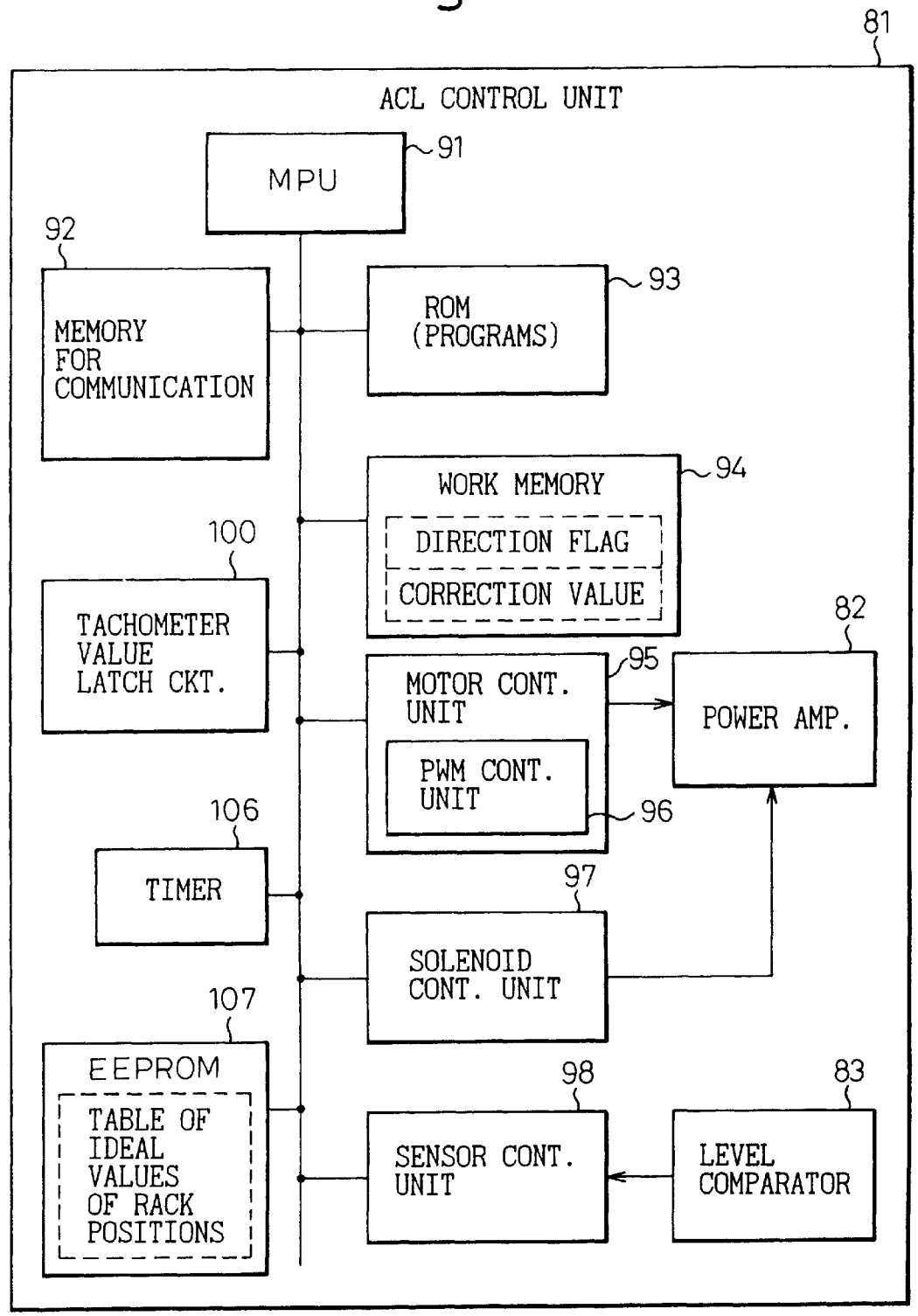
FIG. 22 is a block diagram illustrating in detail an ACL control unit according to the embodiment.

FIG. 22 is a detailed block diagram of an ACL control unit. The ACL control unit will now be described in detail with reference to FIG. 22.

The ACL control unit 81 includes an MPU 91, a memory 92 for communication, a ROM 93, a work memory 94, a motor control unit 95, a solenoid control unit 97, a sensor control unit 98, a power amplifier 82, a level comparator 83, a tachometer value latch circuit 100, a timer 106 and an EEPROM 107. The motor control unit 95 is provided with a PWM control unit 96 (PWM: pulse width modulation), and the EEPROM 107 stores a table of ideal values of rack positions. Described below are the functions of the above-mentioned portions.

(1) The MPU 91 executes a variety of control operations in the ACL apparatus.

(2) The memory 92 for communication is used for communication with the MPU 73 for ACL control.

(3) The ROM 93 is a nonvolatile memory storing various programs that will be executed by the MPU 91 and parameters.

(4) The work memory 94 is a RAM used as work memory by the MPU 91 and the like units.

(5) The motor control unit 95 controls various motors in the ACL apparatus. The motor control unit 95 is provided with a PWM control unit 96 which executes PWM control operations for the motors.

(6) The solenoid control unit 97 controls solenoids in the ACL control apparatus.

(7) The sensor control unit 98 controls the sensors in the ACL apparatus.

(8) The tachometer value latch circuit 100 latches measured values (tachometer values) of tachometers provided for the motors.

(9) The timer 106 measures the time.

In the following description, the "host unit" (as viewed from the ACL control unit 81) includes the drive IF unit 61, the MPU 72 for IF control, the MPU 73 for ACL control and the MTC.

§9: Controlling the Catcher to Assume the Middle State— see FIGS. 23 to 29.

Controlling the catcher to assume the middle state will now be described with reference to FIGS. 23 to 29. The control operation is carried out in a manner as described below so that the catcher hands 19 of the accessor 8 assume the middle state (referred to as "catcher middle state") at an intermediate position which is neither the open state nor the closed state.

(1) Outline for controlling the catcher to assume the middle state.

a) The ACL apparatus is provided with the accessor 8 which includes the catcher hands 19 for gripping a cartridge, the catcher open sensor 40 (the detector mechanism including this sensor is often referred to as "open detector mechanism") for detecting the open state of the catcher hands 19, and the catcher closure sensor 41 (the detector mechanism including this sensor is often referred to as "closure detector mechanism") for detecting the closed state of the catcher hands 19.

By using the above two sensors, the catcher hands 19 are controlled to assume the middle state which is neither the open state nor the closed state, i.e., to assume the intermediate state between the open state and the closed state. The catcher hands in the middle state can be detected by the above two sensors simultaneously, and are controlled by the catcher motor 21.

b) When the catcher hands 19 are to be shifted from the open state to the middle state, the catcher motor 21 is rotated at a speed slower than the ordinary speed, i.e., the catcher motor 21 is supplied with a low drive voltage.

c) In the above control operation b), the drive voltage applied to the catcher motor 21 is PWM-controlled (pulse width modulation) in which the current is permitted to flow or is not permitted to flow in a certain period. Owing to this control operation, the rotational speed of the catcher motor 21 is delayed, so that the above two sensors will reliably detect the catcher hands. The PWM control operation is carried out by the PWM control unit 96.

d) After the catcher hands have assumed the middle state, the PWM control unit 96 executes the PWM control operation to pass a further decreased current, so that the catcher hands 19 will not move but are held at the intermediate position.

e) When catcher open or catcher closed has not yet been determined immediately after the closure of the power source circuit, the OFF-ON-OFF-ON of the sensors may not have been determined yet (such as when the power source circuit is interrupted at the intermediate position). In order to reliably control the catcher hands 19, therefore, the length of the second flag piece 52 of the catcher open/close sensor flag 44 is selected to be longer than the lengths of the first flag piece 51 and of the third flag piece 53.

f) In the catcher open state, the catcher open sensor 40 only is turned on. When the power source circuit is closed, therefore, the catcher hands are necessarily driven toward the catcher open direction, and the above-mentioned control operation is executed after the catcher open state is once assumed.

g) After the cartridge is loaded into the MTU 6 or when the cartridge is to be discharged from the MTU 6, the catcher hands 19 of the accessor 8 positioned to the MTU 6 are brought to the middle state, so that the cartridge can be discharged from the MTU 6 without being hindered.

h) After the cartridge is completely loaded into the MTU 6 in the above-mentioned control operation g), the catcher hands 19 of the accessor 8 are brought to the catcher open state (the catcher motor 21 is supplied with no current and is halted) so that no extra electric power will be consumed.

Figure 23:
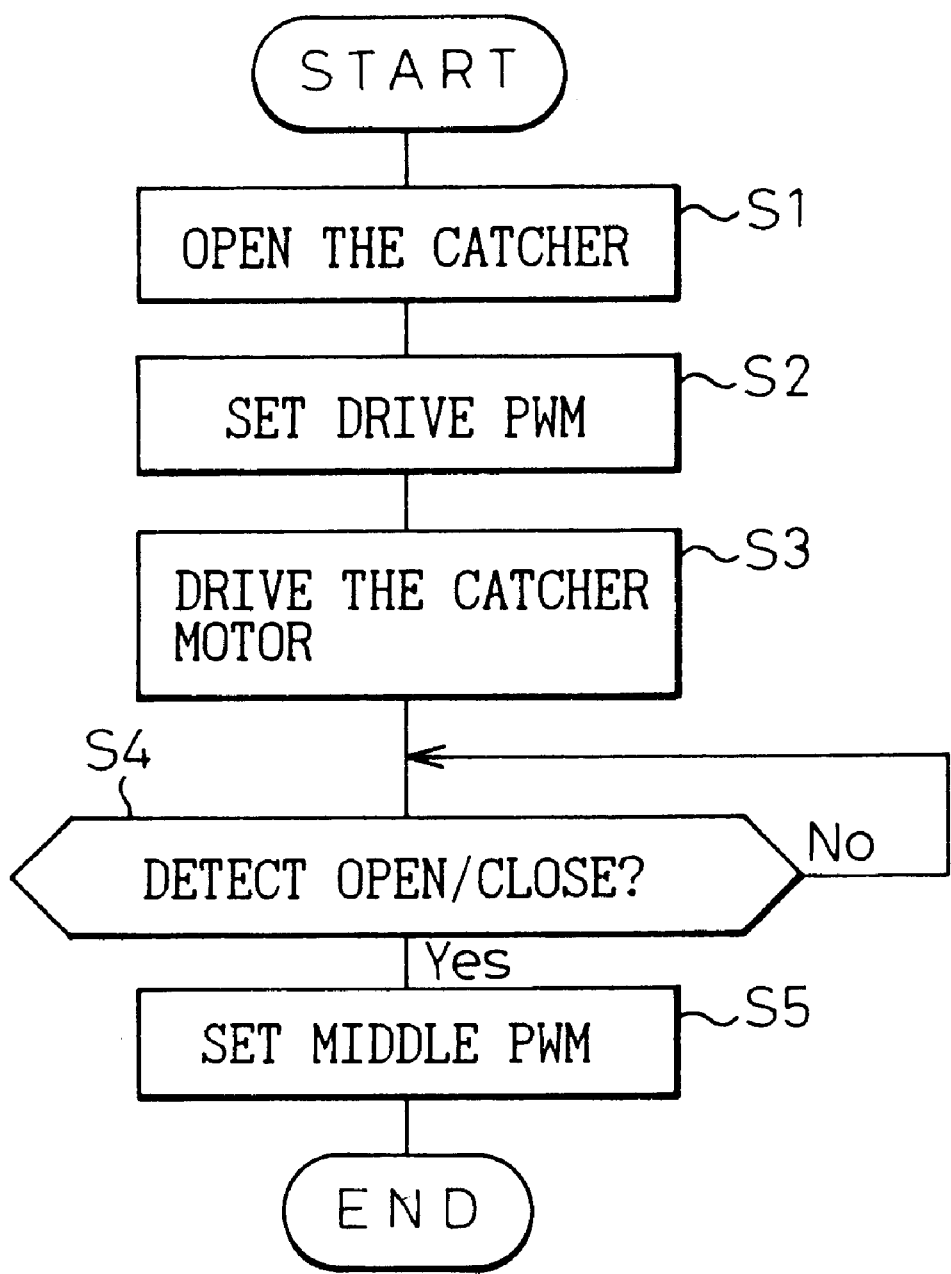
FIG. 23 is a flowchart for controlling the catcher hands to assume the middle state according to the embodiment.
Figure 24A:
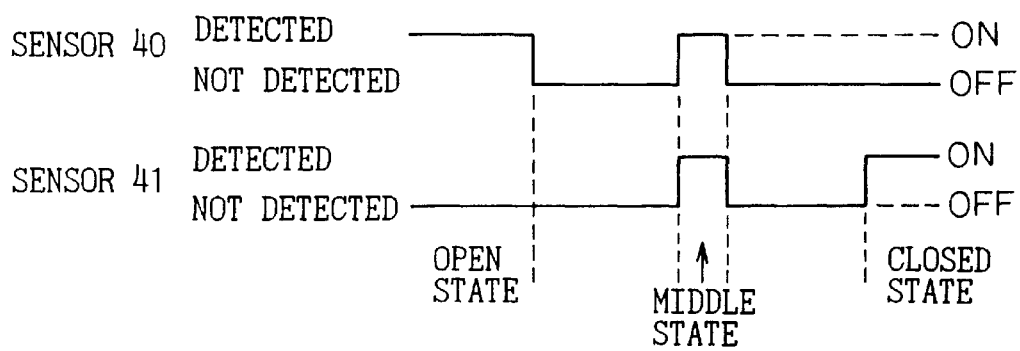
FIGS. 24A and 24B are timing charts according to the embodiment.
Figure 24B:
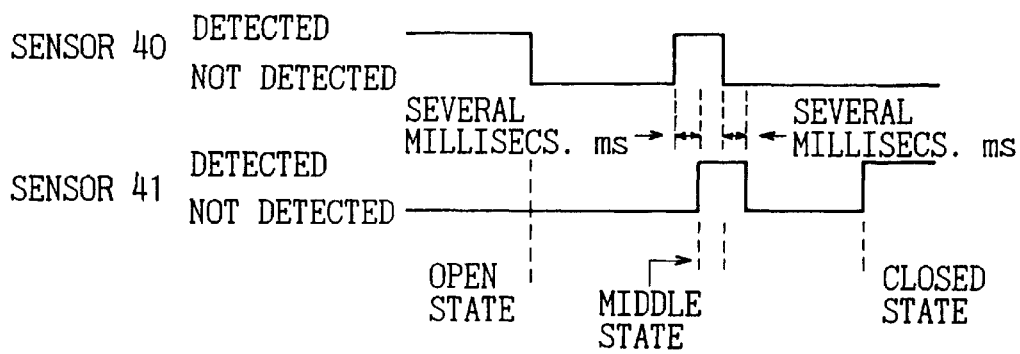

(2) Controlling the catcher hands to assume the middle state—see FIGS. 23 to 24B.

FIG. 23 is a flowchart for controlling the catcher hands to assume the middle state, and FIGS. 24A and 20B are timing charts wherein FIG. 24A is an ideal timing chart for detecting open/closure of when the flag pieces have the same length and FIG. 24B is a timing chart for detecting open/closure of when the lengths of the flag pieces are set to be the same. The operation for controlling the catcher hands to assume the middle state will now be described with reference to FIGS. 23 to 24B, wherein S1 to S5 denote steps of processing.

To control the catcher hands 19 to assume the middle state, the catcher motor 21 is PWM-controlled by the PWM control unit 96 provided in the motor control unit 95. First, the catcher hands 19 are brought to the catcher open state (cell side is opened)(S1) and, then, the PWM control unit 96 sets a drive PWM value (smaller than an ordinary PWM value) to bring the catcher hands 19 to the middle state (S2), and the catcher motor 21 is driven (S3).

In this case, when the catcher hands 19 are brought to the catcher open state and are, then, shifted to the catcher middle state, the PWM control operation is carried out to drive the catcher motor 21 at a rotational speed slower than the ordinary speed, i.e., to apply a drive voltage lower than the ordinary drive voltage to the catcher motor 21.

At a moment (S4) at which the catcher hands are simultaneously detected by the catcher open sensor 40 and the catcher closure sensor 41 (which are simultaneously turned on) the PWM control unit 96 sets a PWM value for passing a very small current to the catcher motor 21 to maintain the catcher middle state (S5).

After the catcher middle state is assumed due to the thus set PWM value, a very small current is supplied to the catcher motor 21 so that the catcher hands 19 will not move but are held at the catcher middle state. Thus, the catcher middle state is stably maintained.

In the catcher middle state as shown in FIGS. 20C and 20D, the catcher open sensor 40 is turned on upon detecting the first flag piece 51, and the catcher closure sensor 41 is turned on upon detecting the second flag piece 52. In this case, since the second flag piece 52 is longer than the first flag piece 51, the catcher closure sensor 41 is necessarily turned on when the catcher open sensor 40 is turned on.

FIGS. 24A and 24B show timing charts of when the flag pieces all have the same length in the catcher open/close sensor flag 44. In FIGS. 24A and 24B, in this case, the open detector mechanism including the catcher open sensor 40 is denoted as "open detector mechanism" and the closure detector mechanism including the catcher closure sensor 41 is denoted as "closure detector mechanism".

In an ideal state as shown in FIG. 24A, the catcher open sensor 40 (open detector mechanism) and the catcher closure sensor 41 (closure detector mechanism) simultaneously detect the flag piece and are turned on in the catcher middle state.

In practice, however, a deviation occurs between a timing of detection by the catcher open sensor 40 (open detector mechanism) and a timing of detection by the catcher closure sensor 41 (closure detector mechanism). That is, the timing chart shown in FIG. 24B is the one when the open state is detected first. Even when the catcher hands are controlled to assume the middle state, the catcher open sensor 40 detects the flag piece first and the catcher closure sensor 41 detects the flag piece after being slightly delayed. Therefore, a deviation occurs between the two detection timings.

When the catcher motor 21 is driven from the catcher open state as described above, the catcher open sensor 40 detects the flag piece first and, hence, it appears that the catcher open state has been established for a period of several milliseconds though the catcher open state has not really been established. When the catcher hands pass through the catcher middle state, furthermore, the catcher open sensor 40 discontinues the detection, first, and the catcher closure sensor 41 only detects the flag piece, so that it appears that the catcher closed state is established.

The above-mentioned inconvenience can be eliminated by selecting the length of the second flag piece 52 to be longer than the length of the first flag piece 51 as described above.

(3) Opening the catcher hands from the catcher closed state—see FIG. 25.

FIG. 25 is a flowchart for opening the catcher hands from the catcher closed state. Described below is the control operation for opening the catcher hands from the catcher closed state with reference to FIG. 25 wherein S11 to S16 denote steps of processing. The following description also makes reference to FIG. 20.

When the catcher hands are to be closed from the catcher open state, the detection of the catcher closure sensor 41 (closure detector mechanism) changes in a manner of detection→non-detection→detection when the catcher hands are shifted from the catcher closed state (closure detecting state) to the catcher middle state. Then, as the catcher hands pass through the catcher middle state, the detection changes in a manner of detection→non-detection, and the catcher hands 19 assume the open state.

Then, the catcher motor 21 is driven from the catcher closed state (closure detector mechanism is in the detecting state) toward the catcher open direction (S12). The catcher motor 21 is stopped after the catcher closure sensor 41 has changed in a manner of closure is not detected (S13) →closure is detected (S14)→closure is not detected (S15). Thus, the catcher hands 19 assume the catcher open state.

Figure 26A:
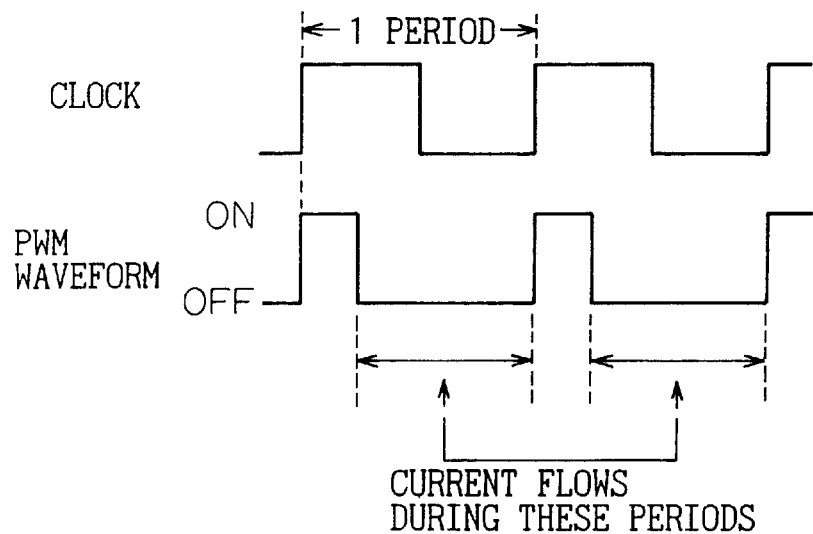
FIGS. 26A and 26B are timing charts according to the embodiment.

(4) Controlling the PWM—see FIG. 26A.

FIG. 26A shows a timing chart for PWM control. In the PWM control by the PWM control unit 96, a period PWM (a period of clock) is set to be 100%. When it is desired to control the drive voltage for the catcher motor 21 by n%, a current of n% is supplied to the catcher motor 21. That is, a current flows while the PWM waveform is in the off state and, hence, the off period is set to be n% of one period. It is thus possible to adjust the voltage applied to the catcher motor 21.

Figure 26B:
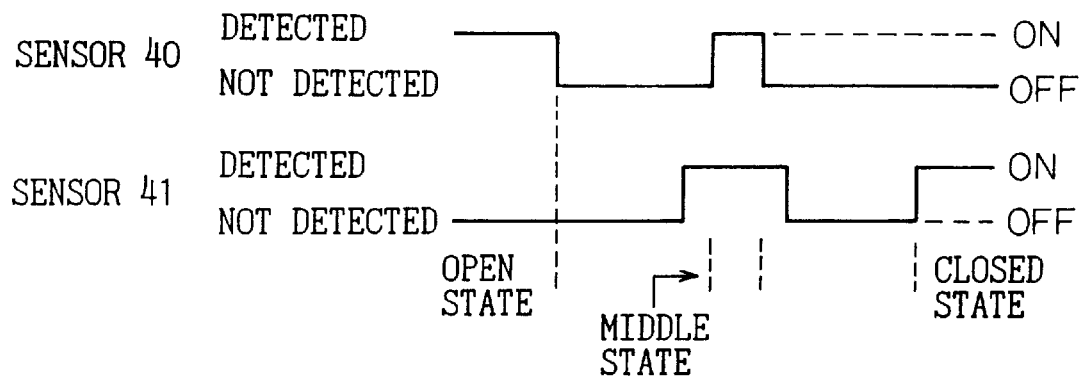

(5) When the length of the second flag piece 52 to be detected by the catcher closure sensor 41 at the catcher middle position is selected to be longer than the first flag piece 51 and the third flag piece 53—see FIG. 26B.

FIG. 26B shows a timing chart for open/closure detection (when the second flag piece only is lengthened). When the first flag piece 51 has a length L1, the second flag piece 52 has a length L2 and the third flag piece 53 has a length L3 in the catcher open/close sensor flag 44 as described earlier, the relationship L1=L3<L2 holds.

In the catcher middle state, the catcher closure sensor 41 is turned on upon detecting the second flag piece 52 (closure detector mechanism is detecting) and the catcher open sensor 40 is turned on upon detecting the first flag piece 51 (open detector mechanism is detecting). Since the above-mentioned relationship is maintained between the flag pieces, the period in which the catcher closure sensor 41 is detecting becomes longer than a period (detection time or detection width) in which the catcher open sensor 40 is detecting. When the catcher open sensor 40 is turned on (open detector mechanism is detecting), therefore, the catcher closure sensor 41 is necessarily turned on (closure detector mechanism is detecting).

Figure 1A:
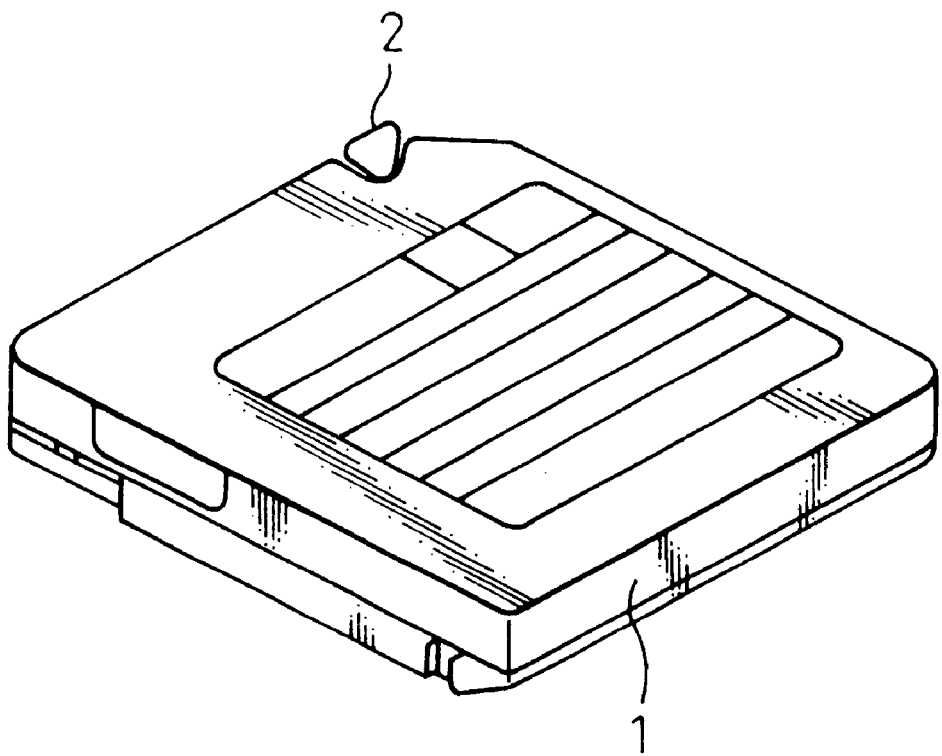
FIG. 1A is a perspective view of a conventional cartridge.
Figure 1C:
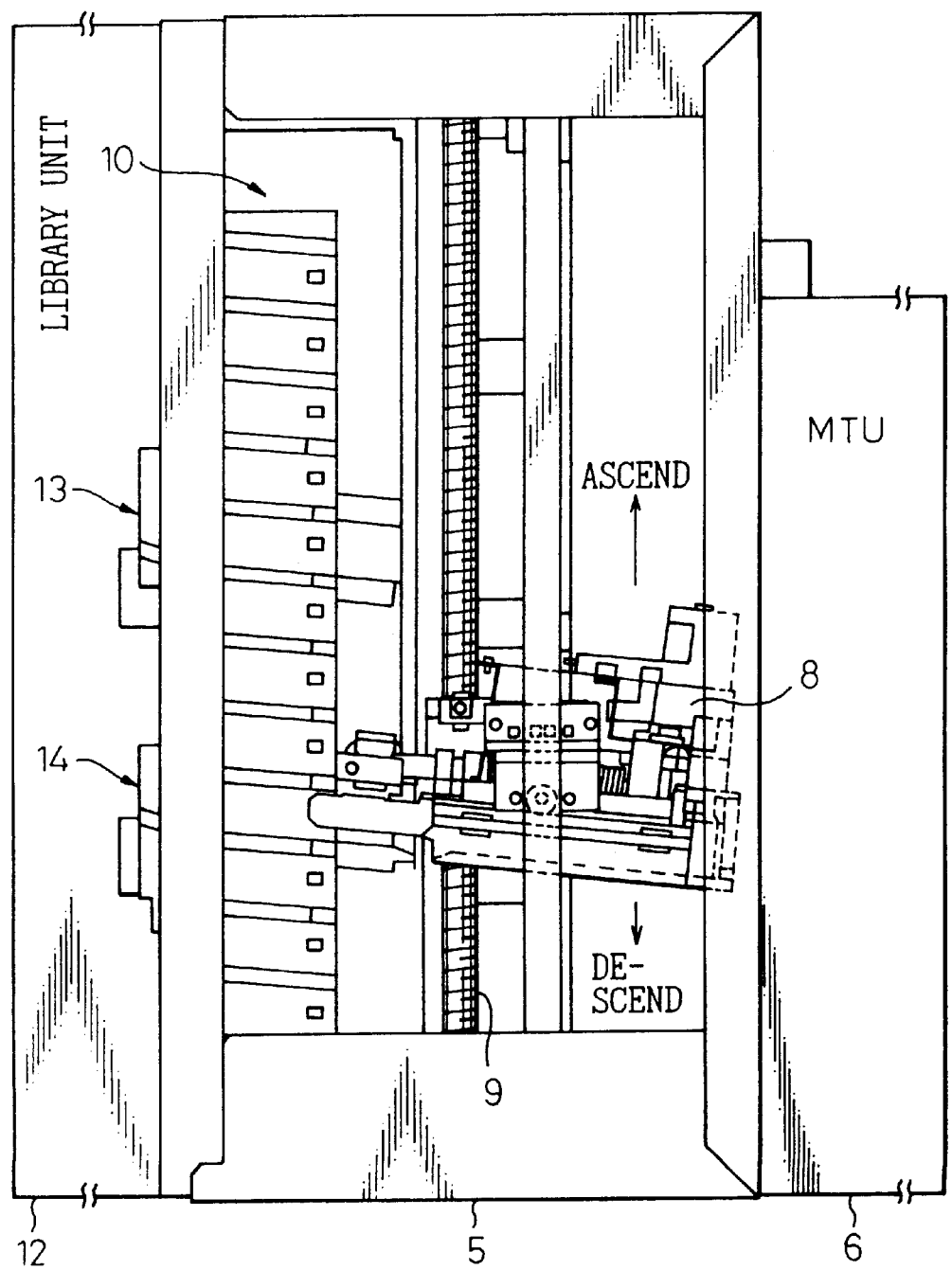
FIG. 1C is a side view of a conventional ACL apparatus for attachment to a library unit.
Figure 1D:
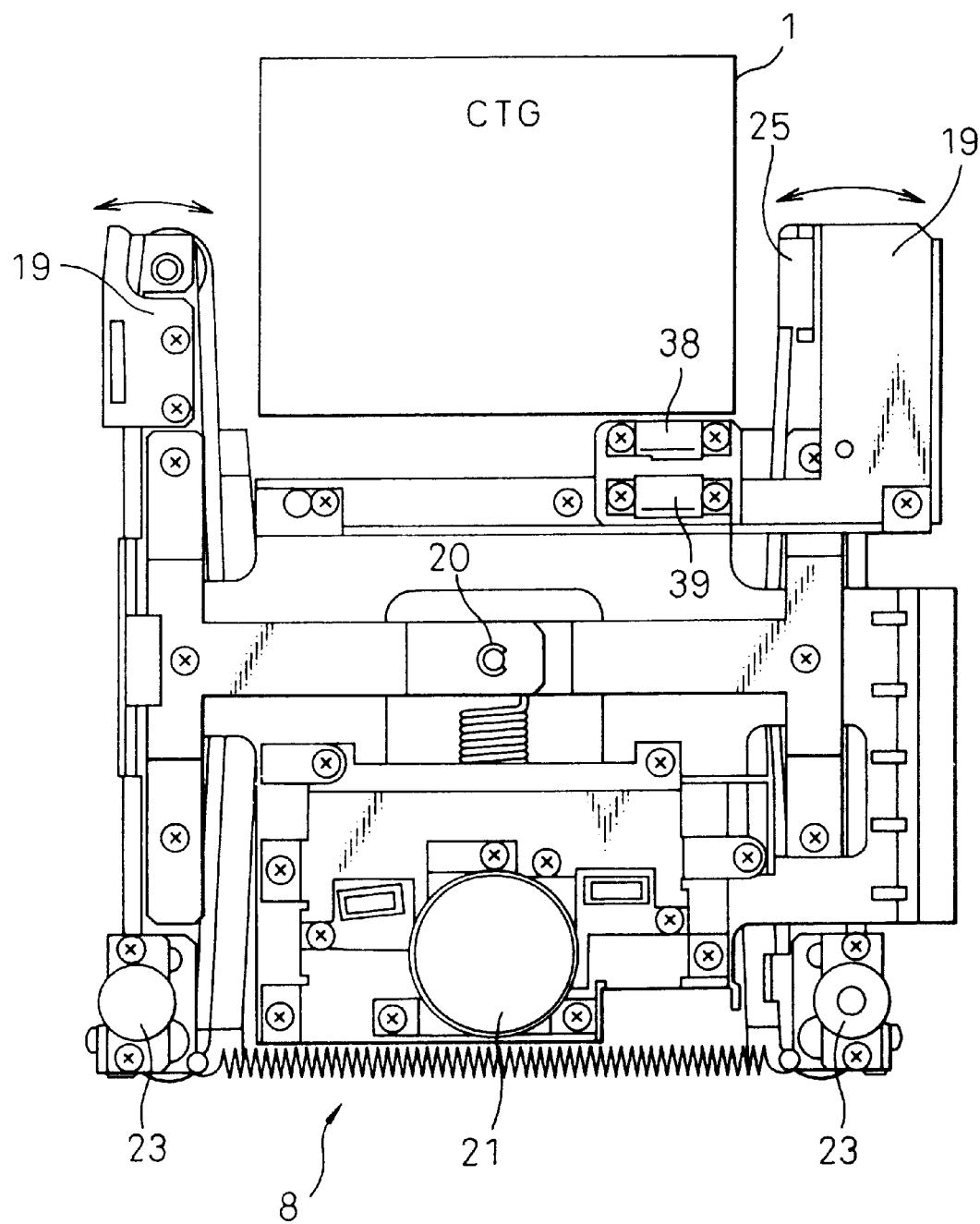
FIG. 1D is a plan view of a conventional accessor.
Figure 2:
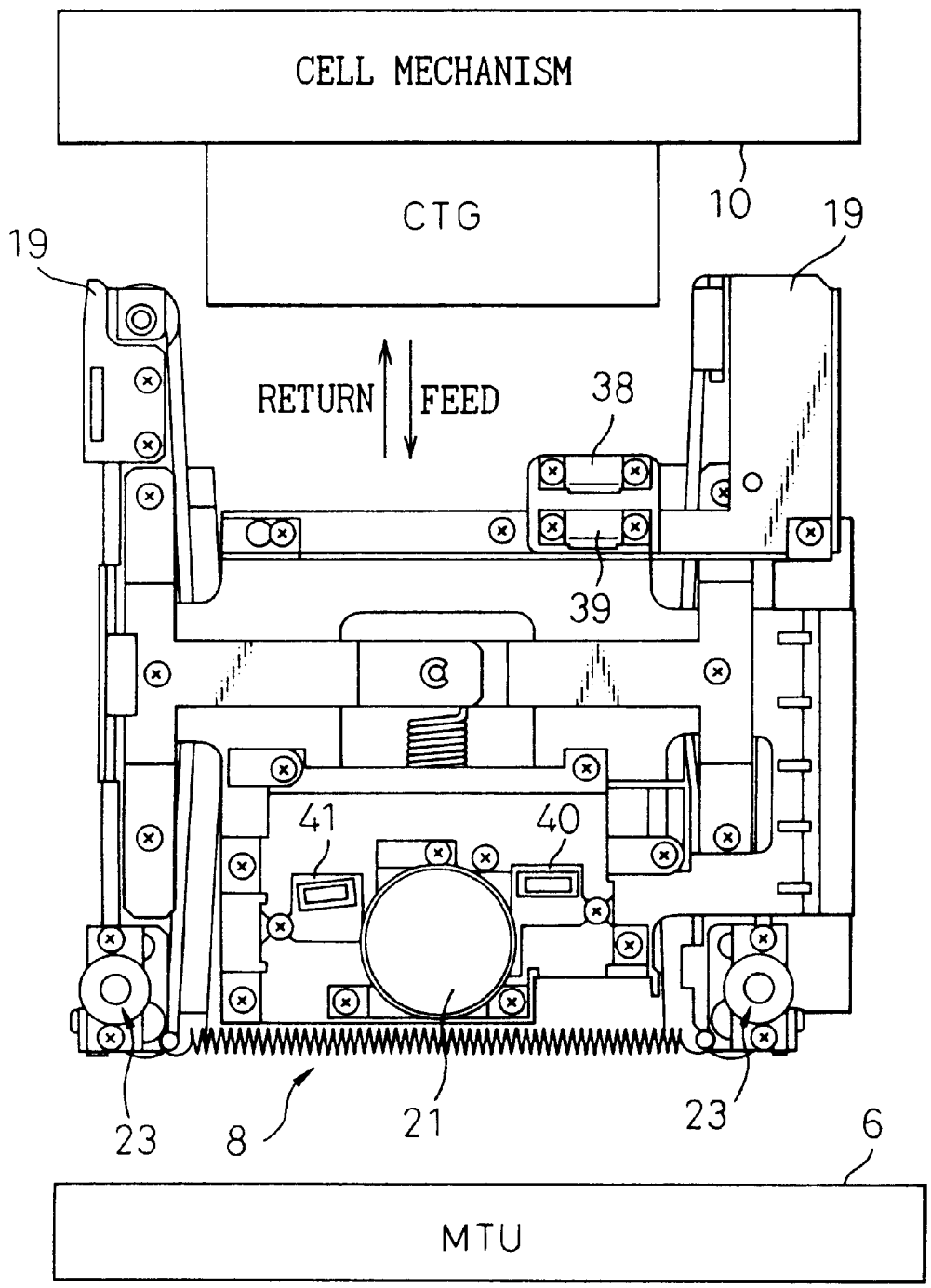
FIG. 2 is a diagram illustrating the principle of the present invention.

That is, in the catcher middle state as shown in FIG. 2B, the catcher open sensor 40 and the catcher closure sensor 41 are necessarily in the detecting state (turned on), and the catcher open sensor 40 assumes the detecting state only in the catcher open state.

When the catcher open sensor 40 only is detecting, therefore, the catcher hands 19 are necessarily moved to the catcher open state when the power source circuit is closed in order to make sure that the catcher open state is being assumed. Thereafter, the control operation is so carried out as to establish the catcher closed state. In the above-mentioned step of control operation, the detecting state of the catcher closure sensor 41 is monitored.

(6) When the catcher hands are to be closed from the catcher open state—see FIG. 27.

FIG. 27 is a flowchart of when the catcher hands are to be closed from the catcher open state. Described below with reference to FIG. 27 is the control operation for closing the catcher hands from the catcher open state. Symbols S21 to S26 denote steps of the process.

In the control operation for closing the catcher hands from the catcher open state, first, the detection by the catcher closure sensor 41 (closure detector mechanism) changes from non-detecting state→detecting state when the catcher hands shift into the catcher middle state from the catcher open state (closure is not being detected). Then, as the catcher hands pass through the catcher middle state, the catcher closure sensor 41 changes from non-detecting state→detecting state, whereby the catcher hands assume the closed state.

First, therefore, the catcher motor 21 is driven (S22) from the catcher open state (closure detector mechanism is not detecting) (S21) toward the direction in which the catcher hands close. The catcher motor 21 is stopped to rotate (S26) after the state of the catcher closure sensor 41 has changed from catcher closure detected (S23)→catcher closure not detected (S24)→catcher closure detected (S25). In this state, the catcher hands are closed.

Figure 28:
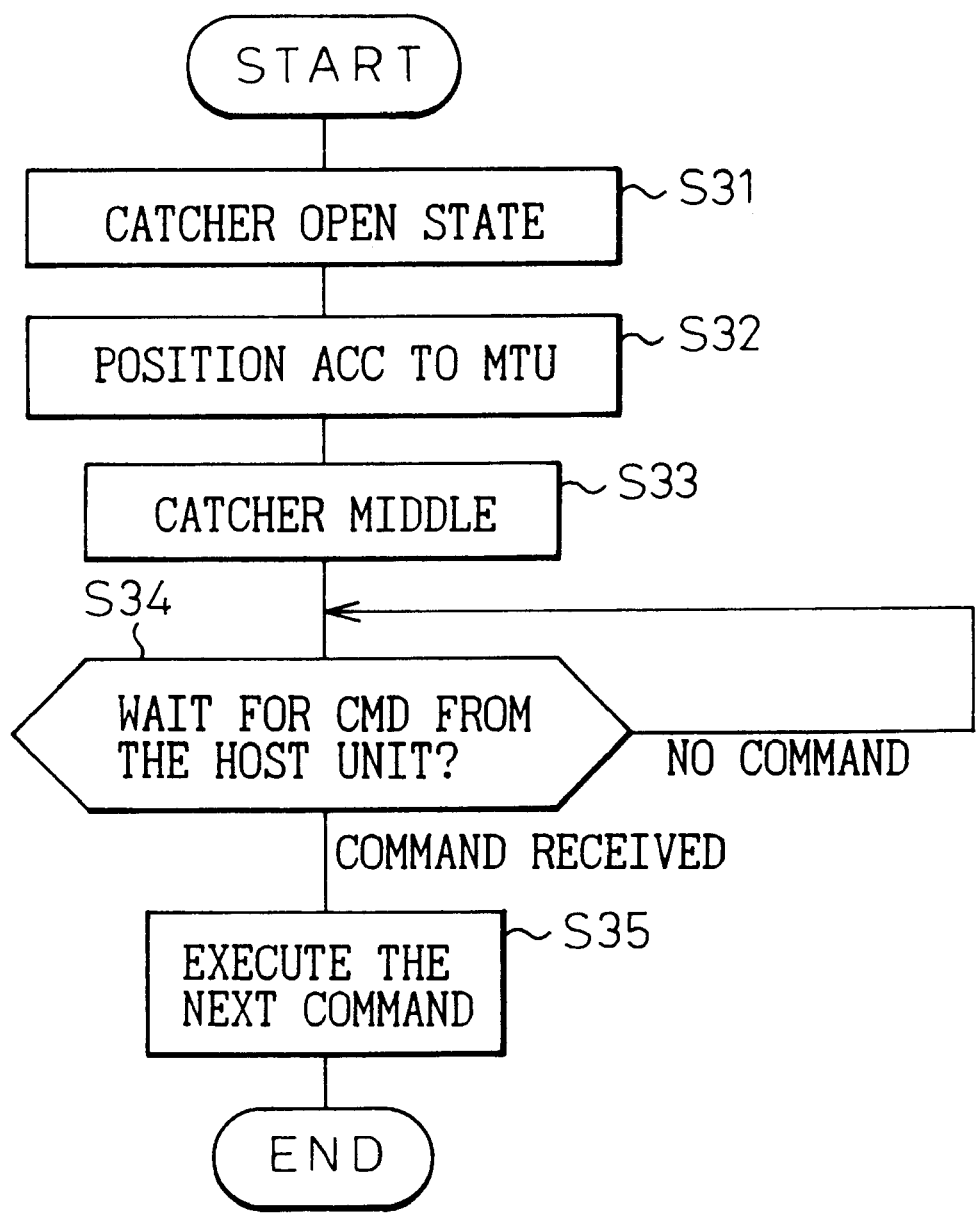
FIG. 28 is a flowchart for positioning the accessor to the MTU according to the embodiment.

(7) Control operation for positioning the accessor to the MTU—see FIG. 28.

FIG. 28 is a flowchart for positioning the accessor to the MTU. Described below with reference to FIG. 28 is the control operation for positioning the accessor to the MTU. Symbols S31 to D35 denote steps of the process.

When the accessor 8 is to be brought to the position of the MTU 6 (positioned in the direction of height), the ACL control unit 81, first, drives the catcher motor 21 to bring the catcher hands 19 to the catcher open state (S31). Next, the accessor 8 is brought to the position of the MTU 6 (S32), and the catcher hands 19 are brought to the catcher middle state (S33). This is to ensure that the cartridge that is discharged from the MTU 6 is not hindered by the catcher hands 19 of the accessor 8.

After the catcher hands 19 are brought to the catcher middle state as described above, the ACL control unit 81 waits for a next command (CMD) from the host unit (S34). Upon receiving the next command from the host unit, the ACL control unit 81 executes the command that is received (S35).

Figure 29:
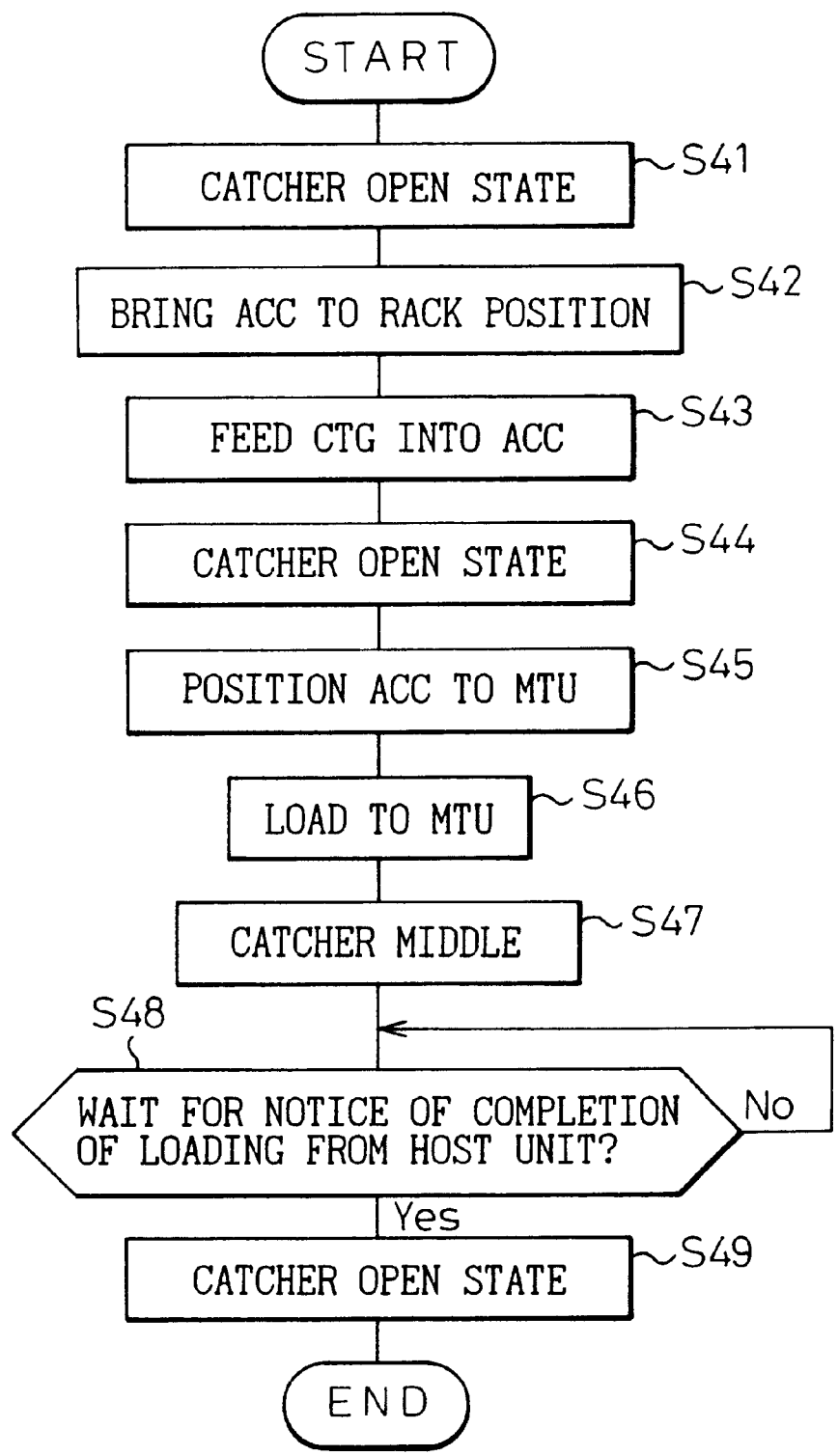
FIG. 29 is a flowchart for loading into the MTU according to the embodiment.

(8) Control operation for loading into the MTU—see FIG. 29.

FIG. 29 is a flowchart of the control operation for loading the cartridge into the MTU. The control operation for loading the cartridge into the MTU will now be described with reference to FIG. 29, wherein symbols S41 to S49 denote steps of the process.

First, being controlled by the ACL control unit 81, the catcher motor 21 is driven to bring the catcher hands 19 to the catcher open state (rack side is opened, MTU 6 side is closed) (S41), and the accessor 8 is brought to a rack position of the cell mechanism 10 (S42) and a cartridge on the rack is fed (pulled) into the accessor 8 (S43).

In this case, the ACL control unit 81 drives the catcher motor 21 so that the catcher hands 19 are closed to grip the cartridge, and further drives the feeder motors 23 to turn the feeder belts 43. The cartridge is fed to the accessor 8 accompanying the turn of the feeder belts 43. Thereafter, the ACL control unit 81 drives the catcher motor 21 to bring the catcher hands 19 to the catcher open state (MTU 6 side is closed) (S44).

In this state, the ACL control unit 81 moves the accessor 8 to bring it to the position of the MTU 6 (S45). Then, the cartridge is loaded into the MTU 6 from the accessor 8 (S46). In the catcher open state, in this case, the MTU 6 of the catcher hands 19 are closed and in this state, the feeder belts 43 are turned to load the cartridge into the MTU 6 from the accessor 8.

Next, the ACL control unit 81 drives the catcher motor 21 to bring the catcher hands 19 to the catcher middle state (S47), and waits for a notice of completion of loading from the host unit (S48). When the notice of completion of loading is received from the host unit, the ACL control unit 81 drives the catcher motor 21 to bring the catcher hands 19 to the catcher open state (S49), and the loading into the MTU 6 ends.

After the loading into the MTU 6 is finished as described above, the catcher hands 19 are brought to the catcher open state to consume no additional electric power (in the catcher middle state, a very small current continues to flow into the catcher motor 21; i.e., electric power is consumed).

(9) Advantage obtained by controlling the catcher hands to assume the catcher middle state.

Upon controlling the catcher hands 19 to assume the catcher middle state, the cartridge that is loaded into the rack of the cell mechanism 10 or that is discharged from the rack by the operator is not hindered by the catcher hands 19 in the case of a single unit. Therefore, the operation for loading/discharging the cartridge is not hindered, and the operation efficiency is enhanced.

When connected to the library unit, furthermore, the entry cell can be disposed at the MTU position (at the height of the MTU) making it possible to shorten the time for conveying the cartridge by the accessor 8. As a result, the apparatus exhibits enhanced performance.

§10: Operation for Detecting the Presence of a Cartridge—see FIGS. 30A to 31.

(1) Outline of the operation for detecting the presence of a cartridge.

The presence-of-cartridge sensor 25 is provided at an end of the catcher hands 19 of the accessor 8 to detect whether there is a cartridge on the rack of the cell mechanism 10. A detection signal of the presence-of-cartridge sensor 25 is fed to the ACL control unit 81 to determine whether there is a cartridge on the rack or not.

The presence-of-cartridge sensor 25 is an optical sensor comprising, for example, a light-emitting unit and a light-receiving unit. The catcher hands 19 are brought to the position of the rack, light from the light-emitting portion is reflected by the cartridge, and the reflected light is received by the light-receiving unit to detect the presence of the cartridge. When there is no cartridge on the rack, therefore, no light is reflected by the cartridge, and the light-receiving unit receives no reflected light.

Upon processing the output signal (sensor detection signal), from the light-receiving unit of the optical sensor, by the ACL control unit 81, it is possible to determine the presence of a cartridge on the rack. In the following description, the presence-of-cartridge sensor 25 is also referred to as "presence-of-cartridge detector mechanism". When the power source circuit for the ACL apparatus is closed, the ACL control unit 81 executes a process for making sure that the presence-of-cartridge detector mechanism is properly functioning and a processing for making sure that there is a cartridge on the rack (cell) of the cell mechanism 10.

When the ACL apparatus is connected to the library unit, the operation is carried out to detect whether there is a cartridge on the entry cell 13 in which will be placed the unprocessed cartridge and whether there is a cartridge on the exit cell 14 in which will be placed a processed cartridge. In the case of a single unit (ACU apparatus+MTU unit), the operation is carried out to make sure whether there is a cartridge on each of the racks.

When connected to the library unit and when the power source circuit is closed, the cartridge on the rack is once gripped by the catcher hands 19 and is released so that the cartridge is placed straight on the rack by taking into consideration the case where the cartridge may not have been placed straight on the rack. Then, the operation is carried out to detect the presence of a cartridge.

When the cartridge is to be discharged onto the rack of the exit cell 14, operation is necessarily carried out to make sure whether there is a cartridge in the exit cell 14. When it is determined that a cartridge exists in the exit cell 14, then, the operation is carried out again to make sure that the presence-of-cartridge detector mechanism is properly functioning as when the confirmation operation is carried out at the time of closing the power source circuit.

After the above-mentioned confirmation operation, when the presence-of-cartridge detector mechanism is not properly functioning, the host unit is informed of this fact. When the presence-of-cartridge detector is properly functioning, the host unit is informed of that there is a cartridge on the exit cell 14. When the presence-of-cartridge detector mechanism is not properly functioning even after the host unit is informed of this fact, the operation is carried out to discharge the cartridge onto the exit cell 14.

When the ACL apparatus is a single unit (ACL apparatus+ MTU), the processing is carried out to make sure whether there is a cartridge in the cell mechanism 10 as described above. When it is so determined that there is no cartridge, the operation is carried out to once pull the cartridge into the accessor 8. When the cartridge can be pulled into the accessor 8, then, the processing is carried out to determine that there is a cartridge. Described below in detail with reference to a flowchart is the process for when the ACL apparatus is connected to the library unit.

Figure 30A:
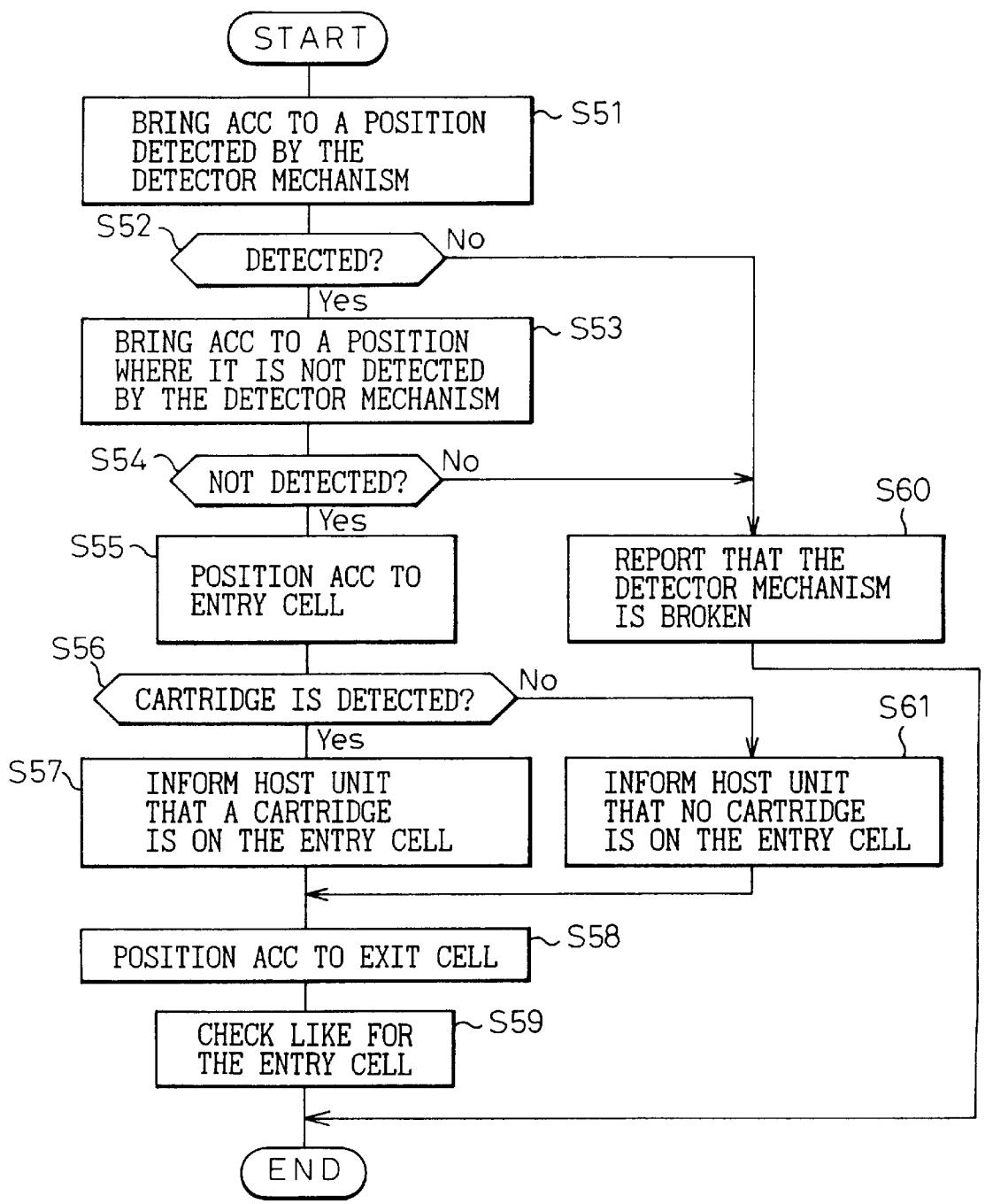

(2) Processing for detecting the presence of a cartridge when the power source circuit is closed with the ACL apparatus being connected to the library unit—see FIG. 30A.

FIG. 30A is a flowchart for detecting the presence of a cartridge when the power source circuit is closed (with the ACL apparatus being connected to the library unit). Described below with reference to FIG. 30A is the operation for controlling the presence of a cartridge when the power source circuit is closed (with the ACL apparatus being connected to the library unit). Symbols S51 to S61 denote steps of the process.

When the power source circuit is closed, first, the presence-of-cartridge detector mechanism (presence-of-cartridge sensor 25) is checked. In this case, the accessor 8 is brought to a position where the cartridge in the cell mechanism 10 can be necessarily detected by the presence-of-cartridge detector mechanism (S51), and it is confirmed whether the cartridge is detected by the presence-of-cartridge detector mechanism or not (S52).

When the cartridge on the rack is not detected by the presence-of-cartridge detector mechanism, i.e., when the cartridge is not detected, the ACL control unit 81 so determines that the presence-of-cartridge detector mechanism is broken, and informs the host unit of the fact that the presence-of-cartridge detector mechanism has been broken (S60).

When the cartridge on the rack of the cell mechanism 10 is detected by the presence-of-cartridge detector mechanism in the processing of step S52, the accessor 8 is brought to a position where the cartridge will not be detected by the presence-of-cartridge detector mechanism, i.e., where the cartridge is not detected (S53), and it is confirmed whether the cartridge has not been detected (S54).

When the cartridge has been detected, the ACL control unit 81 informs the host unit of the fact that the presence-of-cartridge detector mechanism has been broken (S60) and ends the processing. When the cartridge has not been detected at step S54, however, it is confirmed that the presence-of-cartridge detector mechanism is properly operating. Thereafter, the ACL control unit 81 brings the accessor 8 to the position of the entry cell 13 (S55), checks whether there is a cartridge (S56), and informs the host unit of the presence of the cartridge.

When no cartridge is detected at step S56, the host unit is informed of that there is no cartridge on the entry cell 13 (S61). When a cartridge is detected, the host unit is informed of that there is a cartridge on the entry cell 13 (S57). Thereafter, the ACL control unit 81 brings the accessor 8 to the position of the exit cell 14 (S58) and confirms whether there is a cartridge on the exit cell 14 as for the entry cell 13 (S59).

Figure 30B:
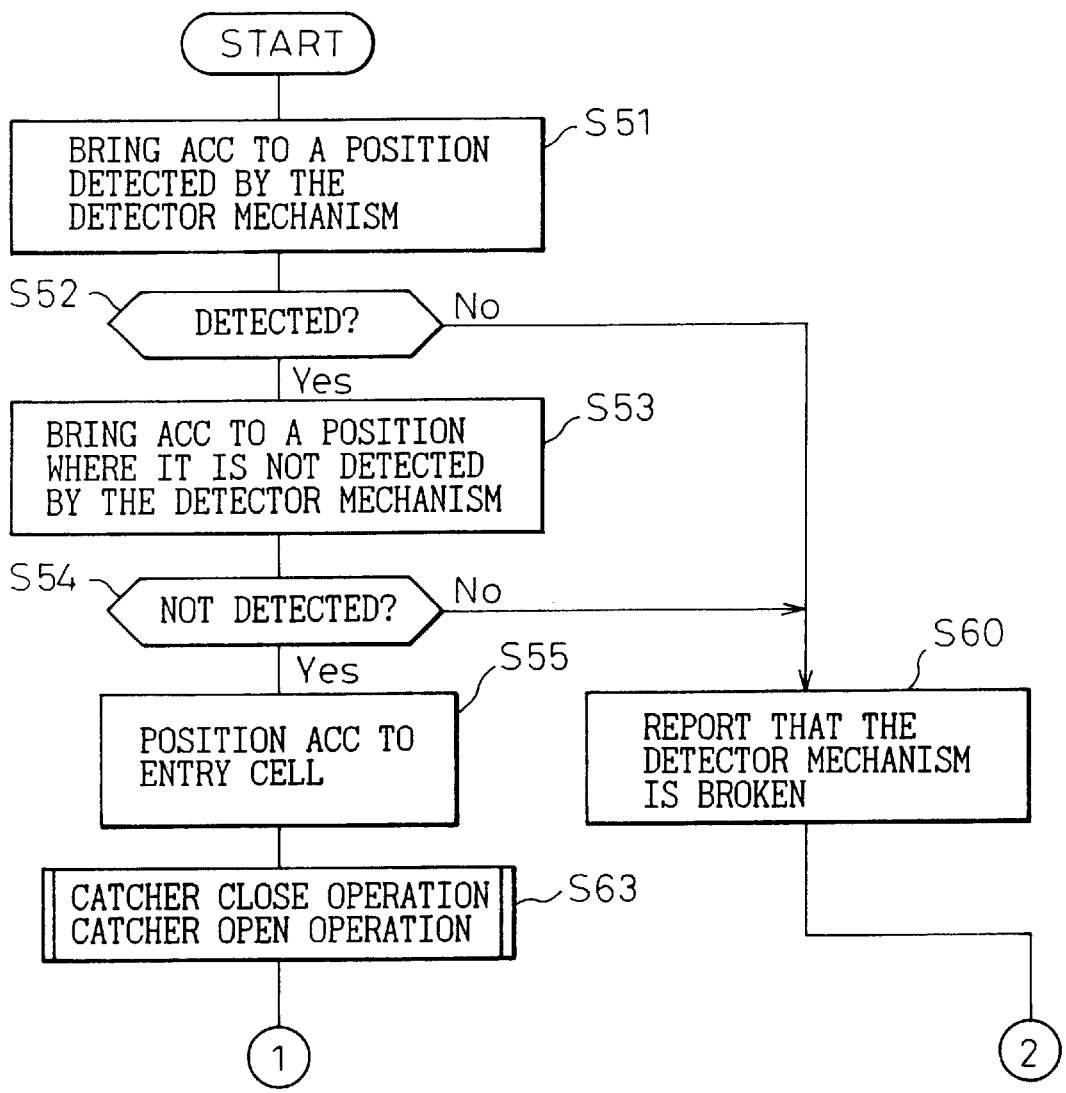

FIG. 30B and 30C are a flowchart showing a modified example of the operation for detecting the presence of a cartridge as shown in FIG. 30A. Accordingly, in FIG. 30B and 30C, an explanation of the same operation as explained in FIG. 30A is omitted, and only the additional steps will be explained.

After the ACL control unit 81 brings the accessor 8 to the position of the entry cell 13 (S55), a closing operation of the catcher hands and an opening operation of the catcher hands are executed (S63), before the checks of whether or not there is a cartridge on the entry cell 13 (S56) are performed. At step S63, the ACL control unit 81 causes the catcher hands to grip a cartridge on the entry cell 13 in advance by taking into consideration the case where the cartridge may not have been properly placed on the entry cell 13, and permits the catcher hands to release the cartridge, so that the cartridge is properly placed on the entry cell 13.

When no cartridge is detected at step S56, a closing operation of the catcher hands is executed (S64), and the ACL control unit 81 causes the catcher hands to grip the cartridge on the entry cell 13. Then the gripped cartridge is pulled into the accessor at step S65. If the cartridge can be pulled into the accessor, namely, if the first and the second cell side sensors are turned on (S66), the ACL control unit 81 judges that there is a cartridge on the entry cell 13 and the host unit is informed that there is a cartridge on the entry cell 13 (S57). If the first and the second cell side sensors did not turn on at step S66, the ACL control unit 81 judges that there is no cartridge on the entry cell 13 and the host unit is informed that there is no cartridge on the entry cell 13 (S57).

Steps S67 to S70 are included in step S59 in FIG. 30A. In these steps, the detection of the cartridge on the exit cell 14 is carried out as for the entry cell 13.

Figure 31:
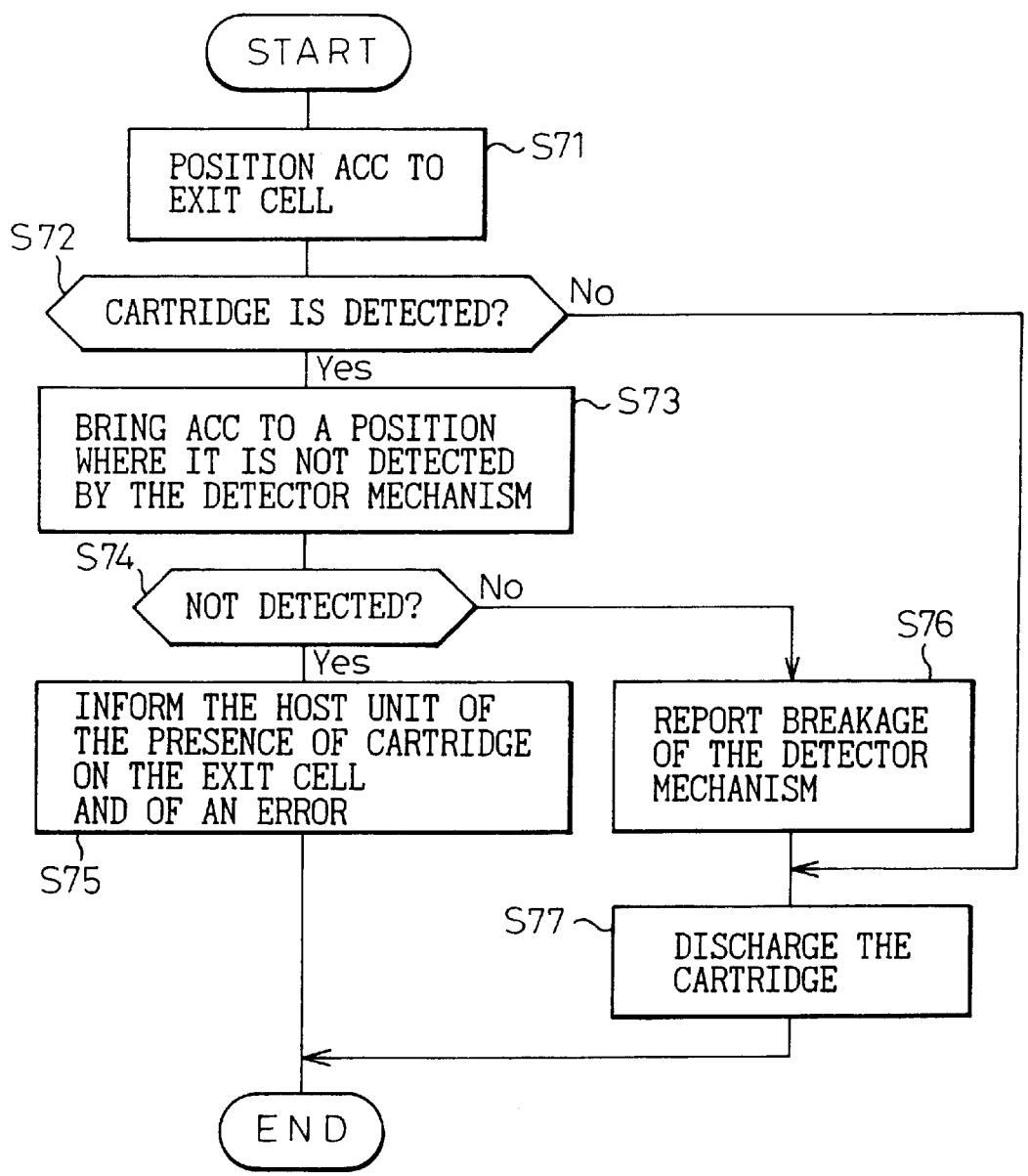
FIG. 31 is a flowchart for detecting the presence of cartridge when it is to be discharged into the exit cell (with the ACL apparatus being connected to the library unit) according to the embodiment.

(3) Detecting the presence of a cartridge when the cartridge is to be discharged onto the exit cell (with the ACL apparatus being connected to the library unit)—see FIG. 31.

FIG. 31 is a flowchart for detecting the presence of a cartridge when it is to be discharged onto the exit cell (with the ACL apparatus being connected to the library unit). Described below with reference to FIG. 31 is the operation for detecting the presence of a cartridge when it is to be discharged onto the exit cell (with the ACL apparatus being connected to the library unit). Symbols S71 to S77 denote steps of the process.

The cartridge is discharged onto the exit cell 14 after having detected the presence of a cartridge on the exit cell 14. The control operation in this case is carried out as described below. First, the ACL control unit 81 brings the accessor 8 to a position of the exit cell 14 (S71), and the presence-of-cartridge detector mechanism (presence-of-cartridge sensor 25) detects the cartridge (S72). As a result, when no cartridge is detected, the cartridge is discharged onto the exit cell 14 (S77) to end the operation.

In an ordinary library unit, in this case, the next cartridge is never loaded while a cartridge exists on the exit cell 14. Therefore, when no cartridge is detected on the exit cell 14 at step S72, the cartridge is discharged.

When the cartridge is detected at step S72, however, the cartridge is not discharged onto the exit cell 14. Therefore, the ACL control unit 81 brings the accessor 8 to a position where the cartridge will not be detected by the presence-of-cartridge detector mechanism (S73) and determines whether the cartridge is not detected at this position (S74).

When the cartridge is detected, the ACL control unit 81 determines that the presence-of-cartridge detector mechanism is broken and informs the host unit of the fact that the presence-of-cartridge detector mechanism has been broken (S76). Thereafter, the ACL control unit 81 brings the accessor 8 again to the position of the exit cell 14 and discharges the cartridge onto the exit cell 14 (S77). When the cartridge is not detected at step S74, however, the host unit is informed of that there is a cartridge on the exit cell 14, and is informed of an error (S75).

That is, the presence or absence of the cartridge is detected at step S72. When the presence of cartridge is detected, it is checked whether the presence-of-cartridge detector works properly. For this purpose, the accessor 8 is brought to a position where the cartridge will not be detected by the presence-of-cartridge detector mechanism to confirm whether the cartridge is not detected. When the detector mechanism is properly working, then, a cartridge exists on the exit cell 14, and the host unit is informed of the presence of cartridge on the exit cell 14 and of an error.

When a cartridge is detected at step S74, furthermore, the ACL control unit 81 so judges that the presence-of-cartridge detector mechanism has been broken and informs the host unit of the breakage of the presence-of-cartridge detector mechanism (S76) and discharges the cartridge onto the exit cell 14 (S77).

§11: Correcting the Rack Position of the Cell Mechanism—see FIGS. 32 to 35.

Described below is the control operation for correcting the rack position of the cell mechanism.

(1): Outline of the operation for correcting the rack position.

The racks 11 of the cell mechanism 10 in the ACL apparatus (racks of the entry cell 13 and exit cell 14 in the ACL apparatus 5 for attachment to a library) may not be present at the positions where they should be present due to the mechanically mounted state of the rack and dispersion in the thickness of the racks. That is, the practical rack positions may often be deviated to some extent from the positions where they should be present. To bring the accessor 8 to the rack positions, therefore, a deviation in the position of the rack must be corrected.

In the control operation for correcting the rack position, therefore, the presence-of-cartridge detector mechanism or the presence-of-cartridge sensor 25 detects the positions of the racks of the cell mechanism 10. By utilizing the presence-of-cartridge detector sensor 25, therefore, a practical rack position is detected while moving the accessor 8, and a difference is found from a position where the rack should be present in order to execute the processing for correcting the rack position.

When the accessor 8 is to be brought to a position of a rack of the cell mechanism 10 during the ordinary operation, the control operation for positioning is carried out while correcting the rack position by using the above-mentioned difference as a correction value. The operation for correcting the rack position is automatically carried out by the ACL control unit 81 by using the presence-of-cartridge sensor 25. In an apparatus not equipped with the rack position detector mechanism, however, the rack position is manually corrected by the operator.

In such an apparatus, the ACL apparatus is provided, on a portion of the housing thereof, with a screw (for effecting fine adjustment) to ascend or descend the accessor 8 by manual operation. Furthermore, the operator panel 64 is provided with a switch SWI for manually opening or closing the catcher hands 19 of the accessor 8 and with a switch SW2 for determining a correction value for the rack position. The rack position is corrected by manipulating the string screw and switches SW1, SW2. The switch SW1, in its off state, executes no operation but executes, in its on state, the operation by which the catcher hands 19 are opened→closed→opened→closed . . . repetitively and continuously.

In the rack position correction by the manual operation, any rack of the cell mechanism 10 is set as a reference rack, the accessor 8 is positioned, first, to the reference rack, the string screw provided on the ACL apparatus is turned by hand to ascend or descend the accessor 8 so that it is brought to a desired position.

The switch SW1 provided on the operator panel 64 is manipulated to open or close the catcher hands 19, and it is confirmed whether a desired position is accomplished. After the position is confirmed, the switch SW2 of the operator panel 64 is manipulated to input the data for determining a correction value for the rack position.

As the data for setting a correction value is input by manipulating the switch SW2 as described above, the ACL control unit 81 calculates a correction value at the position of the accessor 8. When the correction value is within a range in which the correction can be accomplished, the rack position is corrected and the correction value is stored in the work memory 94. In the ordinary operation, thereafter, the correction value for the rack position stored in the work memory 94 is used for controlling the positioning of the accessor 8. No matter how many reference racks exist, each rack position is corrected in the same manner as described above.

When the power source circuit is broken, the above-mentioned correction value may be stored in the EEPROM 107 which is a nonvolatile memory. When the power source circuit is closed in the next time, the correction value may be read out by the work memory 94 to execute the control operation. Here, when the correction value is corrected again, the correction value in the EEPROM 107 is replaced by a newly corrected value.

Figure 32:
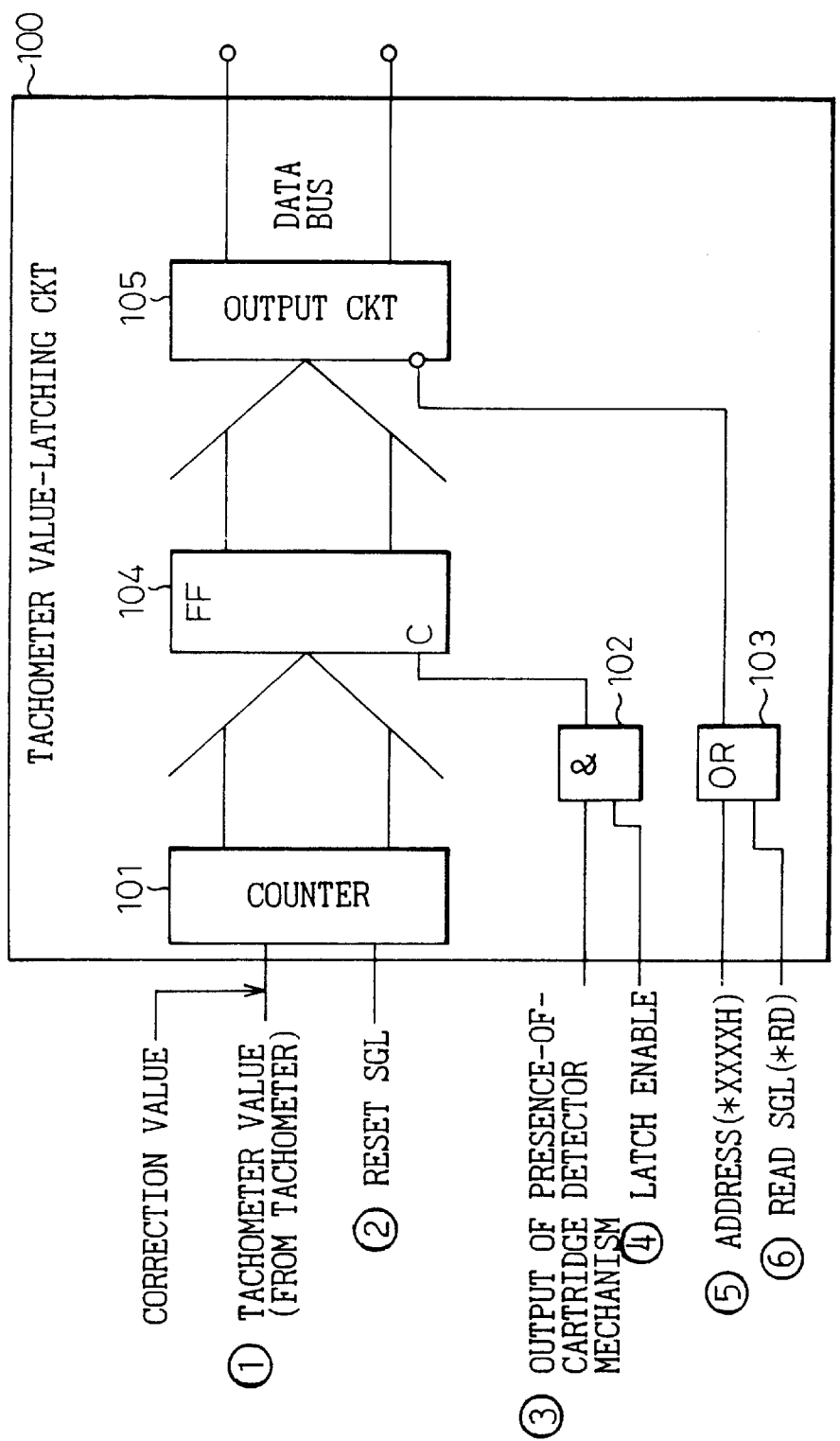
FIG. 32 is a block diagram illustrating in detail a circuit for latching a tachometer value according to the embodiment.

(2) A tachometer value latch circuit for correcting the rack position—see FIG. 32.

FIG. 32 is a block diagram illustrating in detail the tachometer value latch circuit. Use is made of the circuit shown in FIG. 32 for latching the tachometer value at the time when the presence-of-cartridge detector mechanism has produced an output.

This circuit is constituted by a counter 101, an AND circuit 102, an OR circuit 103, a flip-flop circuit (hereinafter referred to as "FF") 104 and an output circuit 105. The following signals are input to the tachometer value latch circuit 100. That is, ① a tachometer value and ② a reset signal are input to the counter 101, ③ the output of the presence-of-cartridge detector mechanism and ④ a latch enable signal are input to the AND circuit (& circuit) 102, and ⑤ an address (*XXXXH) and ⑥ a read signal (RD) are input to the OR circuit 103.

The tachometer value ① is an output of a tachometer (value measured by the tachometer) which is provided in the accessor mechanism and counts the number of revolutions of a motor that ascends or descends the accessor 8. Therefore, the tachometer value represents a distance by which the accessor 8 has ascended or descended. The reset signal ② is the one (having either a high level "1" or a low level "0") output from the MPU 91 in the ACL control unit 81. When the reset signal assumes "1", the counter 101 is reset (cleared).

The output ③ of the presence-of-cartridge detector mechanism is output from the presence-of-cartridge sensor 25, and is processed through the level comparator 83 and the sensor control unit 98, and is input to the tachometer value latch circuit 100. The output ③ of the presence-of-cartridge detector mechanism assumes the high level "1" when the rack of the cell mechanism 10 is detected by the presence-of-cartridge detector sensor 25 and assumes the low level "0" when no rack is detected (e.g., the signal assumes the high level "1" depending upon the rise or break of the output signal of the presence-of-cartridge sensor 25).

The latch enable signal ④ is output from the MPU 91 in the ACL control unit 81, and assumes the high level 1 in the latch enable state and assumes the low level 0 in other state.

The address ⑤ (*XXXXH) and the read signal ⑥ (*RD) are output from the MPU 91 in the ACL control unit 81.

In the tachometer value latch circuit 100, the counter 101 is reset (cleared) as the reset signal ② assumes "1" and counts the tachometer value as the reset signal ② assumes "0". The FF 104 is cleared when the AND circuit 102 produces an output of the low level "0", and latches the counter value (tachometer value) of the counter 101 when the output ③ of the presence-of-cartridge detector mechanism assumes "1", the latch enable signal ④ assumes "1" and the output of the AND circuit 102 assumes "1".

When the address ⑤ or the read signal ⑥ assumes "1", the output circuit 105 reads (takes in) the data latched by the FF 104, and puts the data onto a data bus so as to be recognized by the MPU 91. For instance, the MPU 91 sends the read signal ⑥ to the tachometer value latch circuit 100 and reads the data (tachometer value) on the data bus to recognize the tachometer value.

Figure 33:
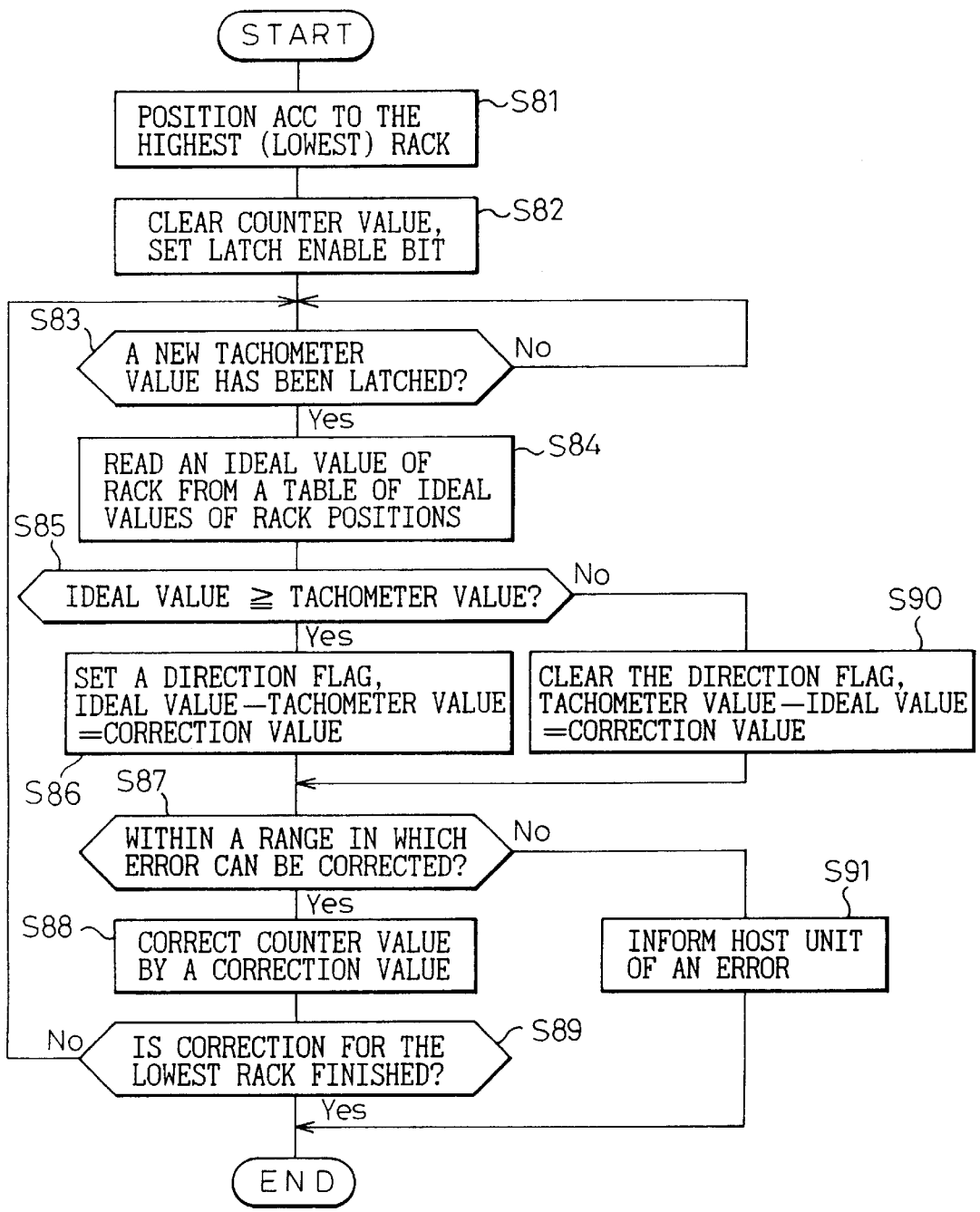
FIG. 33 is a flowchart of a control operation for correcting the rack position according to the embodiment.

(3) Correcting the rack position of the cell mechanism—see FIG. 33.

FIG. 33 is a flowchart for correcting the rack position. The control operation for correcting the rack position (in the case of single unit=ACL apparatus for a single unit+MTU) will now be described with reference to FIG. 33 wherein S81 to S91 denote steps of the process.

When the rack position of the cell mechanism 10 is to be corrected, first, the accessor 8 is brought to a position of the highest (or lowest) rack of the cell mechanism 10 being controlled by the ACL control unit 81 (S81). In this case, the position (tachometer value) of the accessor 8 is latched relying upon the output ③ (rising or breaking) of the presence-of-cartridge detector mechanism and, hence, the latch enable bit ④ is set to "1", the reset signal ② is set to "1" and, then, the counter 101 is cleared (S82).

In this state, the ACL control unit 81 drives the motor for raising/lowering the accessor so that the accessor 8 is slowly descended (or ascended), and checks whether a new tachometer value has been latched or not (S83). Here, as the accessor 8 descends or ascends to come to the next rack position, the presence-of-cartridge sensor 25 detects the rack, whereby the output ③ of the presence-of-cartridge detector mechanism assumes "1" and a tachometer value counted by the counter 101 is latched by the FF 104.

Then, the MPU 91 outputs the address ⑤ or the read signal ⑥ to the tachometer value latch circuit 100 to take the tachometer value latched by the FF 104 into the output circuit 105 and to put it onto the data bus, so that the tachometer value (that is latched) on the data bus can be checked. When the output ③ of the presence-of-cartridge detector mechanism assumes "0", the tachometer value that is latched is not put onto the data bus.

When a new tachometer value has been latched as a result of checking whether the tachometer value is newly latched or not, the MPU 91 reads out an ideal value of a corresponding rack position from a "Table of Ideal Values of Rack Positions" stored in the EEPROM 107 (S84) and compares it with the latched tachometer value (ideal value of rack position)≧(latched tachometer value) (S85).

As a result, when (ideal value of rack position)≧(latched tachometer value), the MPU 91 sets a "direction flag" to the work memory 94, finds a difference (ideal value of rack position−latched tachometer value) between the ideal value of the rack position and the latched tachometer value, and stores the difference as a correction value in the work memory 94 (S86).

When (ideal value of rack position)<(latched tachometer value), the "direction flag" stored in the work memory 94 is reset (S90), a difference (latched tachometer value−ideal value of rack position) is found between an ideal value of the rack position and the latched tachometer value, and the difference is stored as a correction value in the work memory 94 (S90).

After the processing of step S86 or S90 is finished, the MPU 91 determines whether the correction value is within a range in which it can be corrected or not (S87). When the value lies outside the range of correction, the host unit is informed of an error (S91) and the processing is finished. When the error is within a range of correction, however, the value counted by the counter 101 is corrected by the correction value (S88).

When (ideal value of rack position)≧(latched tachometer value), then, correction value=(ideal value of rack position−latched tachometer value). Therefore, the MPU 91 adds the correction value to the value counted by the counter 101 to obtain a correct tachometer value (value of the counter 101 is counted up by the correction value). Furthermore, when (ideal value of rack position)<(latched tachometer value), then, correction value=(latched tachometer value−ideal value of rack position). Therefore, the value counted by the counter 101 is counted down by the correction value to obtain a correct tachometer value.

Thus, the correction is effected for each of the racks, and the process are repeated starting from step S83 until the positions are corrected up to the lowest (or highest) rack. When the correction is finished for the lowest (or highest) rack (S89), the process all end.

When being connected to the library unit (ACL apparatus 5 for attachment to a library unit+MTU+library unit), the processing can be executed in the same manner as described above. In this case, however, the cell mechanism 10 includes the entry cell 13 and the exit cell 14 only and, hence, the correction processing may be executed for these racks.

Figure 34:
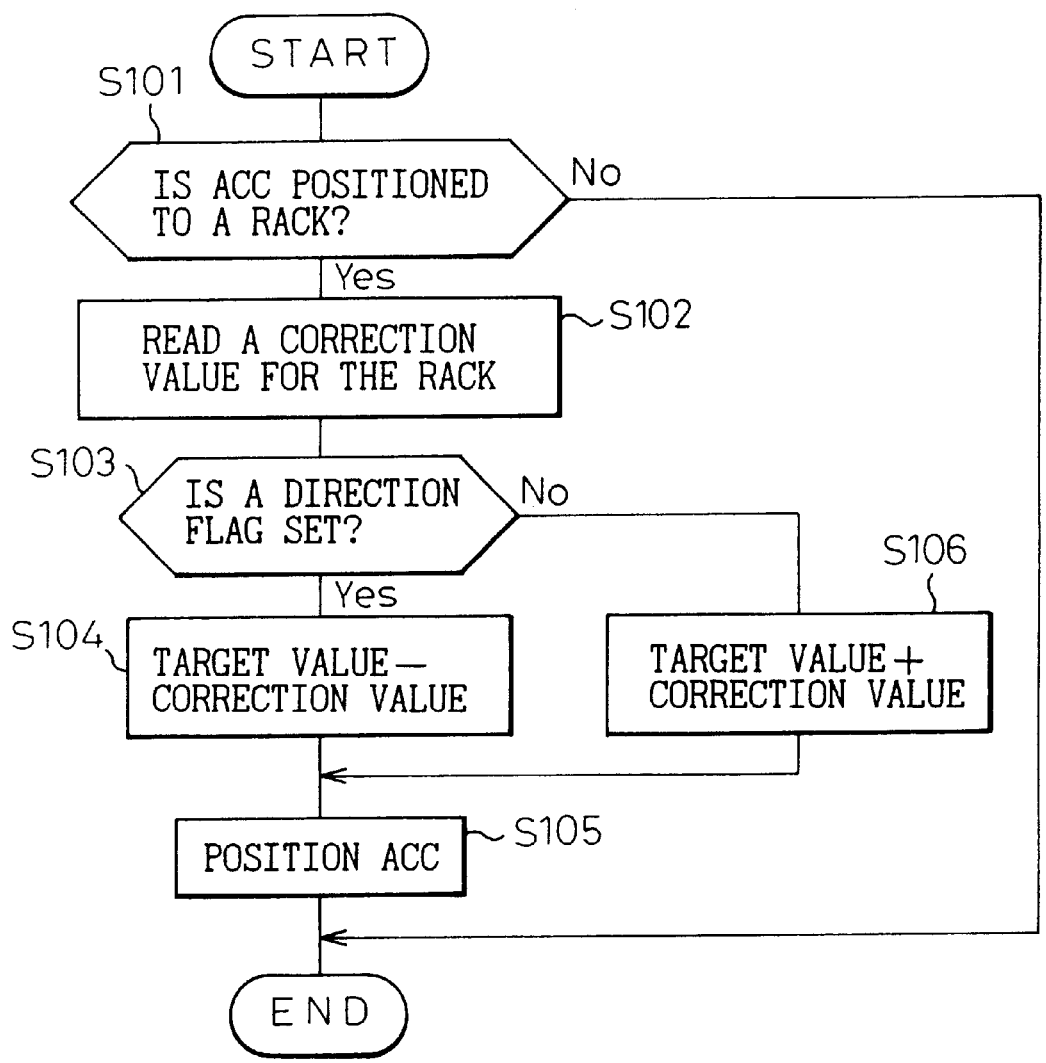
FIG. 34 is a flowchart of a control operation for controlling the positioning by using a correction value according to the embodiment.

(4) Positioning by using a correction value—see FIG. 34.

FIG. 34 is a flowchart for controlling the positioning by using a correction value. The control operation for positioning by using the correction value will now be described with reference to FIG. 34, wherein symbols S101 to S106 denote steps of the process.

When the accessor 8 is to be positioned to any one of the racks depending upon a command from the host unit (S101), the MPU 91 accesses the work memory 94 to read a correction value for the rack (S102), and checks whether a direction flag has been set for the correction value of the rack or not (S103).

Depending upon whether the direction flag has been set to the correction value or not, the MPU 91 determines the direction for correction (upward direction or downward direction), and adds the correction value (S106) to, or subtracts the correction value (S104) from, a target value (value of a desired rack position to which the accessor 8 will be positioned) thereby to correct the target value. After the target value is corrected, the accessor 8 is positioned to the rack (S105).

Figure 35:
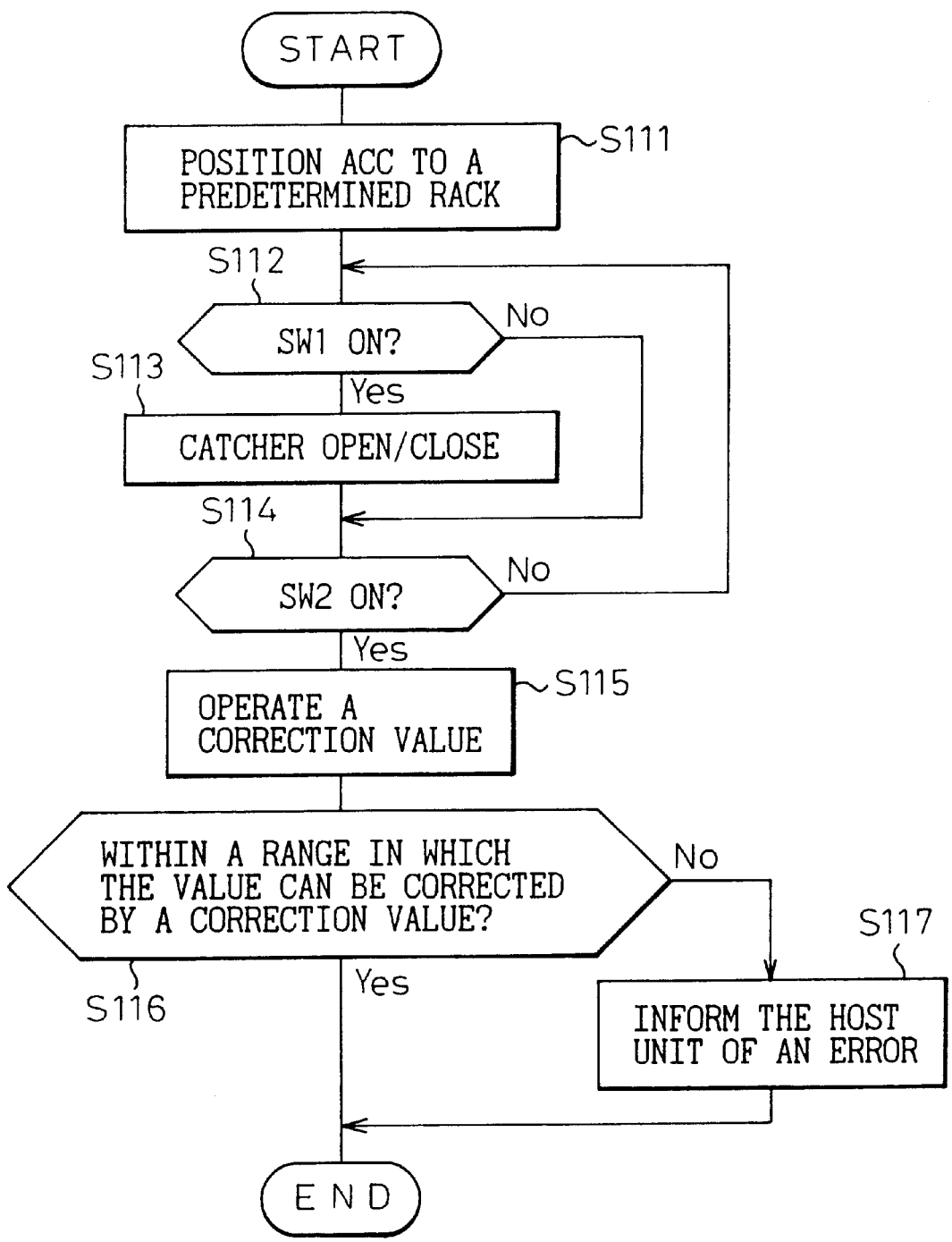
FIG. 35 is a flowchart of a control operation for manually correcting the rack position according to the embodiment.

(5) Correcting the rack position by hand—see FIG. 35.

FIG. 35 is a flowchart of a control operation for manually correcting the rack position. The control operation for manually correcting the rack position will now be described with reference to FIG. 35 wherein S111 to S117 denote steps for the process.

In the ACL apparatus not equipped with a rack position detector mechanism, the rack position is manually corrected in a manner as described below. In the manual correction of rack position, any rack of the cell mechanism 10 is set as a reference rack, the accessor 8 is positioned to the reference rack (S111), and the string screw provided for the ACL apparatus is turned by hand to ascend or descend the accessor 8 in order to bring the accessor 8 to a desired position.

The operator manipulates the switch SW1 provided on the operator panel 64 to open or close the catcher hands 19, and makes sure whether the position is acceptable or not. When the switch SW is turned on (S112), in this case, the ACL control unit 81 opens or closes the catcher hands 19 (S113). It is then determined whether the switch SW2 is turned on or not (S114). When the switch SW2 is turned off and the switch SW1 is turned on, the catcher hands 19 are opened and closed, repetitively.

After it is confirmed that the accessor 8 is at a desired position, the operator manipulates the switch SW2 of the operator panel 64 to input data for determining a value for correcting the rack position. When it is confirmed that the switch SW2 is turned on (S114), the ACL control unit 81 operates a correction value at the position of the accessor 8 (S115). When the value is within a range in which it can be corrected by the correction value, then, the value is corrected (S116) and the corrected value is stored in the work memory 94.

When the value is outside the range of correction at step S116, the host unit is informed of an error, and the processing ends. The correction value is calculated by the MPU 91 in the ACL control unit 81. When the accessor 8 is ascended or descended, the MPU 91 obtains the number of revolutions of the motor for raising/lowering the accessor from the tachometer output (tachometer value), and obtains the correction value from this data and an ideal value in the table of ideal values in the EEPROM 107.

§12: Pushing in the Leader Block—see FIGS. 36 to 38.

(1) Outline of the operation for pushing in the leader block.

Even when a cartridge from which the leader block is pulled out is loaded into the cell mechanism 10, the cartridge is pushed onto the leader block pushing member 30 provided for the ACL apparatus. Thus, the leader block is pushed in.

In this case, the accessor 8 is provided with a cartridge feeder mechanism (comprising feeder motors 23, feeder belts 43, etc.). The cartridge is conveyed by the accessor 8 from the rack of the cell mechanism 10→accessor 8, accessor 8→MTU 6, accessor 8→rack of cell mechanism 10, MTU 6→accessor 8, and is further conveyed to the position of the leader block pushing member 30, whereby the cartridge is returned (discharged) by the cartridge feeder mechanism and is pushed onto the leader block pushing member 30, so that the leader block is pushed in.

When a cartridge is loaded into the MTU 6 and when it is detected that the leader block has been pulled out, the cartridge is discharged from the MTU 6. Then, the leader block is pushed onto the leader block pushing member 30 so as to be pushed in as described above. Then, the cartridge is loaded again into the MTU 6. When the ACL apparatus is connected to the library unit (ACL apparatus 5 for attachment to a library unit), the leader block is necessarily pushed in when the cartridge is to be discharged onto the exit cell 14.

Figure 36:
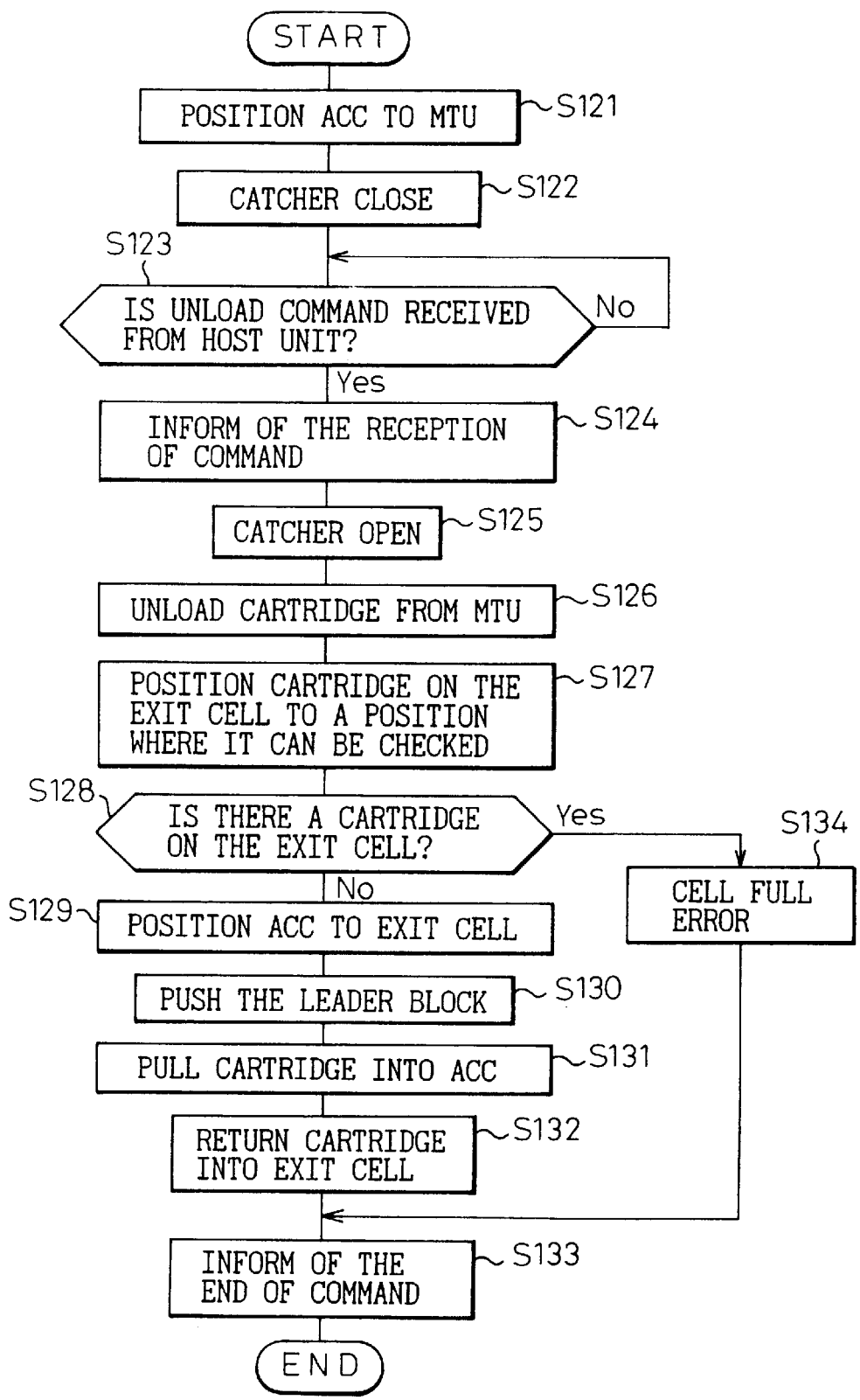
FIG. 36 is a flowchart of a control operation for discharging the cartridge with the ACL apparatus being connected to a library unit according to the embodiment.

(2) Pushing in the leader block whenever the cartridge is to be discharged onto the exit cell with the ACL apparatus being connected to the library unit—see FIG. 36.

FIG. 36 is a flowchart for discharging the cartridge with the ACL apparatus being connected to the library unit. Described below with reference to FIG. 36 is a processing for discharging the cartridge with the ACL apparatus being connected to the library unit. Symbols S121 to S134 denote steps of the process.

The cartridge processed by the MTU 6 is discharged onto the exit cell 14 in the manner described below. First, the ACL control unit 81 brings the accessor 8 to a position of the MTU 6 (S121) and brings the catcher hands 19 to the catcher closed state (MTU 6 side is opened) (S122). In this state, the ACL control unit 81 waits for an unload command from the host unit (S123). Upon receiving the unload command from the host unit through the communication memory 92, the ACL control unit 81 informs the host unit of the reception of the unload command (S124).

The ACL control unit 81 drives the catcher motor 21 to establish the catcher open state (MTU 6 side is closed) (S125), causes the catcher hands 19 to grip the cartridge when it is discharged from the MTU 6 and pulls it into the accessor 8 (S126). In this state, the accessor 8 is moved, and the cartridge on the exit cell 14 is brought to a position where it can be checked (S127) in order to detect whether there is a cartridge on the exit cell 14 or not (S128).

As a result, when there is a cartridge on the exit cell 14, the ACL control unit 81 informs the host unit of a self error (cartridge is jammed in the exit cell 14) (S134) and informs the host unit of the end of the unload command (S133). When it is determined at step S128 that there is no cartridge on the exit cell 14, the ACL control unit 81 brings the accessor 8 to the position of the exit cell 14 (same position as the leader block pushing member 30) (S129), drives the feeder motors 23 and rotates the feeder belts 43, so that the leader block of the cartridge is pushed onto the leader block pushing member 30 (S130). Owing to this operation, the leader blocks of the cartridge are reliably pushed in so that the leader blocks will not be pulled out.

Next, the feeder belts 43 are turned by the feeder motors 23 to pull the cartridge again into the accessor 8 (S131). The feeder belts 43 are turned by the feeder motors 23 to discharge the cartridge into the exit cell 14 (S132). After the cartridge is discharged, the host unit is informed of the end of the unload command (S133).

Figure 37:
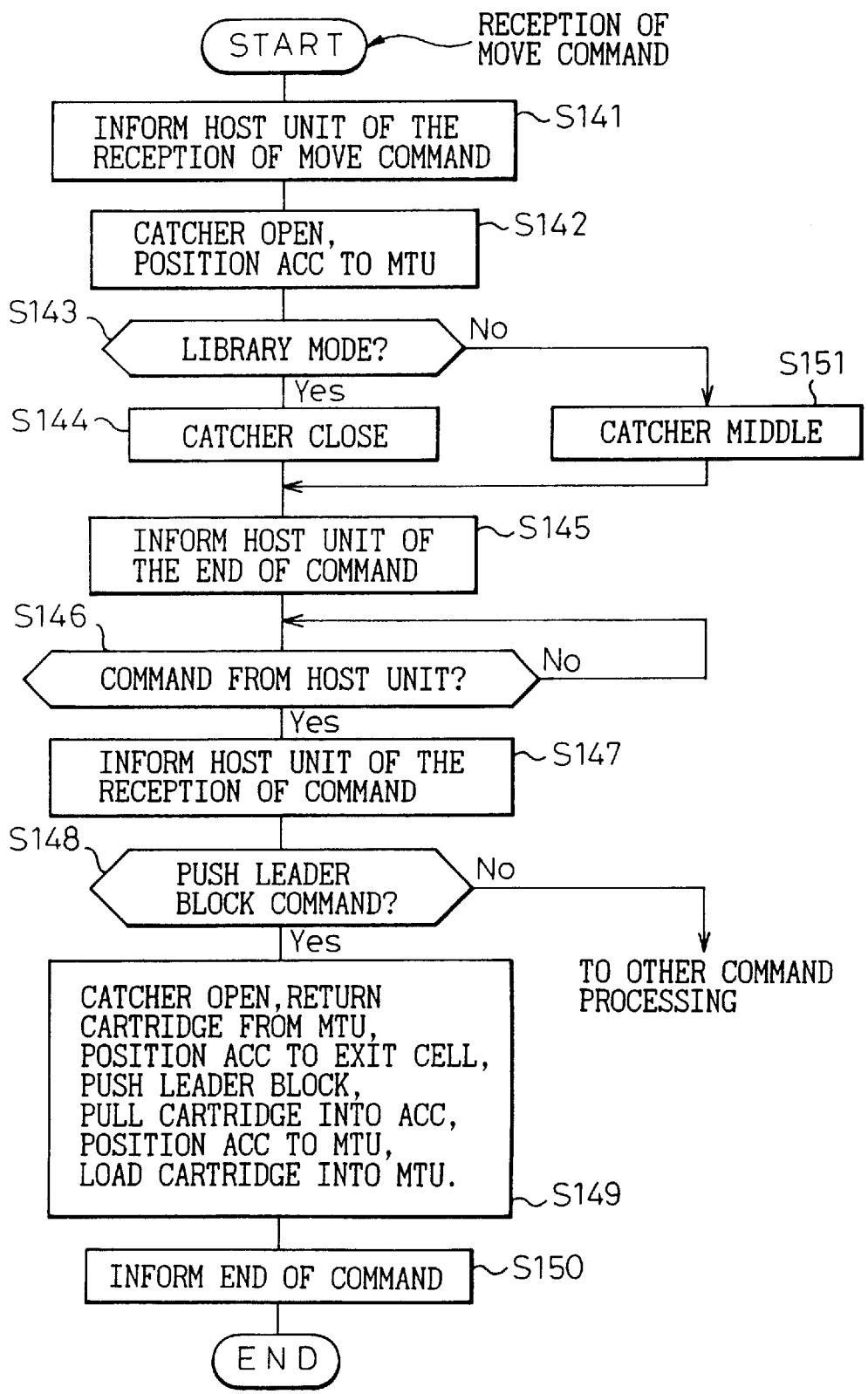
FIG. 37 is a flowchart of a control operation for pushing in the leader block (when a cartridge from which the leader block is pulled out is loaded into the MTU) according to the embodiment.

(3) Processing for pushing in the leader block (when a cartridge from which the leader block is pulled out is loaded)—see FIG. 37.

FIG. 37 is a flowchart of a process for pushing in the leader block (process for when a cartridge from which the leader block is pulled out is loaded into the MTU). Described below with reference to FIG. 37 is the process for pushing in the leader block of a cartridge from which the leader block is pulled out is loaded into the MTU. Symbols S141 to S151 denote steps of processing.

When a cartridge from which the leader block is pulled out is loaded into the MTU 6, the leader block is pushed in as described below. First, when a move command is received from the host unit, the ACL control unit 81 informs the host unit of the reception of the move command (S141). Then, the catcher motor 21 is driven to establish the catcher open state (MTU 6 side is closed), and the accessor 8 is positioned to the MTU 6 (S142).

Then, the ACL control unit 81 determines whether the connection-to-library unit mode has been established or not (when the connection-to-library unit mode has been established, the ACL control unit 81 is informed of data related to connection to the library unit from the host unit) (S143). When the connection-to-library unit mode has been established, the ACL control unit 81 regards it to be the catcher closed state (MTU 6 side is opened)(S144) and informs the host unit of the end of move command (S145). When the connection-to-library unit mode has not been established, the ACL control unit 81 regards it to be the catcher middle state (S151) and informs the host unit of the end of move command (S145).

Then, the ACL control unit 81 waits for a command from the host unit (S146). Upon receipt of the command from the host unit, the ACL control unit 81 informs the host unit of the reception of the command (S147). In this case, when the command is not a leader block push-in command (push-the-leader-block command), the command that is received is processed. When the command is the leader block push-in command (push-the-leader-block command), the processing for pushing the leader block is executed as described below (S149).

In this case, the ACL control unit 81 brings the catcher hands 19 to the catcher open state (MTU 6 side is closed). When the cartridge is discharged from the MTU 6, the discharged cartridge is gripped by the catcher hands 19 and is pulled into the accessor 8. The accessor 8 is brought to the position of the exit cell 14 (same position as the leader block pushing member 30), the cartridge is discharged, and the leader block is pushed onto the leader block pushing member 30, so that the leader block is pushed in.

Thereafter, the cartridge is pulled again into the accessor 8, and the feeder motors 23 are driven to load the cartridge into which the leader block has been pushed into the MTU 6. Thereafter, the ACL control unit 81 informs the host unit of the end of command (S150).

Figure 38:
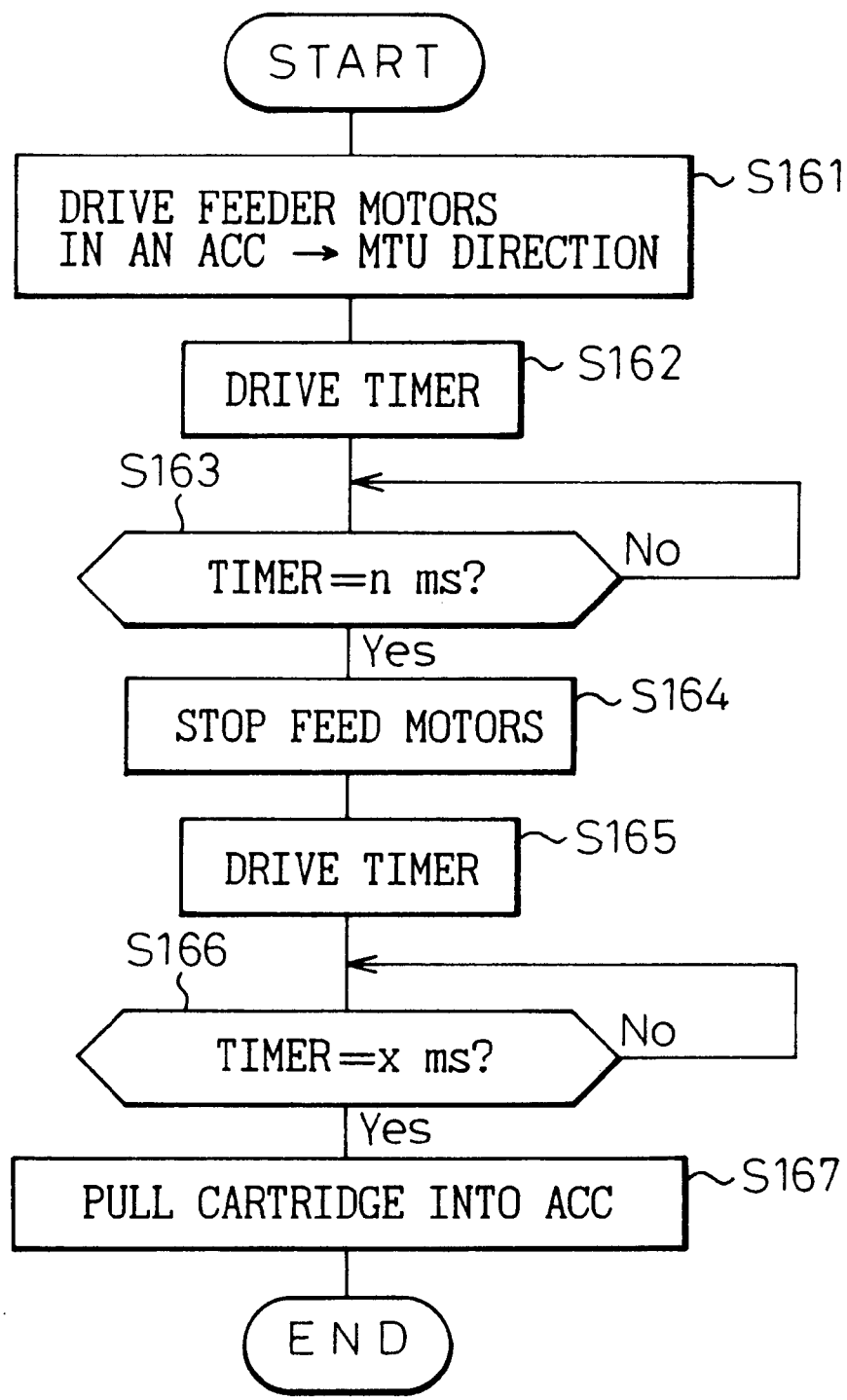
FIG. 38 is a flowchart of a control operation for pushing in the leader block according to the embodiment.

(4) Detailed description of the control operation for pushing in the leader block—see FIG. 38.

FIG. 38 is a flowchart illustrating a control operation for pushing in the leader block. The operation for pushing in the leader block will now be described in detail with reference to FIG. 38, wherein S161 to S167 denote steps of the process.

The leader block is pushed in as described above. The control operation for pushing in the cartridge is executed as described below. First, the ACL control unit 81 positions the accessor 8 to the exit cell 14 (same position as the leader block pushing member 30), and the feeder motors 23 drive the accessor 8 toward the MTU 6 (S161).

At this moment, the ACL control unit 81 drives the timer 106 (S162) to start measuring the time. The timer then determines whether a time n (ms) has passed or not (S163). When a time n (ms) has passed, the feeder motors 23 are stopped.

Thereafter, the ACL control unit 81 drives the timer 106 again to start measuring the time (S165). It is then supervised by the timer 106 whether a time x (ms) has passed or not (S166). When x (ms) has passed, the cartridge is pulled into the accessor 8 (S167).

§13: Control operation for preventing the feeder belts from being worn out at the same portions that results from when the feeder belts are turned with no load—see FIG. 39.

(1) Outline of the processing for preventing the feeder belts from being worn out at the same portions.

The accessor 8 is provided with a feeder mechanism which comprises feeder motors 23, feeder belts 43, etc. The feeder motors 23 are driven to turn the feeder belts 43, and the cartridge is conveyed as the portions of the feeder belts 43 come into contact with the cartridge.

The feeder belts 43 are rotating with their same portions only being in contact with the cartridge, and particular portions only are worn out. This is because, the cartridge is repetitively moved in a manner of accessor 8→MTU 5, MTU→accessor 8, accessor 8→rack, rack→accessor 8, and the feeder belts 43 are turning over the same portions at all times.

Therefore, the feeder belts 43 are turned to some extent in a state where there is no cartridge on the accessor 8, to prevent the feeder belts from turning over the same portions. Thus, the feeder belts 43 are prevented from wearing out.

Figure 39:
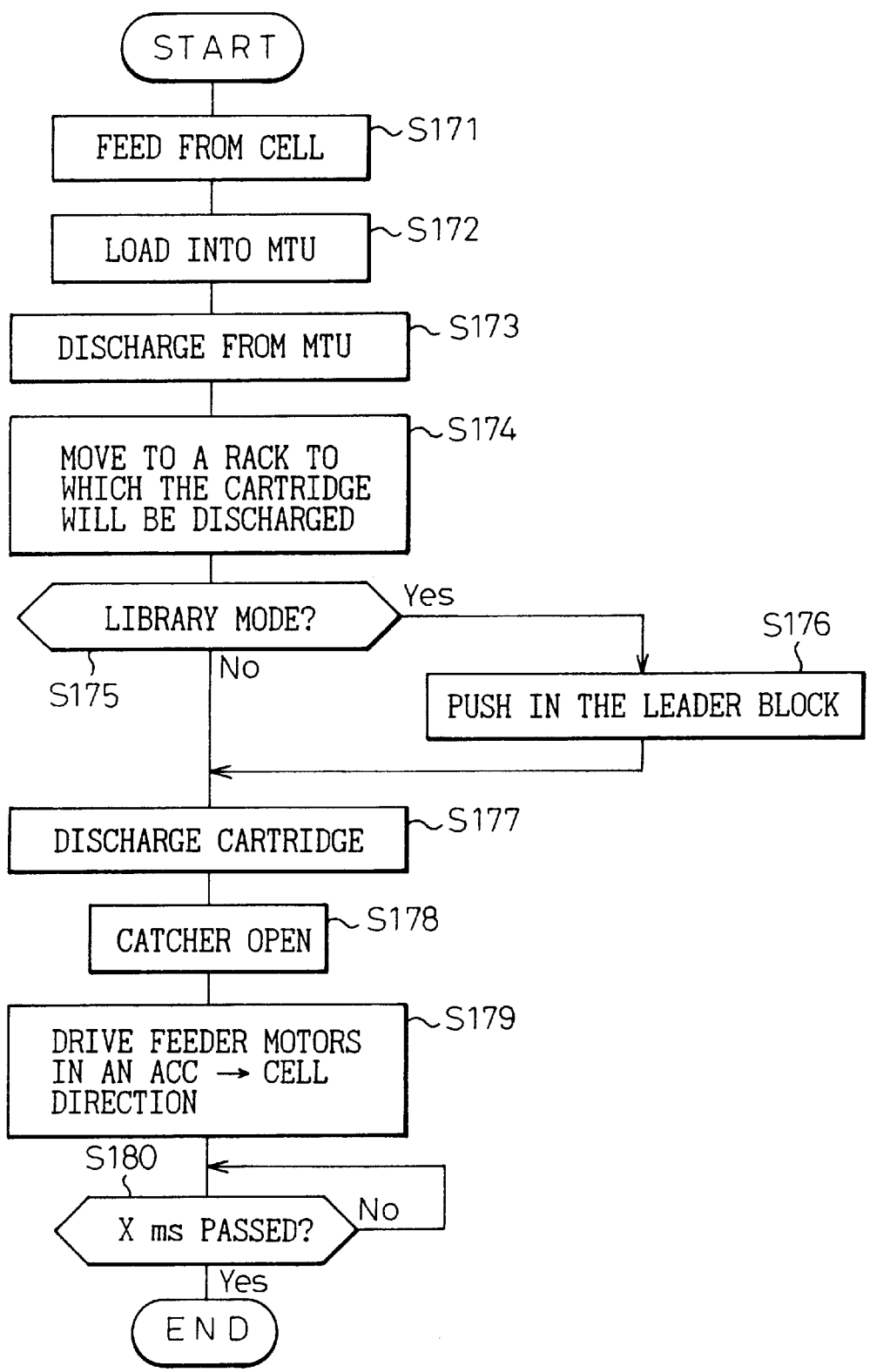
FIG. 39 is a flowchart of a process for turning the feeder belts with no load according to the embodiment.

(2) Description of the processing with reference to a flowchart—see FIG. 39.

FIG. 39 is a flowchart for turning the feeder belts with no load. Described below with reference to FIG. 39 is the control operation for preventing the feeder belts from being worn out at the same portions only due to turning of the feeder belts with no load. Symbols S171 to S180 denote steps of the process.

Usually, the cartridge is fed into the accessor 8 from a rack of the cell mechanism 10 (S171), the accessor 8 is positioned to the MTU 6, and the cartridge is loaded into the MTU 6 (S172). The cartridge that is processed by the MTU 6 is then discharged therefrom (S173). The cartridge is then fed into the accessor 8 which is moved to be positioned to a rack of the cell mechanism 10 into which the cartridge is to be discharged (S174).

It is then determined if the connection-to-library unit mode has been established or not (S175). When the connection-to-library unit mode has been established, the cartridge is pushed onto the leader block pushing member 30 in the same manner as described above to push in the leader block (S176). The cartridge is then discharged into the exit cell 14 (S177). When the connection-to-library unit mode has not been established, the cartridge is simply discharged into the rack (S177).

After the cartridge is discharged as described above, the ACL control unit 81 assumes the catcher open state (S178), and the feeder motors 23 are driven in a direction in which the accessor 8 moves toward the cell mechanism 10 (S179), and the feeder belts 43 are driven for a period of x (ms) (S180). Then, the feeder belts 43 turn to some extent with no load; i.e., positions of the feeder belts 43 contacted to the cartridge are deviated.

§14: Control Operation for Feeder Learning—see FIG. 40.

(1) The accessor 8 is provided with the first cell side sensor 38 and the second cell side sensor 39 which detect a cartridge present in the accessor 8. In this case, the cartridge is properly held when it is detected by the second cell side sensor 39 but is not detected by the first cell side sensor 38.

Accordingly, learning is controlled by using these two sensors. In this learning control operation, the cartridge is pulled into the accessor 8 from the rack of the cell mechanism 10 and, at this moment, the time is measured from when the cartridge is detected by the first. cell side sensor 38 until when it is detected by the second cell side sensor 39.

The MPU 91 in the ACL control unit 81 compares the above measured time with a "reference time" that has been stored in the EEPROM 107, finds a difference between the two, adjusts a PWM value for driving the feeder motors 23 from the difference, and forms an adjusted PWM value. The adjusted PWM value is set to the memory in the PWM control unit 96.

When the feeder motors 23 are to be controlled next time, a voltage to be applied to the feeder motors 23 is adjusted relying upon the above adjusted PWM value to control the drive. The control operation is repetitively carried out to accomplish the learning, and the feeder motors 23 are PWM-controlled relying upon a proper PWM value at all times. Since the PWM value has been adjusted to a proper value, the overrunning amount when the cartridge is fed can be properly adjusted at all times.

(2) Description of the control operation for feeder learning with reference to a flowchart.

Figure 40:
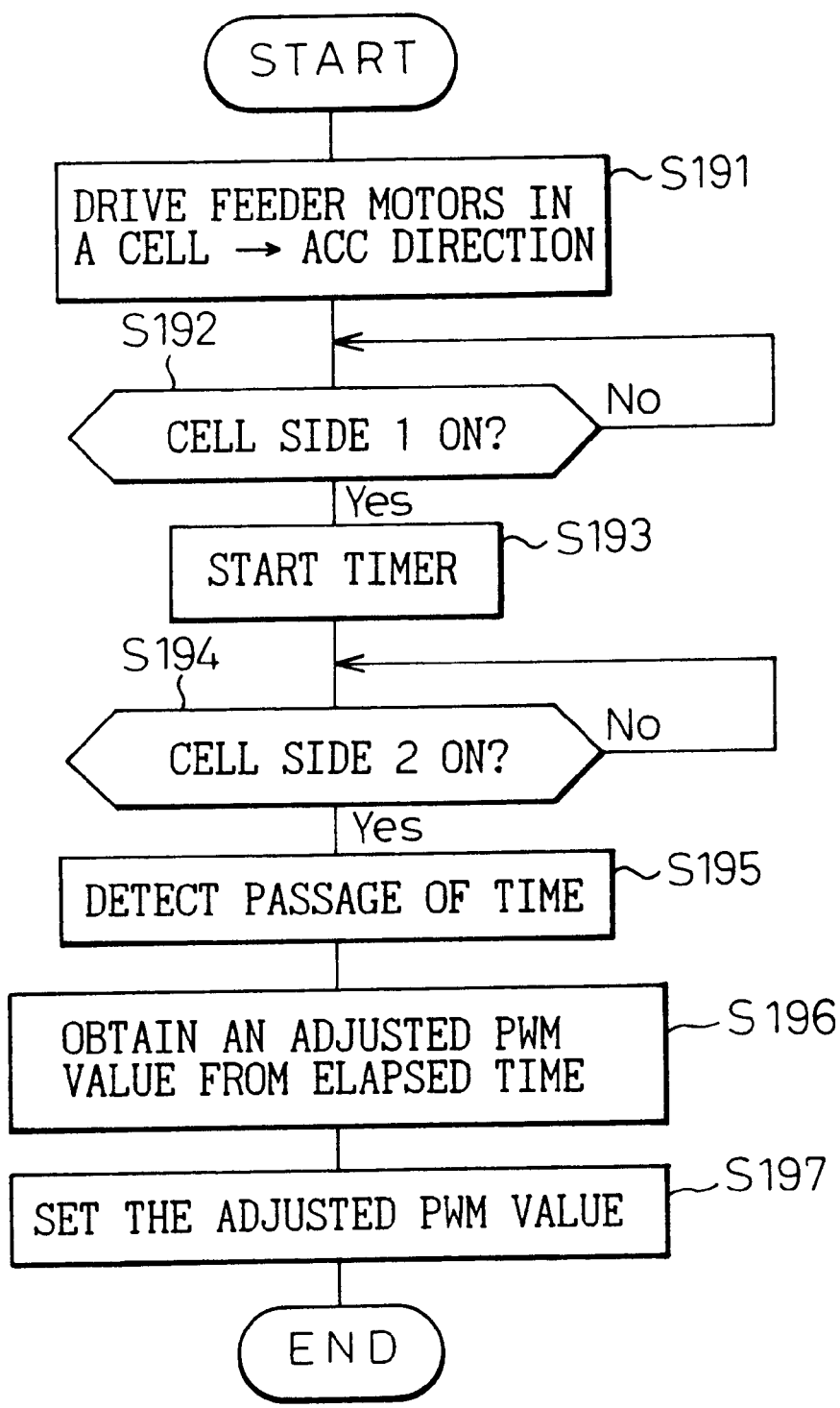
FIG. 40 is a flowchart of a process for feeder learning according to the embodiment.

FIG. 40 is a flowchart of a process for feeder learning. The control operation for feeder learning will now be described with reference to FIG. 40 wherein S191 to S197 denote steps of the process.

First, the feeder motors 23 are driven in a direction to pull the cartridge into the accessor 8 from a rack of the cell mechanism 10 (S191). Then, the timer 106 is driven at a moment when the first cell side sensor 38 is turned on (upon detecting the cartridge) (S192) in order to start measuring the time (S193). Then, the passage of time is measured (S195) until the second cell side sensor 39 is turned on (S194). After the above passage of time is measured, a PWM value adjusted depending upon the lapse of time is obtained for the feeder motors 23 (S196), and the adjusted PWM value is set to the memory in the PWM control unit 96 (S197).

(3) Advantage of feeder learning.

By PWM-controlling the feeder motors 23 using the adjusted PWM value obtained by feeder learning, the speed of the feeder motors 23 can be maintained to be constant at all times. Therefore, after the feeder motors 23 are stopped, the overrunning amount of the cartridge can be set to be constant. Even when the cartridge is to be pulled into the accessor from the rack, therefore, the overrunning amount becomes constant, and the cartridge can be properly pulled into the accessor at all times. Accordingly, the retrying time is eliminated and the time for accessing the cartridge is shortened.

When the cartridge is to be returned back to the rack, furthermore, the cartridge overruns by a predetermined amount and, hence, the cartridge flies by a predetermined amount. Accordingly, the feeder motors 23 can be stopped after the passage of a predetermined period of time from when the first cell side sensor 39 has detected the cartridge. Thus, the cartridge can be fed maintaining a high precision at all times.

§15: Initializing the Cartridge—see FIG. 41.

(1) Outline of the processing for initializing the cartridge.

As described above, the accessor 8 is provided with the first cell side sensor 38 and the second cell side sensor 39, and the cartridge in the accessor 8 is detected by these two sensors. However, the cartridge in the accessor 8 may be lost even though the cartridge exists in the accessor 8 if it is not detected by the above two sensors at the time when the power source circuit is closed. When the power source circuit is closed or an error has occurred, therefore, the cartridge is initialized.

In the control operation for initializing the cartridge, the ACL control unit 81 drives the feeder motors 23 to turn the feeder belts 43 in a direction to pull the cartridge into the accessor 8 from the side of the MTU 6, thereby to feed the cartridge. Thus, the cartridge in the accessor 8 is not lost (MPU 6 recognizes the cartridge).

(2) Description of the processing for initializing the cartridge with reference to as flowchart.

Figure 41:
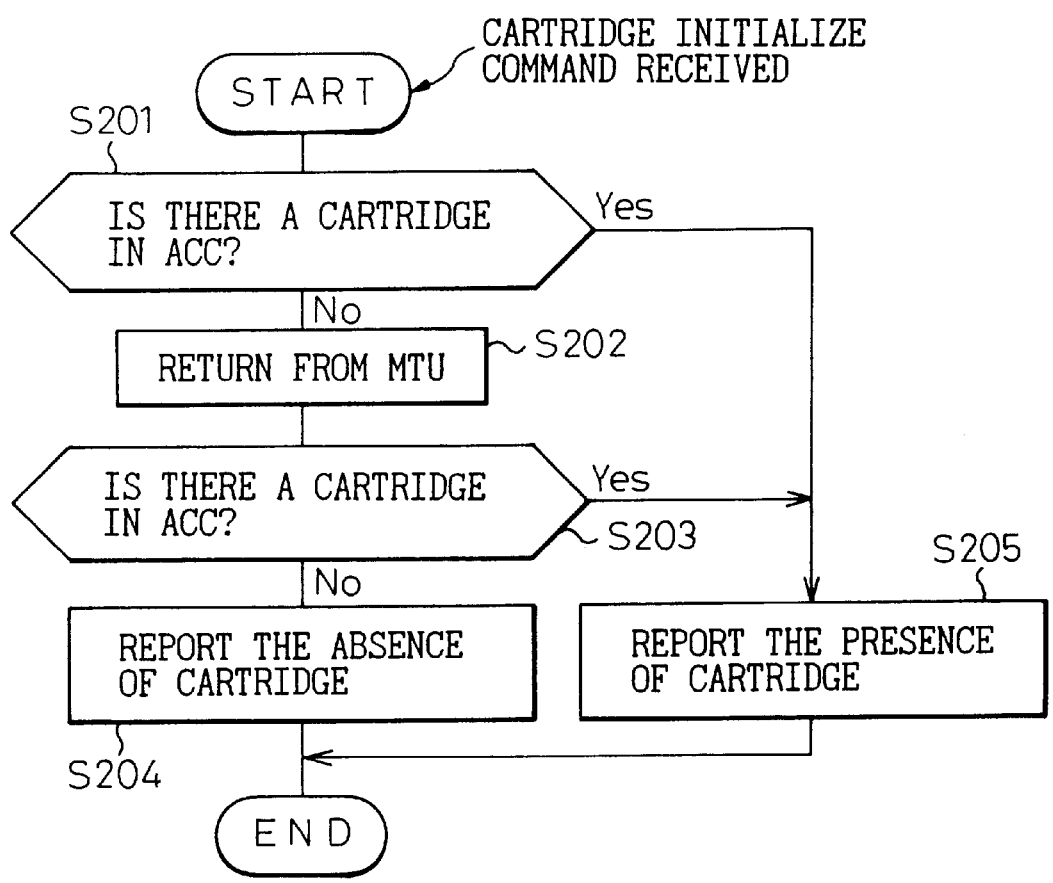
FIG. 41 is a flowchart of a process for initializing the cartridge according to the embodiment.

FIG. 41 is a flowchart of a process for initializing the cartridge. The process for initializing the cartridge will now be described with reference to FIG. 41 wherein symbols S201 to S205 denote steps of the process.

Upon receiving a command for initializing the cartridge from the host unit, the ACL control unit 81 determines whether there is a cartridge in the accessor 8 or not based upon the signals detected by the first cell side sensor 38 and the second cell side sensor 39 (S201).

When it is determined that there is a cartridge in the accessor 8, the ACL control unit 81 informs the host unit of the presence of the cartridge (S205). When it is determined that there is no cartridge in the accessor 8, the ACL control unit 81 drives the feeder motors 23 to turn the feeder belts 43 in a direction to pull the cartridge into the accessor 8 from the side of the MTU 6, so that the cartridge is pulled into the accessor 8 (S202).

In this case, the cartridge is not really pulled into the accessor 8 from the MTU 6, but the operation for pulling the cartridge into the accessor 8 from the MTU 6 is effected for, for example, several seconds only to prevent the cartridge from being lost. After the operation for pulling the cartridge as described above, the ACL control unit 81 determines whether there is a cartridge in the accessor or not (S203). When it is determined that a cartridge exists in the accessor 8, the ACL control unit 81 informs the host unit of the presence of a cartridge.

When it is determined at step S203 that there is no cartridge, the ACL control unit 81 informs the host unit of the absence of cartridge (S204). Depending upon this processing, the ACL control unit 81 recognizes if there is a cartridge in the accessor 8 or not. The processing for initializing the cartridge is effected not only when the power source circuit is closed but also when an error has occurred.

(3) Advantage of the initialization of the cartridge.

The above cartridge initialization control operation makes it possible to make sure of the presence of a cartridge in the accessor when the power source circuit is closed or when an error has occurred without damaging the cartridge, without causing the apparatus to be scarred and without permitting the cartridge to be lost. Thus, the apparatus features enhanced reliability.

§16: Retrying the Feeder Mechanism—see FIGS. 42A to 44.

(1) Outline of the control operation for retrying the feeder mechanism.

When an error occurs in the feeding operation for pulling the cartridge into the accessor 8 or in the operation for returning the cartridge into the MTU 5 or into the rack of the cell mechanism 10, a first time of retrying operation is effected. When an error occurs in the first time of retrying operation, the accessor 8 is brought to an upper position by several millimeters and a second time of retrying operation is effected.

When an error occurs in the second time of retrying operation, a third time of retrying operation is effected. When an error occurs in the third time of retrying operation, then, the accessor 8 is brought to a position which is lower by several millimeters than the initial position, and a fourth time of retrying operation is effected. When an error occurs in the fourth time of retrying operation, a fifth time of retrying operation is effected.

When an error occurs in the fifth time of retrying operation, then, the accessor 8 is brought again to the position of the MTU 6 and is then brought to the initial position, and a sixth time of retrying operation is effected. When an error occurs in the sixth time of retrying operation, then, the host unit is informed of an error and the processing ends. When an error occurs in the first to fifth times of retrying operations, the host unit is informed of the error and the retrying operation of the next time is effected. However, no retrying operation is effected after an error has occured in the sixth time of retrying operation and after the host unit is informed of the error.

Figure 42A:
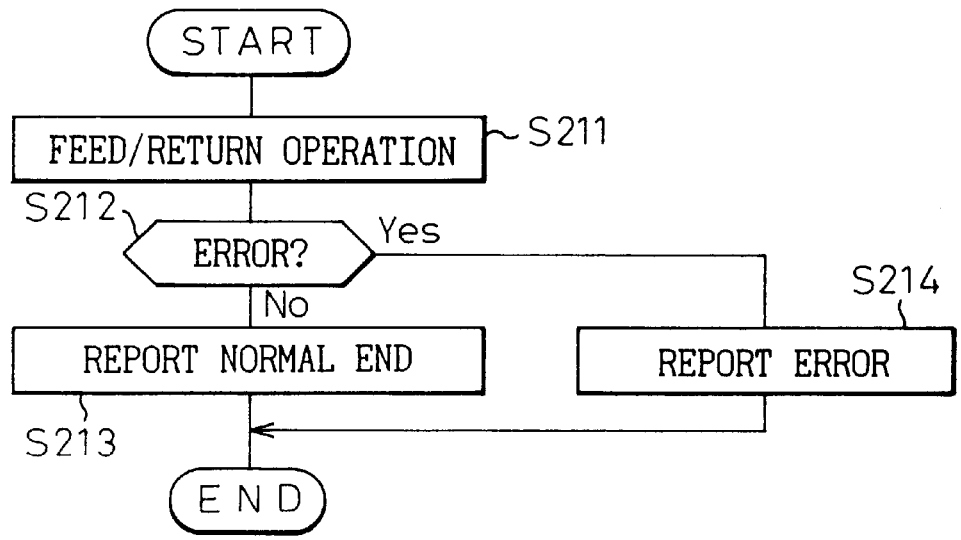
FIG. 42A is a flowchart of a process for retrying the feeder mechanism the first, third and fifth times according to the embodiment.

(2) Retrying the feeder mechanism the first, third and fifth times—see FIG. 42A.

FIG. 42A is a flowchart for retrying the feeder mechanisms in the first, third and fifth times. The processing for retrying the feeder mechanism in the first, third and fifth times will now be described with reference to FIG. 42A, wherein S211 to S214 denote steps of the process.

When an error occurs in the feeding operation for pulling the cartridge into the accessor 8 or in the operation for returning the cartridge into the MTU 6 or into the rack of the cell mechanism 10, the retrying operation is carried out as described above. Here, however, the retrying operations of the first, third and fifth times are carried out as described below. First, the ACL control unit 81 permits the accessor 8 to stay at the same position, feeds/returns the cartridge (S211) and determines if an error has occurred or not (S212).

When no error has occurred, the ACL control unit 81 informs the host unit of the normal end (S213). When an error has occurred, however, the ACL control unit 81 informs the host unit of the error (S214).

Figure 42B:
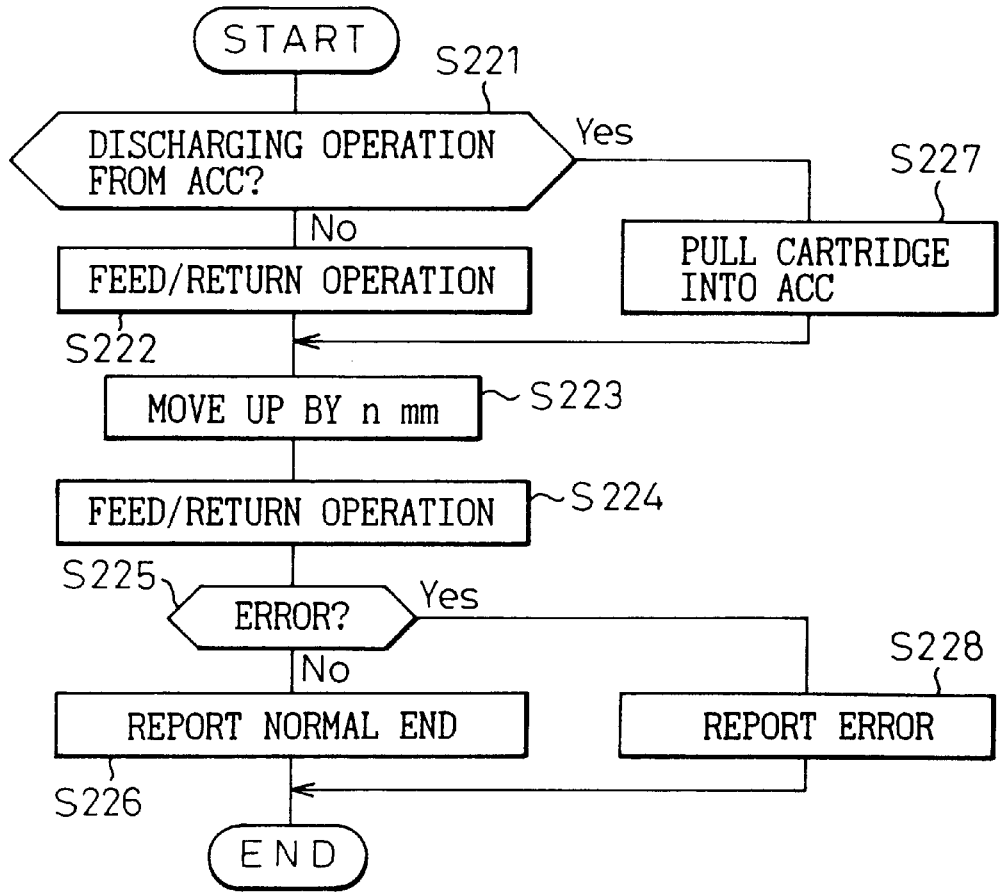
FIG. 42B is a flowchart of a process for retrying the feeder mechanism the second time according to the embodiment.

(3) Retrying the feeder mechanism the second time—see FIG. 42B.

FIG. 42B is a flowchart of a processing for retrying the feeder mechanism the second time. The processing for retrying the feeder mechanism the second time will now be described with reference to FIG. 42B, wherein S221 to S228 denote steps of processing.

In the processing for retrying the feeder mechanism in the second time, it is determined whether the operation is for discharging (returning) the cartridge from the accessor 8 or not (S221). When it is the operation for discharging the cartridge from the accessor 8, the cartridge is pulled into the accessor 8 (S227). When it is not the operation for discharging the cartridge from the accessor 8, the feeding/returning operation is effected to pull the cartridge into the accessor 8 (S222). Thus, the cartridge is pulled into the accessor 8.

After the processing of step S222 or S227, the ACL control unit 81 raises the accessor 8 (upward direction is represented by Y-axis direction) by n mm (S223), effects again the feeding/returning operation (S224) and determines whether an error has occurred or not (S225). When an error occurs, the ACL control unit 81 informs the host unit of the error (S228). When no error occurs, the host unit is informed of a normal end (S226).

Figure 43:
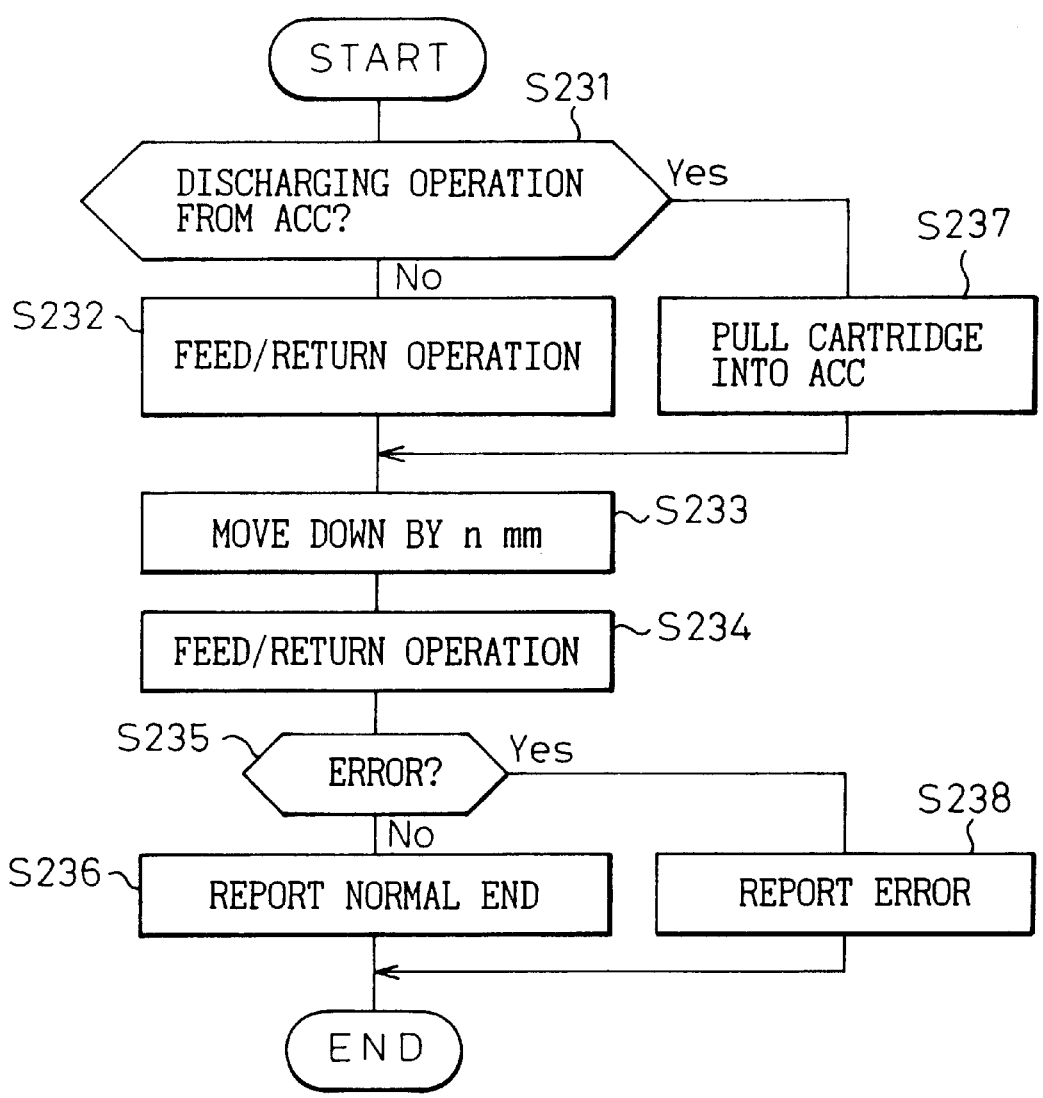
FIG. 43 is a flowchart of a process for retrying the feeder mechanism the fourth time according to the embodiment.

(4) Retrying the feeder mechanism the fourth time—see FIG. 43.

FIG. 43 is a flowchart of a processing for retrying the feeder mechanism the fourth time. The processing for retrying the feeder mechanism the fourth time will now be described with reference to FIG. 43 wherein S231 to S238 are steps of processing.

In the processing for retrying the feeder mechanism the fourth time, it is determined whether the operation is for discharging the cartridge from the accessor 8 or not (S231). When it is the operation for discharging the cartridge from the accessor 8, the cartridge is once pulled into the accessor 8 (S237). When it is not the operation for discharging the cartridge from the accessor 8, the feeding/returning operation is effected to once pull the cartridge into the accessor 8 (S232). Thus, the cartridge is pulled into the accessor B.

After the processing of step S232 or S237, the ACL control unit 81 lowers the accessor 8 by n mm (S233), effects again the feeding/returning operation (S234) and determines whether an error is occurring or not (S235). When an error occurs, the ACL control unit 81 informs the host unit of the error (S238). When no error occurs, the host unit is informed of a normal end (S236).

(5) Retrying the feeder mechanism in the sixth time—see FIG. 44.

FIG. 44 is a flowchart of a processing for retrying the feeder mechanism in the sixth time. Described below with reference to FIG. 44 is a processing for retrying the feeder mechanism in the sixth time. Symbols S241 to S259 denote steps of the process.

In the processing for retrying the feeder mechanism in the sixth time, it is determined whether the operation is for discharging the cartridge from the accessor 8 or not (S241). When it is the operation for discharging the cartridge from the accessor 8, the cartridge is pulled into the accessor 8 (S258). When it is not the operation for discharging the cartridge from the accessor 8, the feeding/returning operation is executed to pull the cartridge into the accessor 8 (S242). Thus, the cartridge is pulled into the accessor 8.

After the processing of step S242 or S258, the ACL control unit 81 brings the accessor 8 to a home position which serves as a reference for positioning (S243), brings the accessor 8 again to the initial position (0 mm)(S244) and effects the feeding/returning operation. When an error occurs, the ACC control unit 81 informs the host unit of the error (S259). When no error occurs, the host unit is informed of a normal end (S247).

(6) Advantage of retrying operation.

The above-mentioned retrying operation makes it possible to recover the erroneous state; i.e., it does not happen that the cartridge is not accessible, and reliability is improved. Even when connected to the library unit, it does not happen that the cartridge is not accessible, and a stop of the library system does not occur.

§17: Pulling/discharging (feeding/returning) the Cartridge—see FIGS. 45A to 50.

Described below with reference to FIGS. 45A to 50 is the operation for pulling/discharging (feeding/returning) the cartridge.

(1) Outline of the process.

The cartridge return sensor 45 provided on the accessor 8 is turned on when the cartridge being discharged (returned) into a rack of the cell mechanism 10 from the accessor 8 is completely held in the rack, and is turned off when the cartridge is gripped by the accessor 8 but has not been properly held in the rack. When the power source circuit is closed or when the accessor 8 is moved, a control operation is carried out to check whether the cartridge return sensor 45 is properly working or not.

When the cartridge return sensor 45 has detected that the cartridge has been broken while the cartridge is being discharged (returned) from the accessor 8 into the rack of the cell mechanism 10, the host unit is informed of an error after the cartridge is discharged onto the rack.

(2) Pulling in the cartridge—see FIGS. 45A to 46B.

Figure 45A:
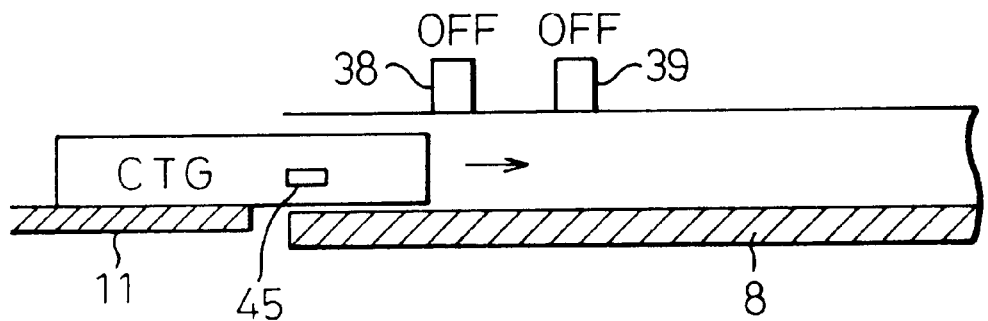
FIGS. 45A to 45C are diagrams of when the cartridge is to be pulled in according to the embodiment.
Figure 45B:
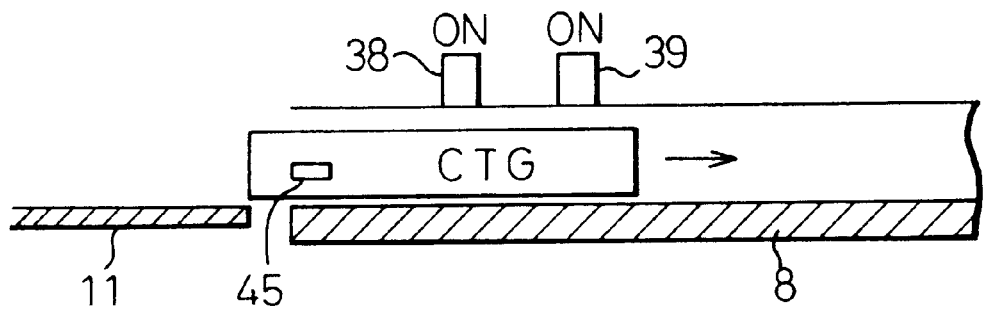
Figure 45C:
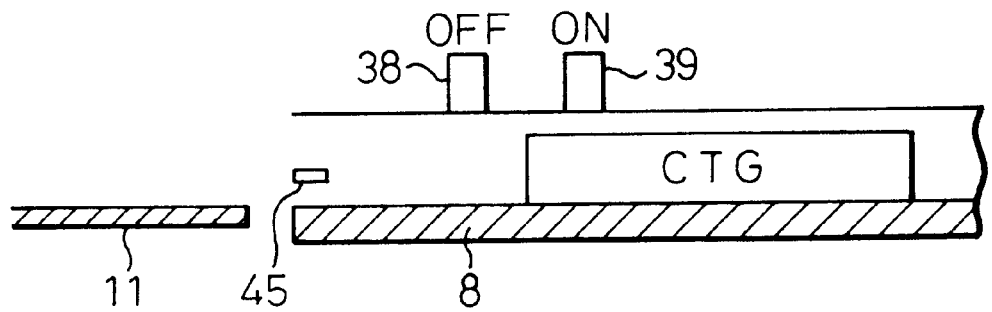
Figure 46A:
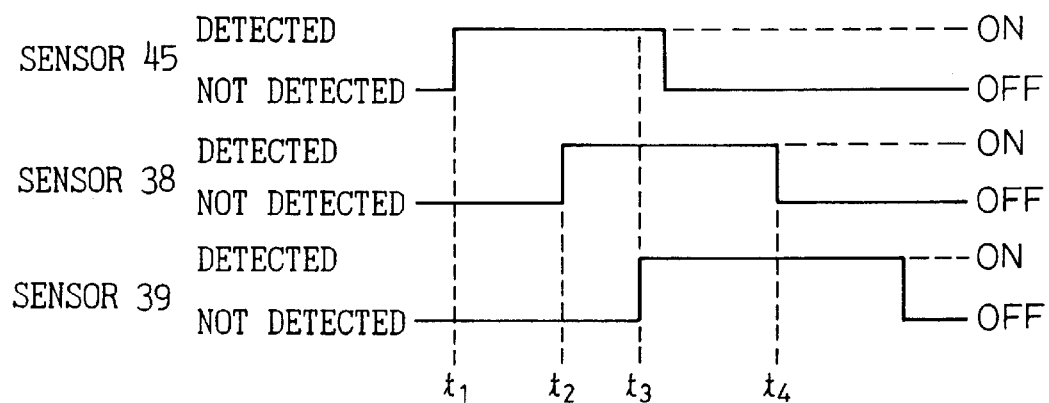
FIGS. 46A and 46B are timing charts according to the embodiment.
Figure 46B:
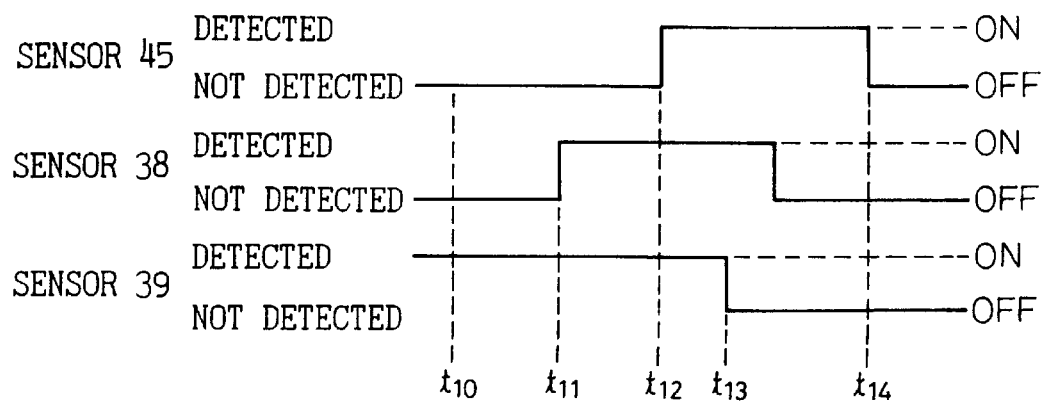

FIGS. 45A to 45C are diagrams of when the cartridge is to be pulled in, and FIGS. 46A and 46B are timing charts 3. Described below with reference to FIGS. 45A to 46B is a control operation for pulling in (feeding) the cartridge into the accessor 8 from a rack 11 of the cell mechanism 10.

Referring to FIGS. 45A to 45C, the accessor 8 is equipped with the cartridge return sensor 45, first cell side sensor 38 and second cell side sensor 39 which are arranged in this order from a side close to the rack 11 of the cell mechanism 10 maintaining a predetermined distance. In this state, a cartridge on the rack 11 of the cell mechanism 10 is pulled (fed) into the accessor 8.

In the operation for pulling in the cartridge, first, the cartridge return sensor 45 detects the cartridge and is turned on as in a state 1 shown in FIG. 45A. In this state, the first cell side sensor 38 and the second cell side sensor 39 do not detect the cartridge but remain turned off.

As the cartridge is further pulled in from the above-mentioned state 1, a state 2 is assumed as shown in FIG. 45B. In this state 2, the cartridge return sensor 45, first cell side sensor 38 and second cell side sensor 39 all detect the cartridge and are turned on. As the cartridge is further pulled in from this state 2, a state 3 is assumed as shown in FIG. 45C.

In the state 3, the cartridge return sensor 45 does not detect the cartridge and is turned off. Besides, the first cell side sensor 38 does not detect the cartridge and is turned off. Then, the second cell side sensor 39 only detects the cartridge and is turned on. Thus, when the second cell side sensor 39 is turned on and the first cell side sensor 38 is turned off, the cartridge stays at the home position, and the cartridge is held at this position (state where the cartridge is held at a proper position).

The cartridge held at the home position of the accessor 8 is discharged into the rack 11 in the reverse order. That is, in the operation for discharging the cartridge, the state 3 is, first, assumed as shown in FIG. 45C. Then, as the cartridge is returned, the state 2 is assumed as shown in FIG. 45B, which is then shifted into the state 1 shown in FIG. 45A. Finally, as the cartridge is discharged into the rack 11, the cartridge return sensor 45 no longer detects the cartridge and is turned off. Thus, at a moment when the cartridge return sensor 45 is turned off, it is so determined that the operation for returning the cartridge into the rack 11 is completed.

The above-mentioned operations are shown by a timing chart of FIGS. 46A and 46B, wherein FIG. 46A is a timing chart of when the cartridge is to be pulled into the accessor 8 from the rack, and FIG. 46B is a timing chart of when the cartridge is to be discharged into the rack from the accessor 8. In pulling the cartridge from the rack 11 as shown in FIG. 46A, first, the cartridge return sensor 45 only detects the cartridge at a timing t1 and is turned on (state 1 in FIG. 45A).

Then, as the cartridge is further pulled, the first cell side sensor 38 detects the cartridge at a timing t2 and is turned on. Then, at a timing t3, the second cell side sensor 39 detects the cartridge and is turned on. That is, at the timing t3, all sensors detect the cartridge and are turned on (state 2 in FIG. 45B).

At a timing t4 at which the cartridge is further pulled from the above-mentioned state, the cartridge return sensor 45 and the first cell side sensor 38 do not detect the cartridge and are turned off, but the second cell side sensor 39 only detects the cartridge and is turned on (state 3 in FIG. 45C).

When the cartridge on the accessor 8 is to be discharged onto the rack 11 as shown in FIG. 46B, the second cell side sensor 39 only detects the cartridge at a timing t10 and is turned on, but the first cell side sensor 38 and the cartridge return sensor 45 do not detect the cartridge and remain turned off. Then, as the cartridge is further returned, the second cell side sensor 39 and the first cell side sensor 38 detect the cartridge at a timing t11 and are turned on.

Then, at a timing t12 at which the cartridge is further returned, the first cell side sensor 38, second cell side sensor 39 and cartridge return sensor 45 are all turned on. At a timing t13 at which the cartridge is further returned, the second cell side sensor 39 no longer detects the cartridge and is turned off.

Thus, at a timing t14 at which the cartridge is discharged onto the rack 11, all of the sensors no longer detect the cartridge and are turned off. The ACL control unit 81 determines that the return of the cartridge is completed at the timing t13.

(3) Pulling the cartridge.

Described below is a processing for pulling the cartridge into the accessor from the rack of the cell mechanism 10. In the following description, the first cell side sensor 38 is also referred to as "detector mechanism 1 of the rack side", the second cell side sensor 39 is also referred to as "detector mechanism 2 of the rack side", and the cartridge return sensor 45 is also referred to as "return detector mechanism".

The cartridge that is being pulled into the accessor 8 from the rack (cell) of the cell mechanism 10 is detected by the return detector mechanism (cartridge return sensor 45). Next, the cartridge is detected by the detector mechanism 1 of the rack side and the detector mechanism 2 of the rack side of the accessor 8 in this order. The pulling of cartridge into the accessor 8 ends when the cartridge is no longer detected by the detector mechanism 1 of the rack side.

When the cartridge that is being pulled is detected by both the detector mechanism 1 of the rack side and the detector mechanism 2 of the rack side of the accessor 8 at the start of the pulling operation, there is a probability that the cartridge is not detected by the return detector mechanism. Therefore, the return detector mechanism is not checked. If the detector mechanism 1 of the rack side of the accessor 8 only is detecting, then, the control operation is started after having confirmed that the return detector mechanism is detecting the cartridge.

Here, if the return detector mechanism is not detecting, which is contradictory to the principle, it is assumed that the return detector mechanism is broken. Since the distance has been determined between the return detector mechanism and the detector mechanism 1 of the rack side, the time from when the cartridge is detected by the return detector mechanism until it is detected by the detector mechanism 1 of the rack side can be learned from the distance and the speed for feeding the cartridge. Therefore, the timer is started when the cartridge is detected by the return detector mechanism. When the cartridge is not detected by the detector mechanism 1 of the rack side even after the passage of a time n (ms), then, it is assumed that the detector mechanism 1 of the rack side is broken.

When the catcher hands 19 are in the open state, the cartridge is never detected by the return detector mechanism unless it is broken. Whenever the catcher hands 19 are in the open state, therefore, the return detector mechanism is checked for its operation. Since it is not probable that the return detector mechanism that is detecting the cartridge is broken, it is then regarded that the detector mechanism 1 of the rack side is broken.

When the detector mechanism 2 of the rack side has detected the cartridge earlier than the detector mechanism 1 of the rack side after the cartridge has been detected by the return detector mechanism, which is contradictory to the principle, it is then regarded that the detector mechanism 1 of the rack side is broken. Similarly to the above, the time from when the cartridge is detected by the detector mechanism 1 of the rack side until the cartridge is detected by the detector mechanism 2 of the rack side, can be learned from a relation between the distance and the speed. Therefore, when the cartridge is not detected by the detector mechanism 2 of the rack side after the passage of a time x (ms) from when the cartridge is detected by the detector mechanism 1 of the rack side, it is regarded that the detector mechanism 2 of the rack side is broken. Finally, the motor is stopped after the cartridge is no longer detected by the detector mechanism 1 of the rack side, and the host unit is informed of the normal operation.

Figure 47:
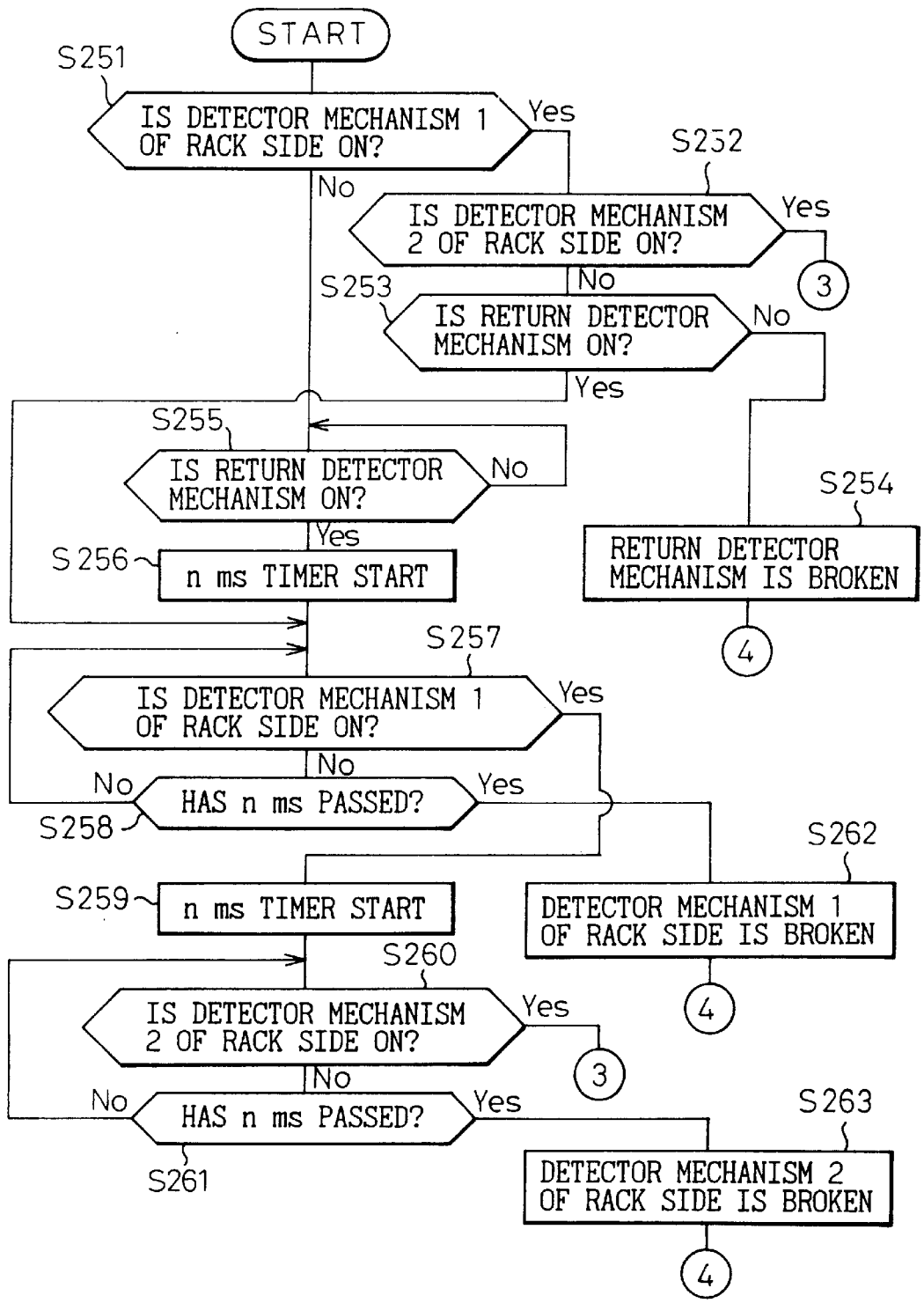
FIG. 47 is a flowchart of a process for pulling the cartridge according to the embodiment.
Figure 48:
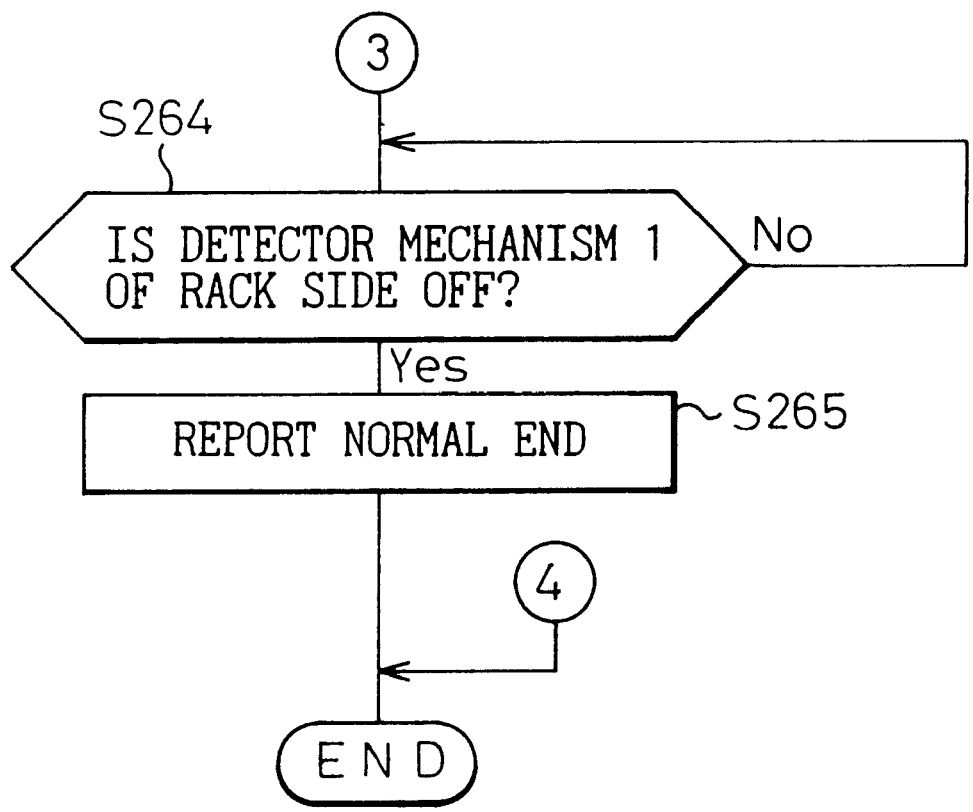
FIG. 48 is a flowchart of the process for pulling the cartridge according to the embodiment.

(4) Description of the process for pulling the cartridge with reference to flowcharts—see FIGS. 47 and 48.

FIG. 47 is a flowchart 1 of a process for pulling a cartridge, and FIG. 48 is a flowchart 2 of a process for pulling the cartridge. Described below with reference to FIGS. 47 and 48 is a process for pulling the cartridge from a rack of the cell mechanism 10 into the accessor. Symbols S251 to S262 denote steps of processing.

① When the operation is started for pulling (feeding) the cartridge from a rack of the cell mechanism 10 into the accessor 8, the ACL control unit 81 determines the on/off state of the detector mechanism 1 of the rack side (first cell side sensor 38), detector mechanism 2 of the rack side (second cell side sensor 39), and return detector mechanism (cartridge return sensor 45). When the detector mechanism 1 of the rack side is on (S251) and the detector mechanism 2 of the rack side is on (S252), the ACL control unit waits until the detector mechanism 1 of the rack side that is turned off (S264), and informs the host unit of the normal end (S265) and ends the processing.

② When the detector mechanism 1 of the rack side is on (S251) and the detector mechanism 2 of the rack side is off (S252), the ACL control unit 81 determines whether the return detector mechanism is on or not (S253). When the return detector mechanism is off (S253), it is determined that the return detector mechanism is broken, and the host unit is informed of the breakage of the return detector mechanism (S254) and the processing ends.

③ When the detector mechanism 1 of the rack side is off (S251), the ACL control unit 81 waits until the return detector mechanism is turned on (S255), sets n (ms) to the timer 106 and starts the timer 106 (S256). The ACL control unit 81 supervises the state of the detector mechanism 1 of the rack side. When the detector mechanism 1 of the rack side is not turned on (S257), the ACL control unit determines whether n (ms) has passed or not (S258).

As a result, when n (ms) has not passed, it is determined again whether the detector mechanism 1 of the rack side is turned on or not (S257). Thus, the ACL control unit 81 waits until the detector mechanism 1 of the rack side is turned on before n (ms) has passed from the start of the timer 106. When n (ms) has passed before the detector mechanism 1 of the rack side is turned on, the ACL control unit 81 determines that the detector mechanism 1 of the rack side is broken, informs the host unit of the breakage of the detector mechanism 1 of the rack side, and ends the processing.

④ When the detector mechanism 1 of the rack side is turned on (S257) before the passage of n (ms) after the start of the timer 106 in the processing of step S256, the ACL control unit 81 sets n (ms) again to the timer 106, starts the timer 106 (S259), and determines whether the detector mechanism 2 of the rack side is turned on or not (S260).

When the detector mechanism 2 of the rack side is off, it; is determined if n (ms) has passed or not (S261). When n (ms) has not passed, it is determined again if the detector mechanism 2 of the rack side is turned on or not (S260). Thus, the ACL control unit 81 waits until the detector mechanism 2 of the rack side is turned on before the passage of the time n (ms) from the start of the timer 106. When the time n (ms) has passed without the detector mechanism 2 of the rack side being turned on, the ACL control unit 81 determines that the detector mechanism 2 of the rack side is broken, informs the host unit of the breakage of the detector mechanism 2 of the rack side (S263) and ends the processing.

When the detector mechanism 2 of the rack side is turned on before the time n (ms) passes (S260), however, the ACL control unit 81 waits until the detector mechanism 1 of the rack side is turned off, informs the host unit of the normal end (S265) and ends the processing.

⑤ When the detector mechanism 1 of the rack side is on (S251), the detector mechanism 2 of the rack side is on (S252) and the return detector mechanism is on (S253), then, the processing of step S257 is executed. In this case, the ACL control unit 81 makes sure that the detector mechanism 1 of the rack side is on (S257), sets n (mw) to the timer 106, and starts the timer 106 (S259). When the detector mechanism 2 of the rack side is turned on (S260) before the time n (ms) passes, the ACL control unit 81 waits until the detector mechanism 1 of the rack side is turned off (S264), informs the host unit of the normal end (S265) and ends the processing.

(5) Description of a process for discharging a cartridge with reference to flowcharts.

Figure 49:
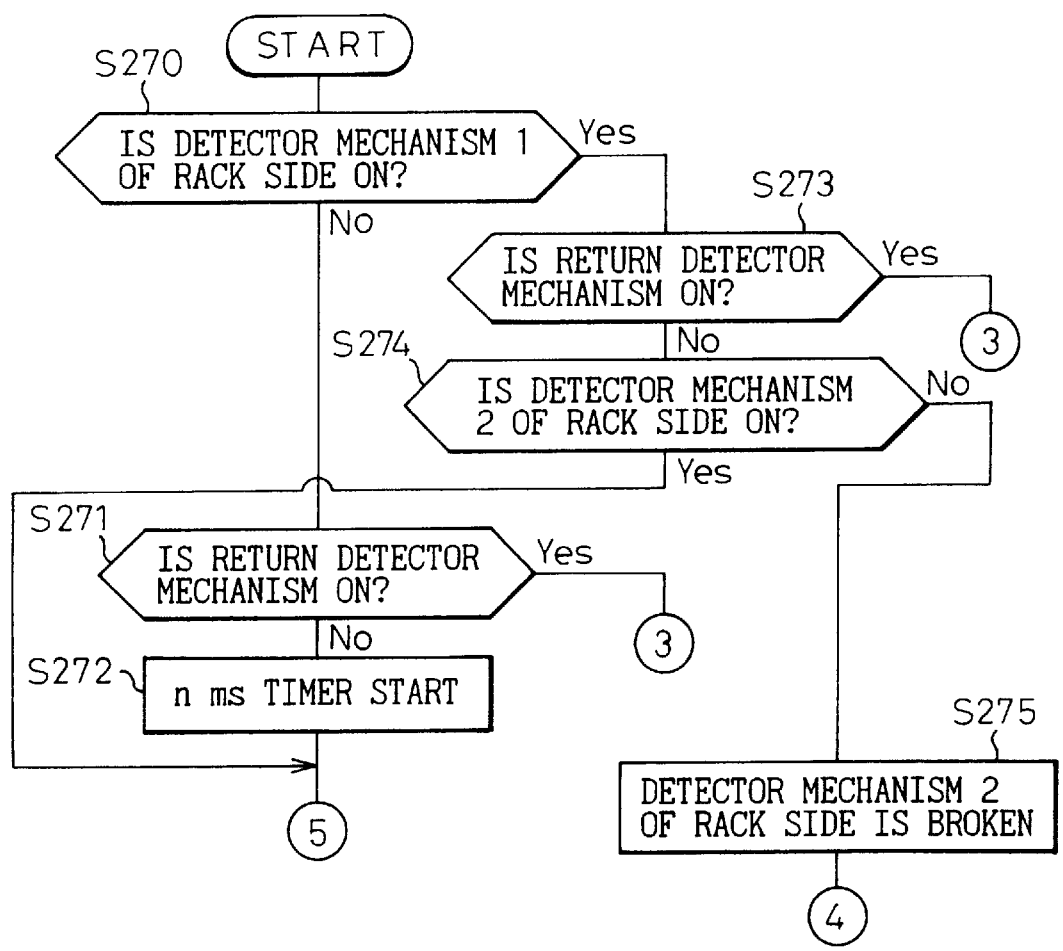
FIG. 49 is a flowchart of a process for discharging the cartridge according to the embodiment.
Figure 50:
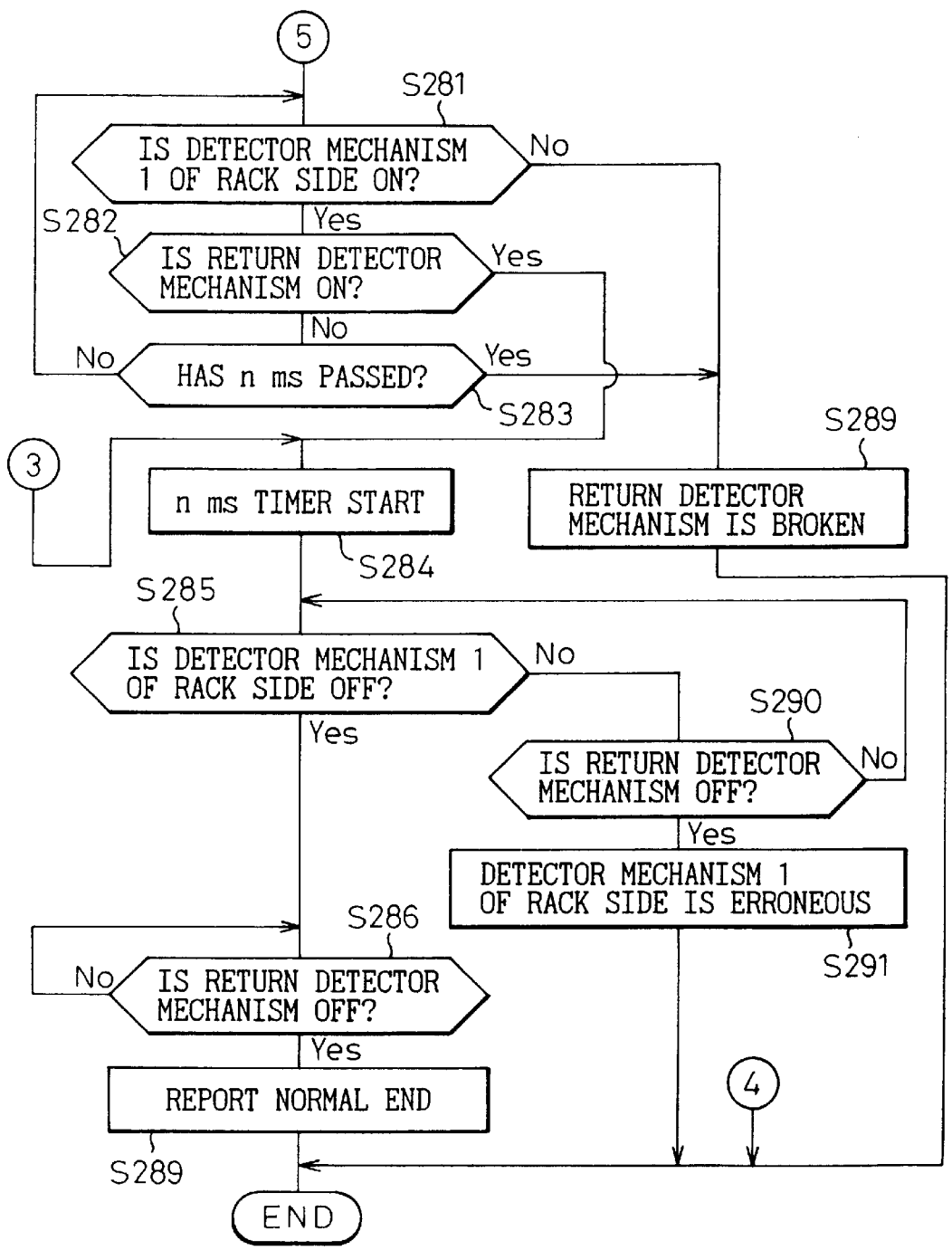
FIG. 50 is a flowchart of the process for discharging the cartridge according to the embodiment.

FIG. 49 is a flowchart 1 of a process for discharging the cartridge, and FIG. 50 is a flowchart 2 of a process for discharging the cartridge. The process for discharging the cartridge will now be described with reference to FIGS. 49 and 50 wherein S270 to S291 denote steps of processing.

The cartridge that is being discharged onto the rack of the cell mechanism 10 is, usually, detected by the detector mechanism 2 of the rack side only, and is then detected by the detector mechanism 1 of the rack side, and is finally detected by the return detector mechanism. The operation for discharging the cartridge onto the rack ends when the return detector mechanism is shifted into the undetecting state from the detecting state. Here, when a detector mechanism has detected the cartridge that is being pulled, the timer 106 counts the time until the next detector mechanism detects the cartridge, to thereby check the detector mechanisms.

① First, the cartridge is discharged in a state where the detector mechanism 2 of the rack side only is turned on. Then, when the detector mechanism 1 of the rack side is turned on (S270) and the return detector mechanism is turned on (S273), the ACL control unit 81 sets n (ms) to the timer 106 and starts the timer 106 (S284). Thereafter, when the detector mechanism 1 of the rack side is turned off within n (ms) (S285), the ACL control unit 81 waits until the return detector mechanism is turned off (S286), informs the host unit of the normal end (S287) and ends the processing.

② The cartridge is discharged in the state where the detector mechanism 2 of the rack side only is turned on. Then, when the detector mechanism 1 of the rack side is turned on (S270) and the return detector mechanism is turned on (S273), the ACL control unit 81 sets n (ms) to the timer 106 and starts the timer 106 (S284). Thereafter, when the detector mechanism 1 of the rack side is not turned off within n (ms) (S285) but the return detector mechanism is turned off (S290), the ACL control unit 81 determines that the detector mechanism 1 of the rack side is defective, informs the host unit of an error of the detector mechanism 1 of the rack side (S291) and ends the processing.

③ The cartridge is discharged in the state where the detector mechanism 2 of the rack side only is turned on. Then, when the detector mechanism 1 of the rack side is turned on (S270), but the return detector mechanism is not turned on (S273) and the detector mechanism 2 of the rack side is turned off (S274), the ACL control unit 81 determines that the detector mechanism 2 of the rack side is broken, informs the host unit of the breakage of the detector mechanism 2 of the rack side (S275) and ends the processing.

④ The cartridge is discharged in the state where the detector mechanism 2 of the rack side only is turned on. The detector mechanism 1 of the rack side is turned on (S270), the return detector mechanism is turned off (S273) and the detector mechanism 2 of the rack side is turned on (S274). Then, when the cartridge is discharged and the detector mechanism 1 of the rack side is turned off (S281), the ACL control unit 81 determines that the return detector mechanism is broken, informs the host unit of the breakage of the return detector mechanism (S289) and ends the processing.

⑤ The cartridge is discharged in the state where the detector mechanism 2 of the rack side is turned on. The detector mechanism 1 of the rack side is turned on (S270), the return detector mechanism is turned off (S273) and the detector mechanism 2 of the rack side is turned on (S274). Then, when the cartridge is discharged, the detector mechanism 1 of the rack side is turned on (S281) and the return detector mechanism is turned on (S282), the ACL control unit 81 sets n (ms) to the timer 106 and starts the timer 106 (S284).

Then, when the detector mechanism 1 of the rack side is turned off within n (ms) (S285), the ACL control unit 81 waits until the return detector mechanism is turned off (S286), informs the host unit of the normal end (S287) and ends the processing. However, when the detector mechanism 1 of the rack side is not turned off (S285) within the above-mentioned time n (ms) but the return detector mechanism is turned off (S290), the ACL control unit 81 determines that the detector mechanism 1 of the rack side is defective, informs the host unit of an effort of the detector mechanism 1 of the rack side (S291) and ends the processing.

⑥ When the cartridge is discharged in the state where the detector mechanism 2 of the rack side only is turned on, and the detector mechanism 1 of the rack side is turned off (S270) and the return detector mechanism is turned on (S271), the ACL control unit 81 sets n (ms) to the timer 106 and starts the timer 106 (S284).

Then when the detector mechanism 1 of the rack side is turned off within n (ms) (S285) and the return detector mechanism is turned off (S286), the ACL control unit informs the host unit of the normal end (S287) and ends the processing. However, when the detector mechanism 1 of the rack side is turned on (S285) and the return detector mechanism is turned off (S290), the ACL control unit 81 determines that the detector mechanism 1 of the rack side is defective, informs the host unit of an error of the detector mechanism 1 of the rack side (S291) and ends the processing.

⑦ When the cartridge is discharged in the state where the detector mechanism 2 of the rack side only is turned on, and the detector mechanism 1 of the rack side is turned off (S270) and the return detector mechanism is turned off (S271), the ACL control unit 81 sets n (ms) to the timer 106 and starts the timer 106 (S272).

Then, when the detector mechanism 1 of the rack side is not turned on even though the cartridge is discharged (S281), the ACL control unit 81 determines that the return detector mechanism is broken, informs the host unit of the breakage of the return detector mechanism (S289) and ends the processing. When the detector mechanism 1 of the rack side is turned on (S281) and the return detector mechanism is turned on, however, the processing of step S284 is executed.

However, when the detector mechanism 1 of the rack side is turned on (S281) and the return detector mechanism is turned off (S282), the ACL control unit determines whether n (ms) has passed from the start of the timer (S283). When n (ms) has not passed, the processing is repeated from step S281. When it is determined that n (ms) has passed, the ACL control unit determines that the return detector mechanism is broken, informs the host unit of the breakage of the return detector mechanism (S289) and ends the processing.

§18: Controlling the position of the cartridge—FIG. 51.

(1) Outline of the operation for controlling the position of the cartridge.

When the cartridge is to be discharged (returned) onto the rack of the cell mechanism 10 from the accessor 8, the cartridge is permitted to overrun to some extent onto the rack so that the processed cartridge can be distinguished from a cartridge before being processed and so that the processed cartridge can be easily taken out by the operator.

(2) Description of the operation for controlling the position of cartridge with reference to a flowchart.

Figure 51:
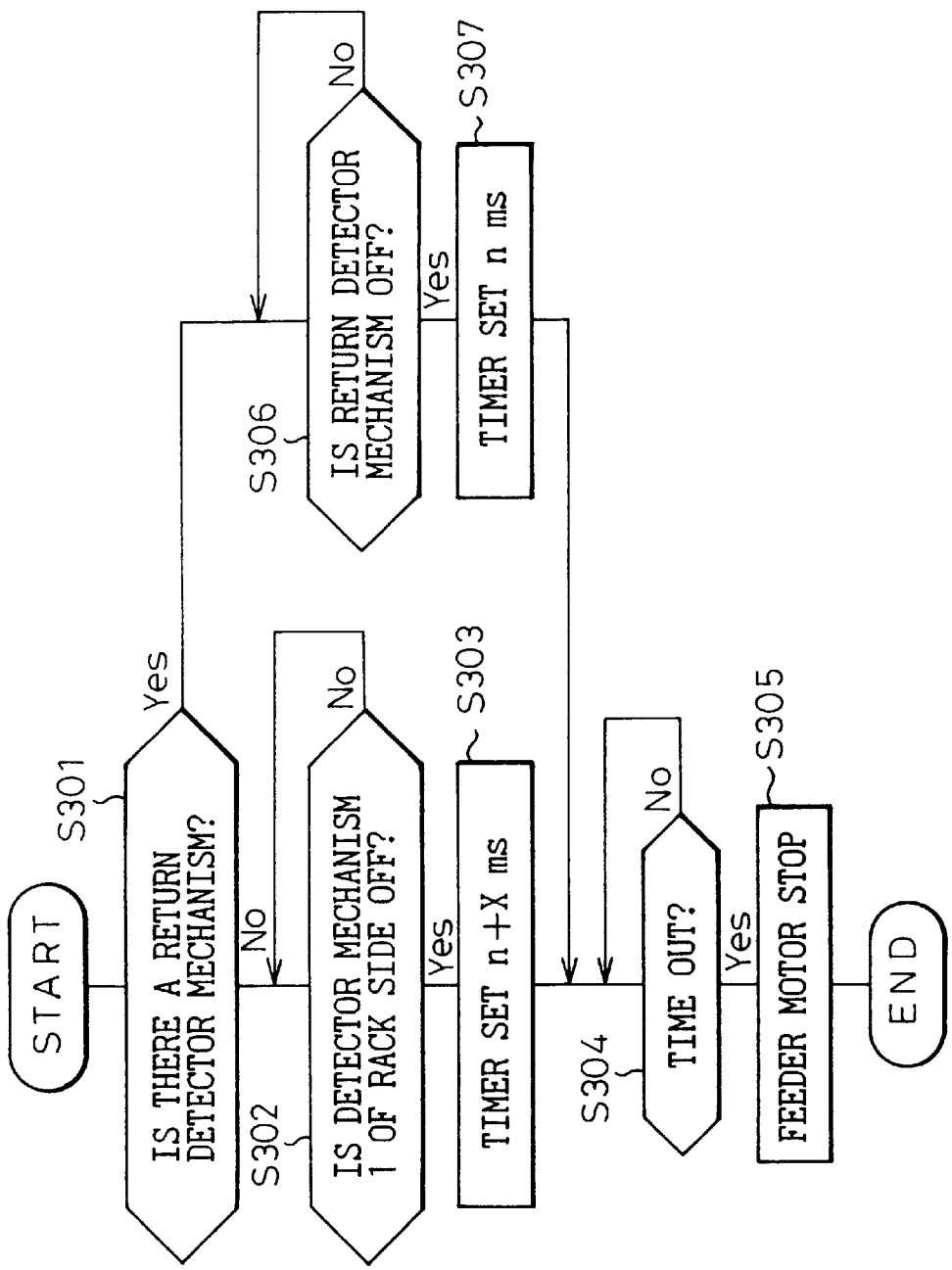
FIG. 51 is a flowchart for controlling the flying of the cartridge according to the embodiment.

FIG. 51 is a flowchart illustrating the operation for controlling the position of the cartridge. The operation for controlling the flying of the cartridge will now be described with reference to FIG. 51 wherein S301 to S307 denote steps of processing.

When there is the return detector mechanism (cartridge return sensor 45) while the cartridge is being discharged (returned) from the accessor 8 onto the rack of the cell mechanism 10, the cartridge is permitted to overrun for n (ms) after it is no longer detected by the return detector mechanism, so that the cartridge is allowed to fly to some extent beyond the position at which it is usually loaded.

When there is no return detector mechanism, the cartridge is permitted to overrun by n+x (ms) after it is no longer detected by the detector mechanism 1 of the rack side; i.e., the cartridge is permitted to pop up and is discharged. The operation will now be concretely described.

In the above-mentioned processing, first, the ACL control unit 81 determines whether there is a return detector mechanism or not (S301). This determination is accomplished by, for example, storing data related to the presence of the return detector mechanism in the EEPROM 107 in the ACL control unit 81 and by reading the data by the MPU 91.

When there is the return detector mechanism, the ACL control unit 81 waits until the return detector mechanism is turned off (S306), sets n (ms) to the timer 106 and starts the timer 106 (S307). The timer 106 supervises the passage of time. As the time n (ms) passes resulting in a time out (S304), the ACL control unit 81 stops the feeder motors 23 (S305).

When there is no return detector mechanism (S301), the ACL control mechanism 81 waits until the detector mechanism 1 of the rack side is turned off (S302), sets n+x (ms) to the timer 106 and starts the timer 106 (S303). The timer supervises the passage of time. As the time n (ms) passes resulting in a time out (S304), the ACL control unit 81 stops the feeder motors 23 (S305)

(3) Advantage.

According to the above-mentioned control operation, the processed cartridge is poping up relative to the rack beyond a cartridge that has not been processed, and the operator is allowed to determine at a glance whether the cartridge is one that has not been processed or one that has been processed, contributing greatly to enhancing the operation efficiency.

§14: Processing for new/old apparatus discrimination—see FIGS. 52A and 52B.

Figure 52A:
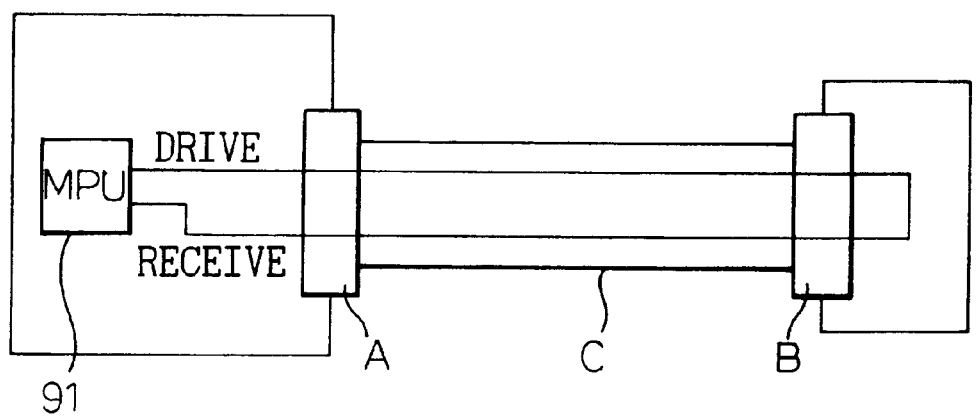
FIGS. 52A and 52B are diagrams illustrating a processing for new/old apparatus discrimination according to the embodiment.
Figure 52B:
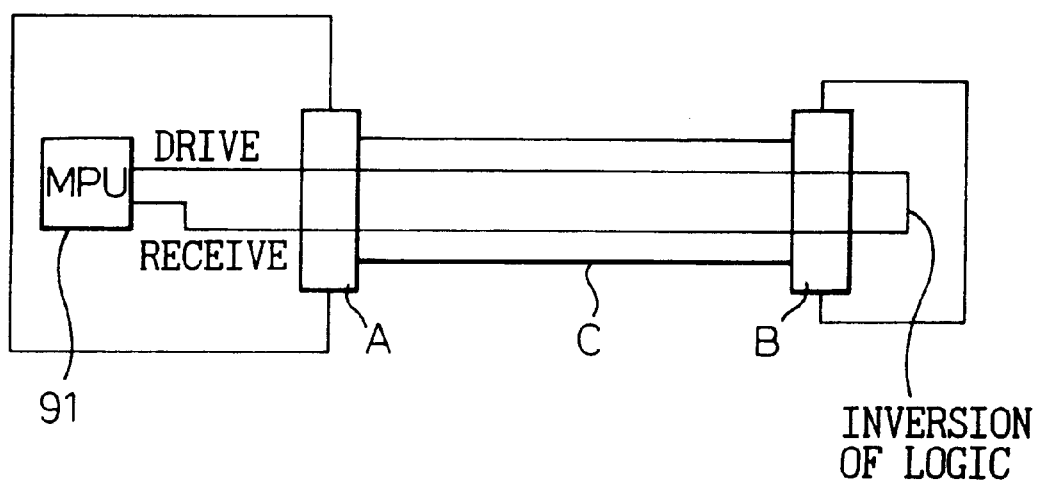

FIGS. 52A and 52B are diagrams illustrating a processing for new/old apparatus discrimination, wherein FIG. 52A shows an old apparatus and FIG. 52B shows a new apparatus.

(1) Outline of the processing.

When the control method differs between the old apparatus using an old type of accessor 8 and the new apparatus using a new type of accessor 8, it requires a lot of time and work to develop firmwares for each of the old apparatus and the new apparatus. Therefore, the new type of apparatus and the old type of apparatus are automatically discriminated, so that a single firmware may suffice.

(2) Description of constitution.

In the old apparatus (conventional apparatus) shown in FIG. 52A, a connector B is connected to the other end of a cable C which is connected to a connector A of the accessor 8. On the side of the connector B, the logic (0 or 1) of a cable check signal that is received is returned back without being changed to the side of the connector A of the accessor 8.

Therefore, when, for example, the MPU 91 in the ACL control unit 81 sends a cable check signal (high level "1") to the side of the connector B, the signal received by the connector B is returned back without being changed (logic is not inverted) to the side of the connector. Therefore, the MPU 91 receives the cable check signal of the same logic and determines that the apparatus is of the old type.

In the new apparatus (of the present invention) shown in FIG. 52B, on the other hand, the connector B is connected to the other end of the cable C connected to the connector A of the accessor 8. A logic-inverting circuit is provided on the side of the connector B, and the logic (0 or 1) of the cable check signal that is received is inverted by the logic-inverting circuit and is returned back to the side of the connector A of the accessor 8.

Therefore, when, for example, the MPU 91 in the ACL control unit 81 sends a cable check signal (high level "1") to the side of the connector B, the signal received by the connector B is inverted for its logic by the logic-inverting circuit and is returned back to the side of the connector A. Therefore, the MPU 91 receives the cable check signal having an inverted logic and determines that the apparatus is of the new type.

(3) Processing based on the drawing.

First, described below is an ordinary method of checking a cable. Signals 0, 1 are sent from the side (MPU 91) of checking the cable to an end (to the side of a first pin) of the cable C. Then, the cable C returns the signals 0, 1 back to the end of the opposite side (side of the final pin) of the cable C through a printed board or the like that is connected to the cable C. Or, returns back the signals 1, 0. It is thus checked whether the cable C is connected or not.

According to the method of checking the cable of the old apparatus, the cable C is connected when the same logic is returned back between the ends of the cable C. That is, 1→1 and 0→0. Here, if the cable of the new apparatus is checked by the same method, 1→0 and 0→1; i.e., inverted logics are returned back. This makes it possible to discriminate the new apparatus over the old apparatus.

(4) Advantage.

According to the above-mentioned processing, the type of the accessor 8 is automatically discriminated by the firmware. Therefore, there is no need for the operator to set the type of the accessor 8 or it does not happen that the operator has forgot the setting. Thus, a single firmware suffices.

As described above, the present invention offers the following effects.

(1) The catcher hands can be controlled to assume the middle state which is an intermediate position of the catcher hands. Therefore, the cartridge can be loaded/discharged to and from the rack by the operator without being hindered (by the catcher hands), and the apparatus for automatically conveying cartridge features improved operation efficiency. When connected to the library unit, furthermore, the entry cell can be brought to a position (of the same height) of the recording/reproducing apparatus, making it possible to shorten the time for conveying the cartridge. This helps enhance the performance of the apparatus.

(2) The following effects are obtained upon detecting the presence of the cartridge. That is, when there is a cartridge on the rack of the exit cell, the cartridge in the recording/reproducing apparatus cannot be discharged. Here, if the presence-of-cartridge detector mechanism is not properly working, it may appear that a cartridge exists on the rack of the exit cell even though it really does not exist.

Therefore, when it is forced to discharge the cartridge onto the exit cell when a cartridge already exists on the rack of the exit cell, the apparatus is not stopped at once but it is confirmed if the presence-of-cartridge detector mechanism is properly working or not.

When the presence-of-cartridge detector mechanism is not functioning properly, the cartridge is discharged onto the rack of the exit cell and the apparatus is stopped, so that the cartridge on the side of the library unit can be conveyed to the other recording/reproducing apparatus. Thus, the library unit itself is not stopped, and the apparatus features enhanced performance and is operated nonattended.

So far, the cartridge that was obliquely loaded into the rack could not be detected and could not be processed. According to the present invention, however, the cartridge is gripped again by the catcher hands and is put straight with respect to the rack to eliminate the erroneously placed state. Thus, it is made possible to access even a cartridge that could not be accessed previously.

(3) Since the rack position is corrected, the accessor can be brought to a correct position with respect to each of the racks at all times. Therefore, the cartridge can be easily pulled or discharged. Besides, dispersion in the mounting of racks and dispersion in the racks themselves are absorbed by the firmware, enabling the apparatus to be assembled requiring decreased amounts of work. This makes it possible to decrease the cost of the apparatus and to improve reliability of the apparatus.

(4) Upon pushing in the leader block, even a cartridge from which the leader block was pulled out and could not be processed, can now be processed, and the apparatus can be operated nonattended even when it is connected to a library unit. An error does not occur even when the leader block is pulled out, and reliability of the apparatus is enhanced.

(5) The following effect is obtained as a result of preventing the feeder belts from being worn out at the same portions only. The feeder belts are turned a little with no load and so will not be worn out at the same portions only. Therefore, the belts are worn out evenly instead of being locally worn out in varying amounts. This makes it possible to lengthen the life of the belts compared to when they are worn out only locally and, hence, to lengthen the life of the accessor. This decreases the frequency for renewing the belts and, hence, to decrease the amount of work in the maintenance of the apparatus.

(6) Owing to the feeder learning, the speed of the feeder motors can be controlled to remain constant at all times. Therefore, the overrunning amount can be maintained constant after the feeder motors are stopped. With the overrunning amount being maintained constant, the cartridge can be properly pulled into the accessor from the rack at all times. This eliminates the time for retrying and helps shorten the cartridge access time.

Moreover, the overrunning time is kept constant when the cartridge is to be returned back to the rack and, hence, the cartridge flies a constant amount. This can be realized by a simple control operation by stopping the motors after the passage of a predetermined period of time from when the cartridge is no longer detected by the detector mechanism 2 of the rack side.

(7) By initializing the cartridge, the presence of cartridge in the accessor can be confirmed at the time of closing the power source circuit or at the time when an error has occurred. Therefore, the cartridge is not damaged, the apparatus not scarred, and the cartridge is not lost. This improves the reliability of the apparatus for automatically conveying a cartridge.

(8) By retrying the feeder mechanism, even a cartridge that had been placed in an erroneous state can now be rescued. Therefore, it does not happen that the cartridge is not accessible, and reliability is improved. Even when the ACL apparatus is connected to the library unit, it does not happen that the cartridge is not accessible, and the system down does not take place.

(9) The following effect is obtained by the cartridge return control operation. Previously it could happen that the cartridge that is being returned back to the rack but that is not properly held in the cell, is lost when it is detected by neither the detector mechanism 1 of the rack side nor the detector mechanism 2 of the rack side. According to the present invention, however, the cartridge is not lost and the reliability is improved.

(10) Upon controlling the flying of the cartridge, the cartridge after processed now flies more toward the rack than the cartridge before being processed, enabling the operator at a glance to determine whether the cartridge is one before being processed or one after being processed, and contributing to greatly improving the operation efficiency.

(11) Upon carrying out the operation for discriminating the types of the apparatuses, the types of the accessors are automatically discriminated by firmware. Therefore, the operator does not have to set the type of the accessor. The operator cannot forget the setting. Therefore, only one firmware is needed.

What is claimed is:

1. An apparatus for automatically conveying cartridges, comprising:

a rack mechanism having racks which hold cartridges of recording media;

an accessor mechanism comprising an accessor having catcher hands which grip a cartridge, a catcher drive mechanism which drives the catcher hands, and a presence-of-cartridge detector which detects the presence of a cartridge on a rack which conveys the cartridge;

a conveyance control unit controlling the conveyance of cartridges by controlling said accessor mechanism; and said conveyance control unit further comprises a sensor function confirmation unit which, when the power source circuit is closed, brings said accessor to a rack position of the rack mechanism and brings said presence-of-cartridge sensor to a position where the cartridge will not be detected, to determine whether the presence-of-cartridge sensor is properly functioning.

2. An apparatus for automatically conveying cartridges, comprising:

an entry rack storing a cartridge which is connected to a library unit which is awaiting processing;

an exit rack containing a cartridge that has been processed;

an accessor mechanism having an accessor having catcher hands which grip a cartridge and a catcher drive mechanism which drives the catcher hands and a detector detecting the presence of a cartridge on a rack which conveys cartridges;

a conveyance control unit which conveys cartridges by controlling said accessor mechanism;

a presence-of-cartridge sensor which detects the presence of a cartridge on said rack, said conveyance control unit being equipped with a cartridge detection control unit which, when the power source circuit is closed, brings the accessor selectively to the entry rack and to the exit rack, so that said presence-of-cartridge sensor detects the cartridge on the corresponding rack; and said conveyance control unit further comprises a cartridge correction control unit which, at the time of detecting a cartridge on each of the entrance and exit racks, as controlled by said cartridge detection control unit, causes the catcher hands to grip a cartridge on the corresponding racks in advance, by taking into consideration a circumstance in which the cartridge may not have been properly placed on the rack, and permits the cartridge to be released, so that the cartridge is properly placed on the corresponding rack.

3. An apparatus for automatically conveying cartridges, comprising:

an entry rack storing a cartridge which is connected to a library unit which is awaiting processing;

an exit rack containing a cartridge that has been processed;

an accessor mechanism having an accessor having catcher hands which grip a cartridge and a catcher drive mechanism which drives the catcher hands and a detector detecting the presence of a cartridge on a rack which conveys cartridges;

a conveyance control unit which conveys cartridges by controlling said accessor mechanism;

a presence-of-cartridge sensor which detects the presence of a cartridge on said rack, said conveyance control unit being equipped with a cartridge detection control unit which, when the power source circuit is closed, brings the accessor selectively to the entry rack and to the exit rack, so that said presence-of-cartridge sensor detects the cartridge on the corresponding rack; and said conveyance control unit further comprises a sensor function check unit which, when a cartridge is to be discharged into said exit cell, determines if there is a cartridge in the exit cell by using said presence-of-cartridge sensor and, when a cartridge in the exit cell is detected, checks if said presence-of-cartridge sensor is functioning properly or not.

4. An apparatus for automatically conveying cartridges according to claim 3, wherein:

said conveyance control unit has a control function which confirms if the presence-of-cartridge sensor is properly functioning or not by using said sensor function check unit and, when the presence-of-cartridge sensor is not properly functioning, informs a host unit of this fact and discharges the cartridge onto the exit rack and, when the presence-of-cartridge sensor is properly functioning, informs the host unit of the fact that a cartridge exists on the exit rack.

5. An apparatus for automatically conveying cartridges used as a single unit, comprising:

a cell mechanism having a plurality of racks which hold cartridges;

an accessor mechanism having an accessor which conveys cartridges, and a conveyance control unit which controls the conveyance of cartridges by controlling said accessor mechanism, said conveyance control unit further comprising a presence-of-cartridge controller which detects the presence of a cartridge on the rack by using a presence-of-cartridge sensor and, when there is no detected cartridge, pulls a cartridge into the accessor and thereby judges that there is a cartridge on said rack.

6. An apparatus for automatically conveying cartridges, comprising:

a rack mechanism having racks which hold cartridges of recording media;

an accessor mechanism having an accessor which conveys cartridges, the accessor comprising catcher hands which grip a cartridge and a catcher hand drive mechanism which drives the catcher hands and a presence-of-cartridge sensor which detects a cartridge on a corresponding rack of the rack mechanism and the position of the corresponding rack; and a conveyance control unit controlling the conveyance of cartridges by controlling said accessor mechanism and further comprising a rack position correction unit which moves the accessor to an empty rack, detects the position of the empty rack, using said presence-of-cartridge sensor, to find a difference from a position where the rack should be, and stores said difference in a memory as a correction value for positioning the accessor at the corresponding rack.

7. An apparatus for automatically and selectively conveying cartridges of recording media to and from a recording/reproducing apparatus, selectively for insertion thereinto and ejection therefrom, comprising:

a rack mechanism which holds plural cartridges of recording media therein;

an accessor mechanism having catcher hands selectively movable to an opened state for receiving, or releasing, a cartridge and to a closed state for gripping a received cartridge;

a detector detecting the opened or the closed state of the catcher hands;

a controller, in response to the state of the catcher hands detected by the detector, selectively controlling the catcher hands to move to the closed state to grip a received cartridge or to the opened state to receive a selected cartridge or to release a currently gripped cartridge and controlling the accessor mechanism to convey a cartridge, as gripped by the catcher hands, for insertion into a selected position therefor, or ejection from a current position thereof, in the rack mechanism; and a presence-of-cartridge detector detecting the presence of a cartridge, the controller controlling the position of the accessor mechanism and, thereby, the position of the presence-of-cartridge detector so as to sense a selected rack position for determining proper functioning of the presence-of-cartridge detector so as to position the presence-of-cartridge detector at a selected rack position at which a cartridge will not be detected and, in response to a non-cartridge detection output of the presence-of-cartridge detector, confirming proper functioning thereof.

8. An apparatus as recited in claim 7, wherein:

the rack mechanism includes an entry rack and an exit rack; and the controller controls the accessor mechanism to move to and position the presence-of-cartridge sensor selectively at one of the entry rack and the exit rack, thereby to detect the presence or absence of a cartridge in the corresponding entry rack or exit rack.

9. An apparatus as recited in claim 8, wherein:

the controller, in response to an instruction to discharge a cartridge into the exit rack, positions the accessor mechanism and, thereby, the presence-of-cartridge detector so as to detect the presence or absence of a cartridge in the exit cell and, in response to detecting the presence of a cartridge therein, performs a check to determine if the presence-of-cartridge detector is functioning properly or not.

10. An apparatus as recited in claim 9, wherein:

the controller, further, in response to the detection of a cartridge in the exit rack:

(a) when further determining that the presence-of-cartridge sensor is not functioning properly, informs a host thereof and discharges the cartridge into an exit rack; and (b) when further determining that the presence-of-cartridge sensor is properly functioning, informs the host unit that the cartridge exists on the exit rack.

11. An apparatus as recited in claim 7, wherein:

the controller, further, selectively controls the catcher hands to move to a state intermediate the opened and closed states.

\* \* \* \* \*